US011115966B2

(12) United States Patent
Cirik et al.

(10) Patent No.: US 11,115,966 B2
(45) Date of Patent: Sep. 7, 2021

(54) BEAM FAILURE RECOVERY PROCEDURES USING BANDWIDTH PARTS

(71) Applicant: Comcast Cable Communications, LLC, Philadelphia, PA (US)

(72) Inventors: Ali Cirik, Herndon, VA (US); Esmael Hejazi Dinan, McLean, VA (US); Hua Zhou, Herndon, VA (US); Hyoungsuk Jeon, Centreville, VA (US); Alireza Babaei, Fairfax, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/370,477

(22) Filed: Mar. 29, 2019

(65) Prior Publication Data

US 2019/0306842 A1    Oct. 3, 2019

Related U.S. Application Data

(60) Provisional application No. 62/650,751, filed on Mar. 30, 2018.

(51) Int. Cl.
| H04W 72/04 | (2009.01) |
| H01M 10/48 | (2006.01) |
| H04B 7/06 | (2006.01) |
| H04W 74/08 | (2009.01) |

(52) U.S. Cl.
CPC ......... *H04W 72/042* (2013.01); *H01M 10/48* (2013.01); *H04B 7/0617* (2013.01); *H04B 7/0695* (2013.01); *H04W 72/0413* (2013.01); *H04W 72/046* (2013.01); *H04W 72/0453* (2013.01); *H04W 74/0833* (2013.01)

(58) Field of Classification Search
CPC .......... H04W 72/042; H04W 72/0413; H04W 72/0453; H04W 72/046; H04W 74/0833; H01M 10/48; H04B 7/0617; H04B 7/0695
See application file for complete search history.

(56) References Cited

U.S. PATENT DOCUMENTS

| 8,976,698 B2 | 3/2015 | Chen et al. |
| 2017/0156152 A1 | 6/2017 | Nazar et al. |
| 2017/0238323 A1 | 8/2017 | Marinier et al. |
| (Continued) | | |

FOREIGN PATENT DOCUMENTS

| EP | 2672649 A1 | 12/2013 |
| EP | 3282633 A1 | 2/2018 |
| (Continued) | | |

OTHER PUBLICATIONS

Jun. 28, 2019—European Extended Search Report—19166254.3.
(Continued)

*Primary Examiner* — Melvin C Marcelo
(74) *Attorney, Agent, or Firm* — Banner & Witcoff, Ltd.

(57) ABSTRACT

Systems, apparatuses, and methods are described for wireless communications. A wireless device may initiate a beam failure recovery (BFR) procedure using a bandwidth part (BWP) on a secondary cell. Based on initiating a random access procedure for the BFR procedure and/or based on unsuccessfully completing the BFR procedure, the wireless device may perform one or more operations to prevent and/or reduce misalignment between the wireless device and a base station.

20 Claims, 38 Drawing Sheets

(56) References Cited

U.S. PATENT DOCUMENTS

| | | | |
|---|---|---|---|
| 2017/0245165 A1 | 8/2017 | Onggosanusi et al. | |
| 2017/0353223 A1 | 12/2017 | Kim et al. | |
| 2018/0006701 A1 | 1/2018 | Ann et al. | |
| 2018/0049047 A1 | 2/2018 | Lin et al. | |
| 2018/0049169 A1 | 2/2018 | Lin et al. | |
| 2018/0124687 A1 | 5/2018 | Park et al. | |
| 2018/0124815 A1 | 5/2018 | Papasakellariou | |
| 2018/0131493 A1 | 5/2018 | Luo et al. | |
| 2018/0183551 A1 | 6/2018 | Chou et al. | |
| 2018/0288810 A1* | 10/2018 | Ishii | H04W 48/12 |
| 2019/0132109 A1 | 5/2019 | Zhou et al. | |
| 2019/0215870 A1* | 7/2019 | Babaei | H04W 72/042 |
| 2019/0254110 A1 | 8/2019 | He et al. | |

FOREIGN PATENT DOCUMENTS

| | | | |
|---|---|---|---|
| WO | 2011038243 | A2 | 3/2011 |
| WO | 2011038243 | A3 | 7/2011 |
| WO | 2011085230 | A2 | 7/2011 |
| WO | 2017197155 | A1 | 11/2017 |
| WO | 2018021834 | A1 | 2/2018 |
| WO | 2018031638 | A1 | 2/2018 |
| WO | 2018031924 | A1 | 2/2018 |
| WO | 2018044116 | A1 | 3/2018 |
| WO | 2018080260 | A1 | 5/2018 |
| WO | 2018084544 | A1 | 5/2018 |
| WO | 2018084571 | A1 | 5/2018 |
| WO | 2018085145 | A1 | 5/2018 |
| WO | 2018089117 | A1 | 5/2018 |
| WO | 2018145019 | A1 | 8/2018 |

OTHER PUBLICATIONS

Huawei, HiSilicon: "Bandwidth part activation and adaptation", Sep. 18, 2017.
InterDigital, Inc.: "Remaining details of BWP", Sep. 18, 2017.
LG Electronics: "Discussion on carrier aggregation and bandwidth parts", Sep. 18, 2017.
MediaTek Inc.: "Summary of Bandwidth Part Operation", Oct. 9, 2017.
R1-1716114 3GPP TSG RAN WG1 Meeting NR Ad Hoc, Nagoya, Japan, Sep. 18-21, 2017, Source: NTT DOCOMO, Inc., Title: Power control framework for PUSCH.
R1-1716127 3GPP TSG RAN WG1 Meeting NR Ad Hoc, Nagoya, Japan, Sep. 18-21, 2017, Source: Nokia, Nokia Shanghai Bell, Title: Discussion on NR power control framework.
R1-1716451 3GPP TSG RAN WG1 Meeting NR Ad Hoc, Nagoya, Japan, Sep. 18-21, 2017, Source: Qualcomm Incorporated, Title: Power control and PHR for NR.
R1-1716515 3GPP TSG RAN WG1 Meeting NR Ad Hoc, Nagoya, Japan, Sep. 18-21, 2017, Source: InterDigital Inc., Title: Further Details on Uplink Power Control.
R1-1716535 3GPP TSG RAN WG1 Meeting NR Ad Hoc, Nagoya, Japan, Sep. 18-21, 2017, Source: Panasonic, Title: Discussion on NR power control framework.
R1-1716604 3GPP TSG RAN WG1 Meeting NR Ad Hoc, Nagoya, Japan, Sep. 18-21, 2017, Source: Ericsson, Title: NR UL power control framework.
R1-1716606 3GPP TSG RAN WG1 Meeting NR Ad Hoc, Nagoya, Japan, Sep. 18-21, 2017, Source: Ericsson, Title: Closed loop PC in NR.
R1-1717311 3GPP TSG RAN WG1 Meeting NR Ad Hoc, Nagoya, Japan, Sep. 18-21, 2017, Source: Huawei, HiSilicon, Title: General considerations on UL power control design.
R1-1717408 3GPP TSG RAN WG1 Meeting #90bis, Prague, Czech Republic, Oct. 9-13, 2017, Source: Intel Corporation, Title: Remaining Details on UL Power Control Framework.
R1-1717438 3GPP TSG RAN WG1 Meeting #90bis, Prague, Czech Republic, Oct. 9-13, 2017, Source: ZTE, Sanechips, Title: On NR Power Control.
R1-1717508 3GPP TSG RAN WG1 Meeting #90bis, Prague, Czech Republic, Oct. 9-13, 2017, Source: vivo, Title: Remaining issues on NR UL power control.
R1-1717692 3GPP TSG RAN WG1 Meeting #90bis, Prague, Czech Republic, Oct. 9-13, 2017, Source: Samsung, Title: On UL Power Control.
R1-1717846 3GPP TSG RAN WG1 Meeting NR Ad Hoc, Nagoya, Japan, Sep. 18-21, 2017, Source: CATT, Title: NR Power Control Aspects.
R1-1717892 3GPP TSG RAN WG1 Meeting #90bis, Prague, Czech Republic, Oct. 9-13, 2017, Source: CMCC, Title: Discussion on power control framework.
R1-1717919 3GPP TSG RAN WG1 Meeting #90bis, Prague, Czech Republic, Oct. 9-13, 2017, Source: Panasonic, Title: Discussion on NR power control framework.
R1-1717983 3GPP TSG RAN WG1 Meeting #90bis, Prague, Czech Republic, Oct. 9-13, 2017, Source: LG Electronics, Title: Discussion on UL power control for NR.
R1-1718031 3GPP TSG RAN WG1 Meeting #90bis, Prague, Czech Republic, Oct. 9-13, 2017, Source: OPPO, Title: On uplink power control for NR.
R1-1718228 3GPP TSG RAN WG1 Meeting #90bis, Prague, Czech Republic, Oct. 9-13, 2017, Source: NTT DOCOMO, Inc., Title: Power control framework for PUSCH.
R1-1718502 3GPP TSG RAN WG1 Meeting #90bis, Prague, Czech Republic, Oct. 9-13, 2017, Source: InterDigital, Inc, Title: On NR Power Control Framework.
R1-1718592 3GPP TSG RAN WG1 Meeting #90bis, Prague, Czech Republic, Oct. 9-13, 2017, Source: Qualcomm Incorporated, Title: Power control and PHR for NR.
R1-1718625 3GPP TSG RAN WG1 Meeting #90bis, Prague, Czech Republic, Oct. 9-13, 2017, Source: ITL, Title: UL power control and PHR.
R1-1718652 3GPP TSG RAN WG1 Meeting #90bis, Prague, Czech Republic, Oct. 9-13, 2017, Source: Ericsson, Title: NR power control framework.
R1-1718655 3GPP TSG RAN WG1 Meeting #90bis, Prague, Czech Republic, Oct. 9-13, 2017, Source: Ericsson, Title: Further details on closed loop power control.
R1-1718692 3GPP TSG RAN WG1 Meeting #90bis, Prague, Czech Republic, Oct. 9-13, 2017, Source: Nokia, Nokia Shanghai Bell, Title: Discussion on NR power control framework.
R1-1718704 3GPP TSG RAN WG1 Meeting #90bis, Prague, Czech Republic, Oct. 9-13, 2017, Source: Motorola Mobility, Lenovo, Title: On NR power control.
3GPP TS 36.413 V13.3.0 (Jun. 2016), Technical Specification, 3rd Generation Partnership Project; Technical Specification Group Radio Access Network; Evolved Universal Terrestrial Radio Access Network (E-UTRAN); S1 Application ;Protocol (S1AP) (Release 13).
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
3GPP TS 36.321 V10.3.0 (Sep. 2011), Technical Specification, 3rd Generation Partnership Project; Technical Specification Group Radio Access Network; Evolved Universal Terrestrial Radio Access (E-UTRA); Medium Access Control (MAC) Protocol Specification (Release 10).
3GPP TS 36.321 V14.3.0 (Jun. 2017), Technical Specification, 3rd Generation Partnership Project; Technical Specification Group Radio Access Network; Evolved Universal Terrestrial Radio Access (E-UTRA); Medium Access Control (MAC) Protocol Specification (Release 14).
3GPP TS 36.331 V14.3.0 (Jun. 2017), Technical Specification, 3rd Generation Partnership Project; Technical Specification Group Radio

(56) References Cited

OTHER PUBLICATIONS

Access Network; Evolved Universal Terrestrial Radio Access (E-UTRA); Radio Resource Control (RCC); Protocol Specification (Release 14).
3GPP TR 38.802 V14.1.0 (Jun. 2017), Technical Report, 3rd Generation Partnership Project; Technical Specification Group Radio Access Network; Study on New Radio Access Technology Physical Layer Aspects (Release 14).
3GPP TR 38.912 V14.0.0 (Mar. 2017), Technical Report, 3rd Generation Partnership Project; Technical Specification Group Radio Access Network; Study on New Radio (NR) Access Technology (Release 14).
3GPP TSG RAN WG1 Meeting #90bis, Prague, Czech Republic, Oct. 9-13, 2017, Title: RAN1 Chairman's Notes.
3GPP TSG RAN WG1 Meeting #93, Busan, Korea, May 21-25, 2018, Title: RAN1 Chairman's Notes.
3GPP TSG RAN WG2 NR Ad Hoc, Vancouver, Canada, Jan. 22-26, 2018, Source: Session Chair (InterDigital), Title: Report from LTE and NR User Plane Break-Out Session.
R2-1711835 3GPP TSG RAN WG2 Meeting #99bis, Prague, Czech Republic, Oct. 9-13, 2017, Source: Session Chair (InterDigital), Title: Report from LTE and NR User Plane Break-Out Session.
R1-1716353 3GPP TSG RAN WG1 Meeting NR Ad Hoc, Nagoya, Japan, Sep. 18-21, 2017, Source: Ericsson, Title: On dynamic triggering for CSI reports and CSI-RS.
R1-1716354 3GPP TSG RAN WG1 Meeting NR Ad Hoc, Nagoya, Japan, Sep. 18-21, 2017, Source: Ericsson, Title: A comparison of CSI-RS activation schemes based on MAC CE and DCI.
R1-1716357 3GPP TSG RAN WG1 Meeting NR Ad Hoc, Nagoya, Japan, Sep. 18-21, 2017, Source: Ericsson, Title: On semi-persistent CSI reporting on PUSCH.
R1-1717939 3GPP TSG RAN WG1 Meeting #90bis, Prague, Czech Republic, Oct. 9-13, 2017, Source: LG Electronics, Title: Discussion on CSI measurement.
R1-1801073 3GPP TSG RAN WG1 NR Ad Hoc, Vancouver, Canada, Jan. 22-26, 2018, Source: RAN2, Title: LS on PDCCH order for initiation of random access.
R1-1805701 3GPP TSG RAN WG1 Meeting #92bis, Sanya, China, Apr. 16-20, 2018, Source: Qualcomm Incorporated, Title: Summary of Remaining Details on RACH Procedure.
R1-1805876 3GPP TSG RAN WG1 Meeting #93, Busan, Korea, May 21-25, 2018, Source: Huawei, HiSilicon, Title: Remaining details of RACH Procedures.
R1-1807747 3GPP TSG RAN WG1 Meeting #93, Busan, Korea, May 21-25, 2018, Source: Qualcomm Incorporated, Title: Summary of Remaining Details on RACH Procedure.
R2-1800688 3GPP TSG RAN WG2 NR Ad Hoc, Vancouver, Canada, Jan. 22-26, 2018, Source: Ericsson, Title: Need for PDCCH order.
Sep. 9, 2013—European Extended Search Report—EP 19174705.4.
Sep. 16, 2019—European Extended Search Report—EP 19175772.3.
R2-1712212 3GPP TSG RAN WG2 Meeting #100, Reno, USA, Nov. 27-Dec. 1, 2017, Source: ASUSTeK, Title: Details of BWP inactivity timer.
Jan. 16, 2019—European Search Report—EP 18202948.8.
OPPO "SPS operations for BWP switching" Oct. 8, 2017.
Ericsson "URLLC aspects for grant-free UL transmission in NR" Feb. 12, 2017.
Mar. 29, 2019—Extended European Search Report—EP 18205418.9.
Jul. 10, 2019—European Extended Search Report—EP 19175762.4.
3GPP TSG-RAN WG2 Meeting #102: "Email Discussion on SSB and Cell relationship", May 21, 2018.
3GPP TSG RAN WG1 Meeting #93: "Remaining Issues on Beam Management", May 21, 2018.

R1-1715425 3GPP TSG RAN WG1 Meeting NR Ad Hoc, Nagoya, Japan, Sep. 18-21, 2017, Source: Huawei, HiSilicon, Title: Overview of bandwidth part, CA, and DC operation including SRS switching.
R1-1715492 3GPP TSG RAN WG1 Meeting NR Ad Hoc, Nagoya, Japan, Sep. 18-21, 2017, Source: Fujitsu, Title: Considerations on UCI feedback for carrier aggregation.
R1-1715517 3GPP TSG RAN WG1 Meeting NR Ad Hoc, Nagoya, Japan, Sep. 18-21, 2017, Source: Spreadtrum Communications, Title: Consideration on monitoring preemption indication in bandwidth parts.
R1-1715535 3GPP TSG RAN WG1 Meeting NR Ad Hoc, Nagoya, Japan, Sep. 18-21, 2017, Source: Lenovo, Motorola Mobility, Title: HARQ-ACK codebook size determination for CA with different numerologies.
R1-1715648 3GPP TSG RAN WG1 Meeting NR Ad Hoc, Nagoya, Japan, Sep. 18-21, 2017, Source: vivo, Title: Remaining details for bandwidth part operation.
R1-1715692 3GPP TSG RAN WG1 Meeting NR Ad Hoc, Nagoya, Japan, Sep. 18-21, 2017, Source: Guangdong OPPO Mobile Telecom, Title: Remaining issues on bandwidth part configuration and activation.
R1-1715755 3GPP TSG RAN WG1 Meeting NR Ad Hoc, Nagoya, Japan, Sep. 18-21, 2017, Source: Nokia, Nokia Shanghai Bell, Title: On remaining aspects of NR CA/DC and BWPs.
R1-1715770 3GPP TSG RAN WG1 Meeting NR Ad Hoc, Nagoya, Japan, Sep. 18-21, 2017, Source: ETRI, Title: Remaining details of bandwidth part for initial access.
R1-1715774 3GPP TSG RAN WG1 Meeting NR Ad Hoc, Nagoya, Japan, Sep. 18-21, 2017, Source: Panasonic, Title: Combining DRX with BWP adaptation.
R1-1715830 3GPP TSG RAN WG1 Meeting NR Ad Hoc, Nagoya, Japan, Sep. 18-21, 2017, Source: CATT, Title: Remaining aspects of CA and wider bandwidth operation.
R1-1715892 3GPP TSG RAN WG1 Meeting NR Ad Hoc, Nagoya, Japan, Sep. 18-21, 2017, Source: LG Electronics, Title: Discussion on carrier aggregation and bandwidth parts.
R1-1716019 3GPP TSG RAN WG1 Meeting NR Ad Hoc, Nagoya, Japan, Sep. 18-21, 2017, Source: Samsung, Title: On Bandwidth Part Operation.
R1-1716109 3GPP TSG RAN WG1 Meeting NR Ad Hoc, Nagoya, Japan, Sep. 18-21, 2017, Source: NTT DOCOMO,Inc., Title: Remaing issues on bandwidth parts for NR.
R1-1716192 3GPP TSG RAN WG1 Meeting NR Ad Hoc, Nagoya, Japan, Sep. 18-21, 2017, Source: AT&T, Title: Remaining Details of Carrier Aggregation and Bandwidth Parts.
R1-1716202 3GPP TSG RAN WG1 Meeting NR Ad Hoc, Nagoya, Japan, Sep. 18-21, 2017, Source: MediaTek Inc., Title: Remaining Details on Bandwidth Part Operation in NR.
R1-1716258 3GPP TSG RAN WG1 Meeting NR Ad Hoc, Nagoya, Japan, Sep. 18-21, 2017, Source: InterDigital, Inc., Title: Remaining details of BWP.
R1-1716327 3GPP TSG RAN WG1 Meeting NR Ad Hoc, Nagoya, Japan, Sep. 18-21, 2017, Source: Intel Corporation, Title: Remaining aspects for carrier aggregation and bandwidth parts.
R1-1716440 3GPP TSG RAN WG1 Meeting NR Ad Hoc, Nagoya, Japan, Sep. 18-21, 2017, Source: Qualcomm Incorporated, Title: CA and BWP.
R1-1716601 3GPP TSG RAN WG1 Meeting NR Ad Hoc, Nagoya, Japan, Sep. 18-21, 2017, Source: Ericsson, Title: On CA related aspects and BWP related aspects.
R1-1716647 3GPP TSG RAN WG1 Meeting NR Ad Hoc, Nagoya, Japan, Sep. 18-21, 2017, Source: Convida Wireless, Title: Discussion on BWP Design.
R1-1717077 3GPP TSG RAN WG1 Meeting #90bis, Prague, Czech Republic, Oct. 9-13, 2017, Source: Huawei, HiSilicon, Title: Remaining issues on bandwidth part.
R1-1717400 3GPP TSG RAN WG1 Meeting #90bis, Prague, Czech Republic, Oct. 9-13, 2017, Source: Intel Corporation, Title: Remaining details for bandwidth parts.
R1-1717504 3GPP TSG RAN WG1 Meeting #90bis, Prague, Czech Republic, Oct. 9-13, 2017, Source: vivo, Title: Remaining details for bandwidth part operation.

(56) References Cited

OTHER PUBLICATIONS

R1-1717675 3GPP TSG RAN WG1 Meeting #90bis, Prague, Czech Republic, Oct. 9-13, 2017, Source: Samsung, Title: On Bandwidth Part Operation.
R1-1717839 3GPP TSG RAN WG1 Meeting #90bis, Prague, Czech Republic, Oct. 9-13, 2017, Source: CATT, Title: Remaining aspects of BWP operation.
R1-1717972 3GPP TSG RAN WG1 Meeting #90bis, Prague, Czech Republic, Oct. 9-13, 2017, Source: LG Electronics, Title: Remaining issues on bandwidth parts.
R1-1718050 3GPP TSG RAN WG1 Meeting #90bis, Prague, Czech Republic, Oct. 9-13, 2017, Source: OPPO, Title: Remaining issues on bandwidth part configuration and activation.
R1-1718223 3GPP TSG RAN WG1 Meeting #90bis, Prague, Czech Republic, Oct. 9-13, 2017, Source: NTT DOCOMO, Inc., Title: Remaing issues on bandwidth parts for NR.
R1-1718327 3GPP TSG RAN WG1 Meeting #90bis, Prague, Czech Republic, Oct. 9-13, 2017, Source: MediaTek Inc., Title: Remaining Details on Bandwidth Part Operation in NR.
R1-1718365 3GPP TSG RAN WG1 Meeting #90bis, Prague, Czech Republic, Oct. 9-13, 2017, Source: InterDigital, Inc., Title: Remaining details of BWP.
R1-1718404 3GPP TSG RAN WG1 Meeting #90bis, Prague, Czech Republic, Oct. 9-13, 2017, Source: AT&T, Title: Remaining details for bandwidth parts.
R1-1718523 3GPP TSG RAN WG1 Meeting #90bis, Prague, Czech Republic, Oct. 9-13, 2017, Source: Ericsson, Title: On bandwidth parties.
R1-1718580 3GPP TSG RAN WG1 Meeting #90bis, Prague, Czech Republic, Oct. 9-13, 2017, Source: Qualcomm Incorporated, Title: Open Issues on BWP.
R1-1718607 3GPP TSG RAN WG1 Meeting #90bis, Prague, Czech Republic, Oct. 9-13, 2017, Source: Nokia, Nokia Shanghai Bell, Title: On remaining aspects of BWPs.
R1-1715454 3GPP TSG RAN WG1 Meeting NR Ad Hoc, Nagoya, Japan, Sep. 18-21, 2017, Source: ZTE, Sanechips, Title: On NR Power Control.
R1-1715478 3GPP TSG RAN WG1 Meeting NR Ad Hoc, Nagoya, Japan, Sep. 18-21, 2017, Source: Huawei, HiSilicon, Title: General considerations on UL power control design.
R1-1715505 3GPP TSG RAN WG1 Meeting NR Ad Hoc, Nagoya, Japan, Sep. 18-21, 2017, Source: Mitsubishi Electric, Title: UL transmission power control.
R1-1715651 3GPP TSG RAN WG1 Meeting NR Ad Hoc, Nagoya, Japan, Sep. 18-21, 2017, Source: vivo, Title: NR UL power control framework.
R1-1715675 3GPP TSG RAN WG1 Meeting NR Ad Hoc, Nagoya, Japan, Sep. 18-21, 2017, Source: Guangdong OPPO Mobile Telecom, Title: Uplink power control mechanism for NR.
R1-1715838 3GPP TSG RAN WG1 Meeting NR Ad Hoc, Nagoya, Japan, Sep. 18-21, 2017, Source: CATT, Title: NR Power Control Framework.
R1-1715902 3GPP TSG RAN WG1 Meeting NR Ad Hoc, Nagoya, Japan, Sep. 18-21, 2017, Source: LG Electronics, Title: Discussion on UL power control for NR.
R1-1716040 3GPP TSG RAN WG1 Meeting NR Ad Hoc, Nagoya, Japan, Sep. 18-21, 2017, Source: Samsung, Title: On UL Power Control.
R1-1716061 3GPP TSG RAN WG1 Meeting NR Ad Hoc, Nagoya, Japan, Sep. 18-21, 2017, Source: CMCC, Title: Discussion on power control framework.
Sep. 26, 2019—European Extended Search Report—EP 19175077.7.
R1-1718581 3GPP TSG RAN WG1 Meeting #90bis, Prague, Czech Republic, Oct. 9-13, 2017, Source: Qualcomm Incorporated, Title: Open Issues on CA.
U.S. Appl. No. 16/171,966, Activation and Deactivation of Configured Grant, filed Oct. 26, 2018.
U.S. Appl. No. 16/171,800, Group Common DCI for Wireless Resources, filed Oct. 26, 2018.
U.S. Appl. No. 16/185,821, CSI Transmission with Multiple Bandwidth Parts, filed Nov. 9, 2018.
U.S. Appl. No. 16/193,931, Power Control for Bandwidth Part Switching, filed Nov. 16, 2018.
U.S. Appl. No. 16/413,128, Multiple Active Bandwidth Parts, filed May 15, 2019.
U.S. Appl. No. 16/414,344, Multiple Active Bandwidth Parts, filed May 16, 2019.
U.S. Appl. No. 16/415,046, Cross-Carrier Scheduling with Multiple Active Bandwidth Parts, filed May 17, 2019.
U.S. Appl. No. 16/418,078, Random Access Procedures Using Multiple Active Bandwidth Parts, filed May 21, 2019.
U.S. Appl. No. 16/418,411, Random Access Procedures Using Multiple Active Bandwidth Parts, filed May 21, 2019.
U.S. Appl. No. 16/418,699, Failure Detection and Recovery for Multiple Active Resources, filed May 21, 2019.
U.S. Appl. No. 16/418,788, Failure Detection and Recovery for Multiple Active Resources, filed May 21, 2019.
U.S. Appl. No. 16/418,476, Random Access Procedures Using Multiple Active Bandwidth Parts, filed May 21, 2019.
U.S. Appl. No. 16/530,122, Uplink and Downlink Synchronization Procedures, filed Aug. 2, 2019.
Nov. 22, 2019—European Office Action—EP 18205418.9.
Jan. 3, 2020—European Extended Search Report—EP 19189782.6.
R2-1806991 3GPP TSG RAN WG2 Meeting #102, Busan, Korea, May 21-25, 2018, Source: CATT, Title: Further issues with switching of bandwidth part and random access.
R2-1809515 3GPP TSG RAN WG2 AH-1807, Montreal, Canada, Jul. 2-6, 2018, Source: CATT, Title: Further issues with DL BWP switching for CFRA.
R2-1810513 3GPP TSG RAN WG2 NR AH1807, Montreal, Canada, Jul. 2-6, 2018, Source: Huawei, HiSilicon, Title: Clarification on RA procedure for BFR on BWPs without CBRA occasions.
Jun. 25, 2020—European Office Action—EP 19166254.3.
Jan. 26, 2021—European Office Action—EP 19166254.3.

* cited by examiner

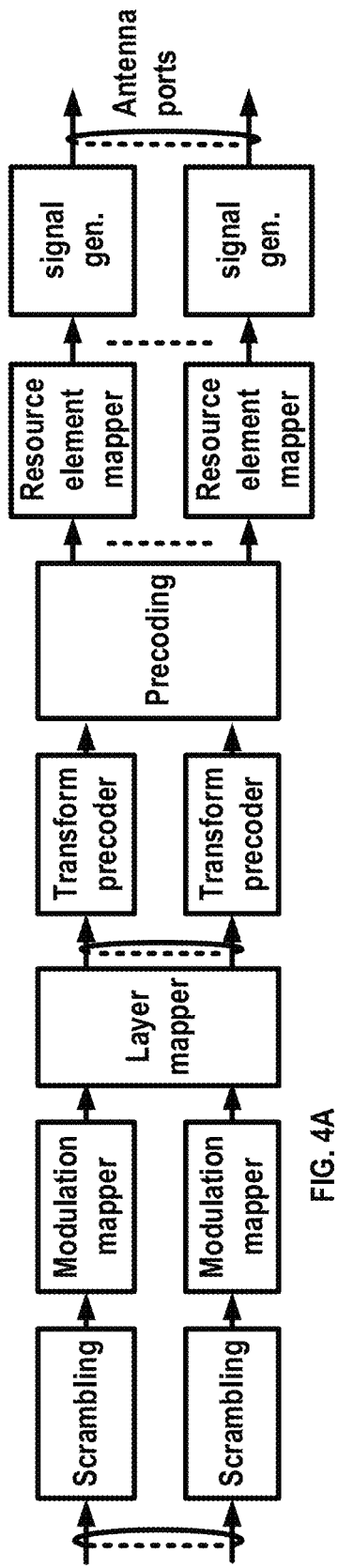
FIG. 4A
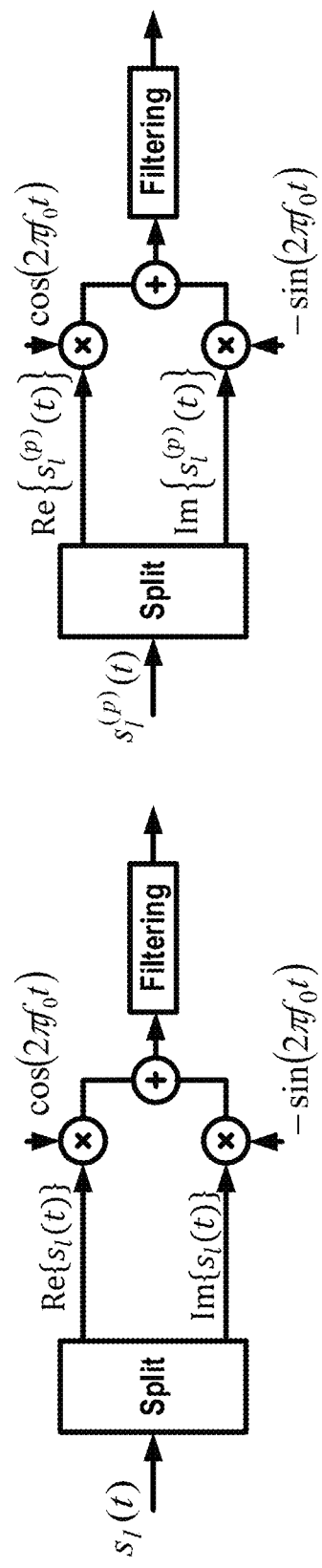
FIG. 4B
FIG. 4D
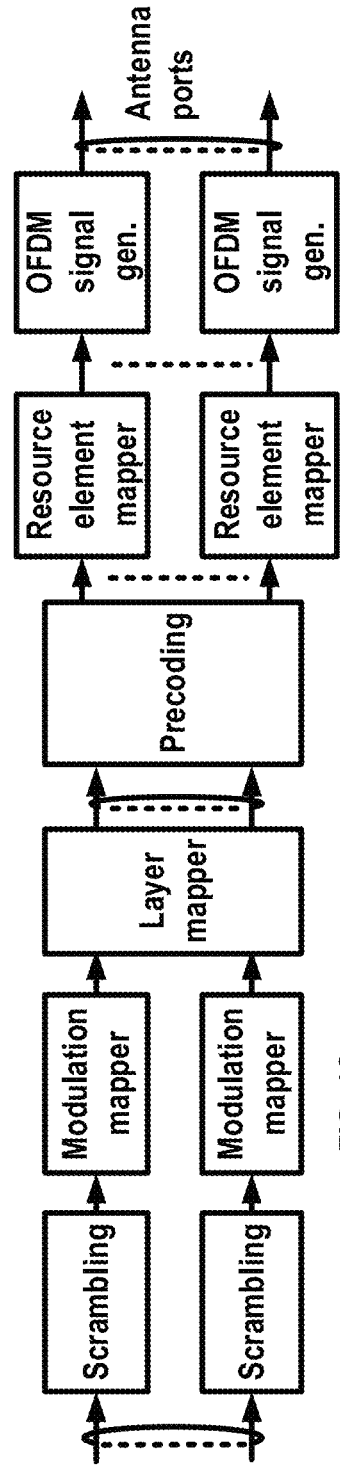
FIG. 4C

| Index | LCID values |
|---|---|
| 000000 | CCCH |
| 000001-100000 | Identity of a logical channel |
| 100001-110111 | Reserved |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18A

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 18B

BEAM FAILURE RECOVERY PROCEDURES USING BANDWIDTH PARTS

CROSS-REFERENCE TO RELATED APPLICATIONS

This application claims the benefit of U.S. Provisional Application No. 62/650,751, titled "Restarting Bandwidth Part Inactivity Timer in Beam Failure Recovery Procedure" and filed on Mar. 30, 2018. The above-referenced application is hereby incorporated by reference in its entirety.

BACKGROUND

Wireless communications may use bandwidth parts (BWPs) and other wireless resources. A wireless device may perform a beam failure recovery (BFR) procedure using a BWP. A base station may not be aware of the BFR procedure, for example, if the procedure in unsuccessful, which may cause a misalignment between the base station and the wireless device that may increase signaling overhead and/or decrease spectral efficiency.

SUMMARY

The following summary presents a simplified summary of certain features. The summary is not an extensive overview and is not intended to identify key or critical elements.

Systems, apparatuses, and methods are described for BFR procedures using BWPs. A wireless device may initiate a random access procedure for a BFR procedure on a secondary cell for a first BWP. The wireless device may initiate the random access procedure autonomously, for example, without a base station being aware of the random access procedure. Based on unsuccessfully completing the BFR procedure for the secondary cell, the wireless device may restart a BWP inactivity timer of the secondary cell, restart a BWP inactivity of a primary cell, and/or switch to a second BWP (e.g., a default BWP) of the secondary cell. Based on initiating the random access procedure on the secondary cell, the wireless device may allow the BWP inactivity timer of the primary cell to continue running (e.g., the wireless device may refrain from stopping the BWP inactivity timer of the primary cell). By performing one or more of the above operations, the wireless device may prevent and/or reduce timing misalignment between the wireless device and the base station, which may reduce latency, increase efficiency of resource usage, and/or conserve power.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C and FIG. 4D show examples of uplink and downlink signal transmission.

FIG. 18A and FIG. 18B show examples of logical channel identifiers (LCIDs).

DETAILED DESCRIPTION

Figure 1:
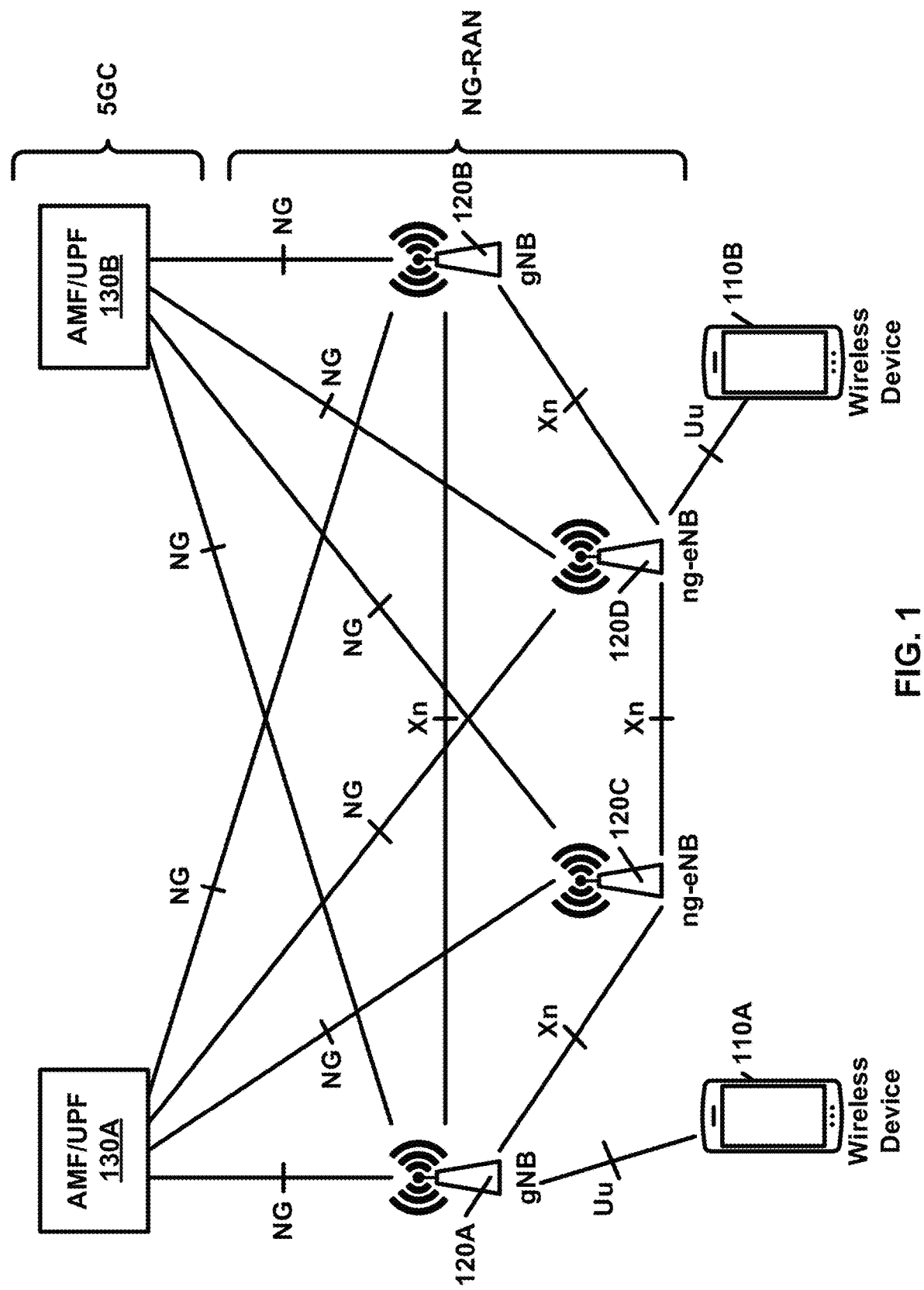
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to beam failure recovery procedures in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
FI-C FI-Control plane
FI-U FI-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
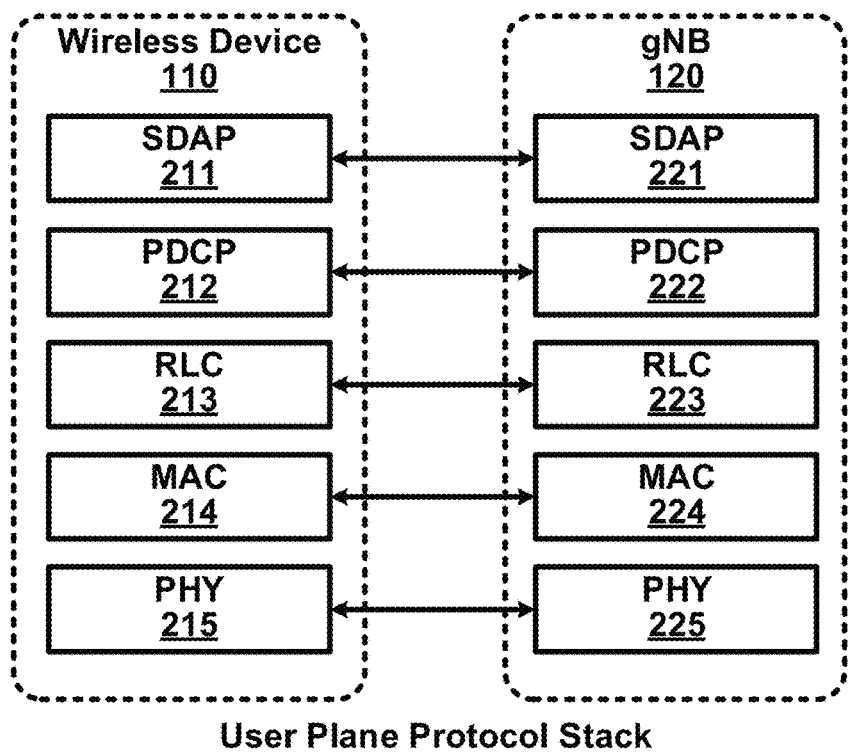
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Media Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
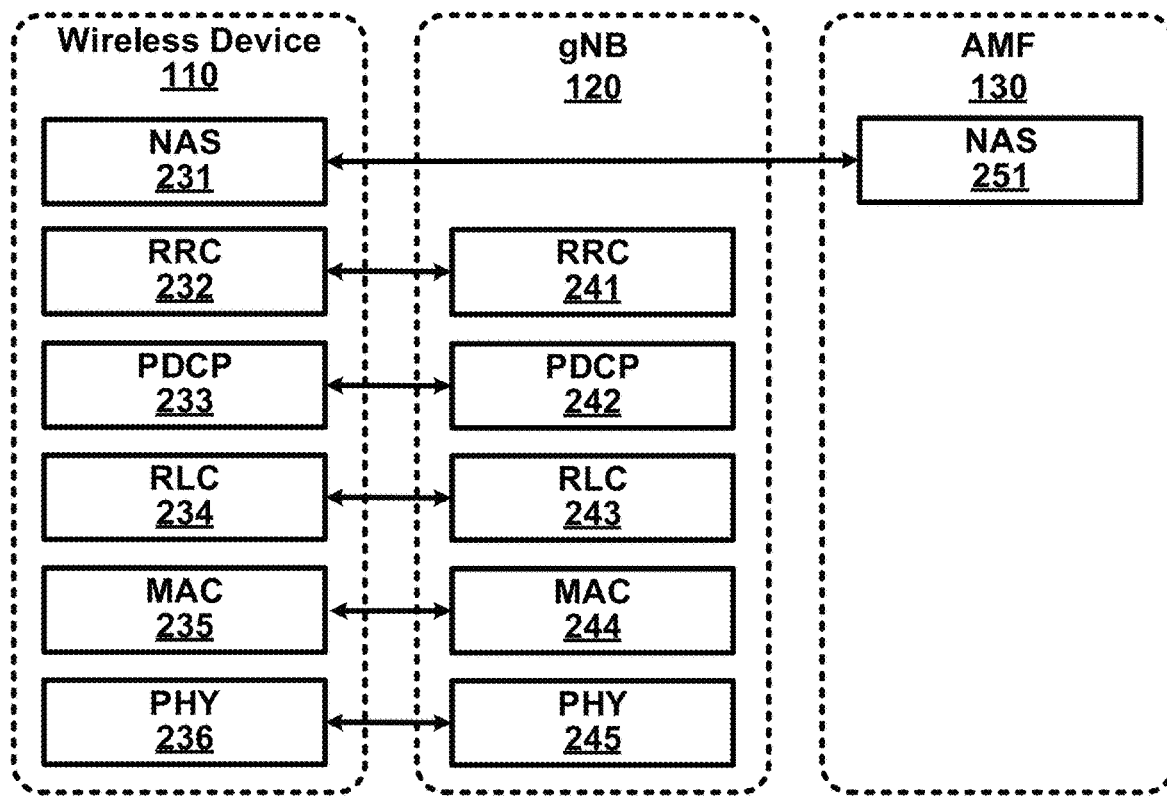
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MA CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
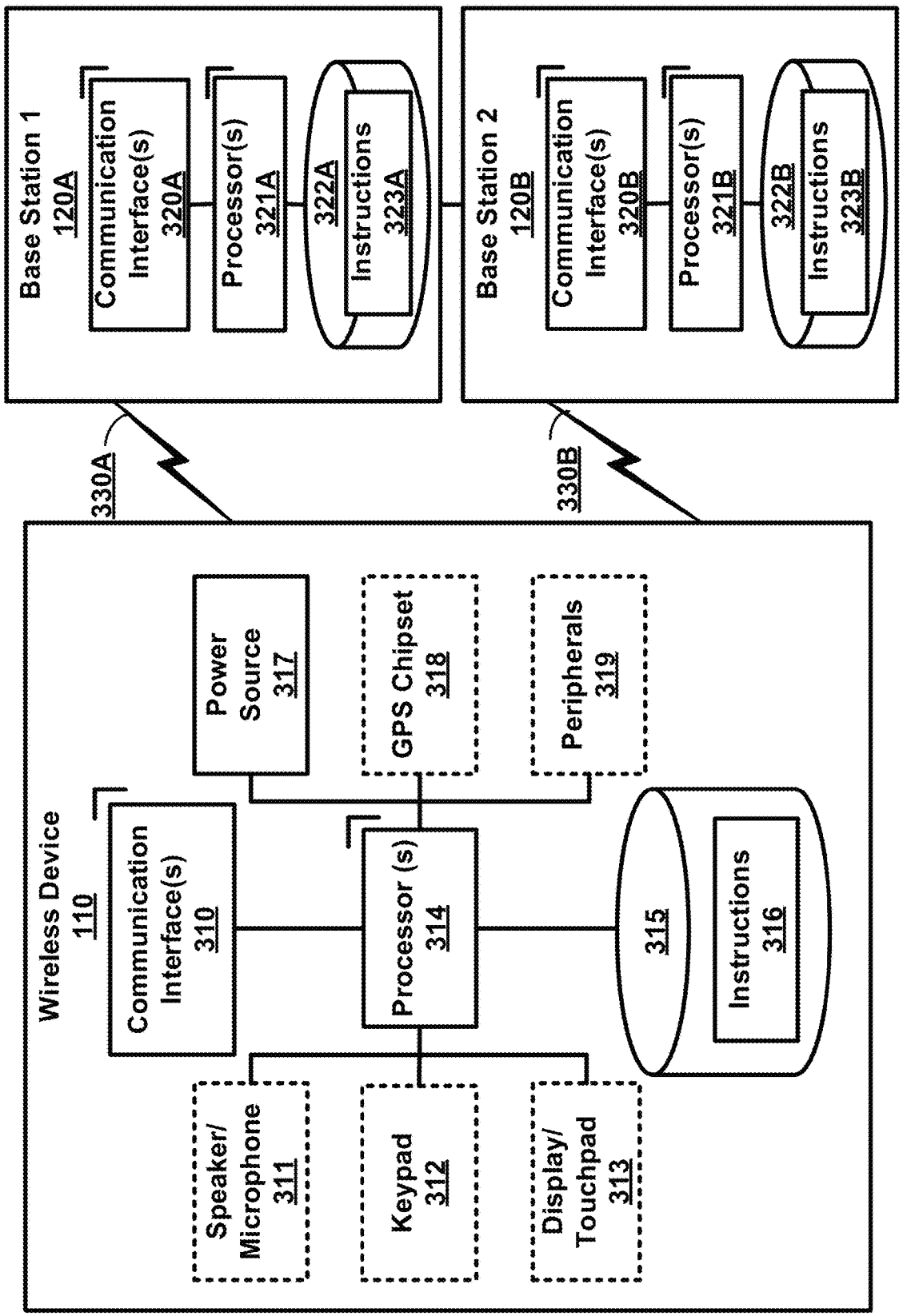
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signalling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
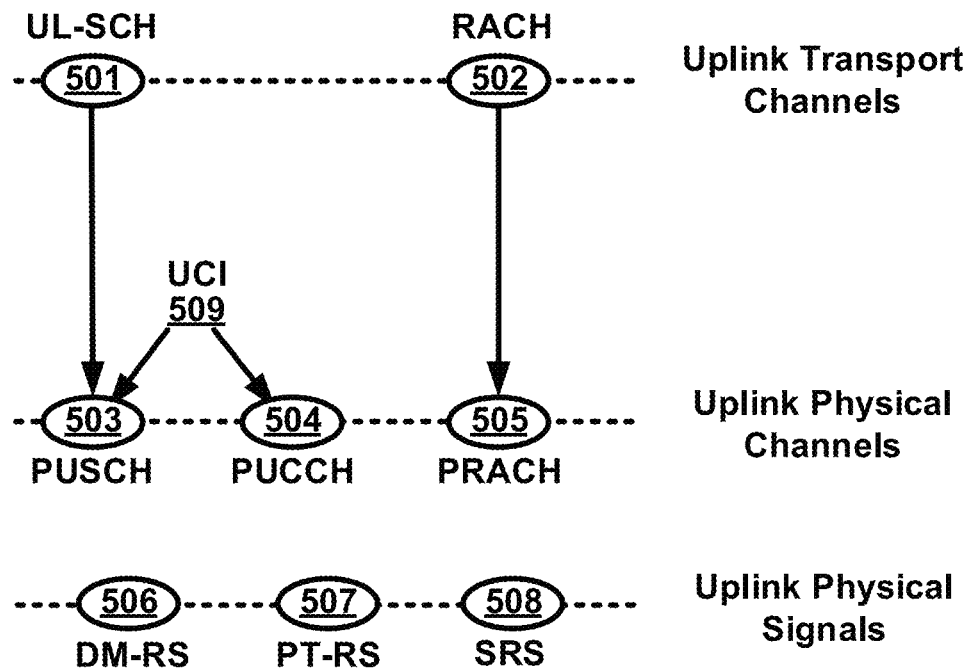
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
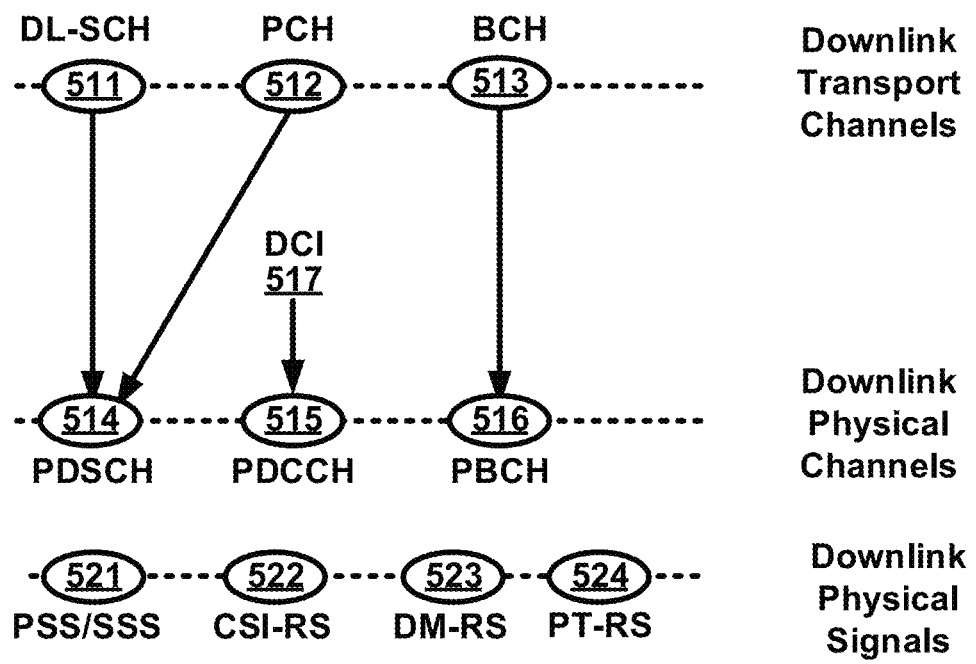
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
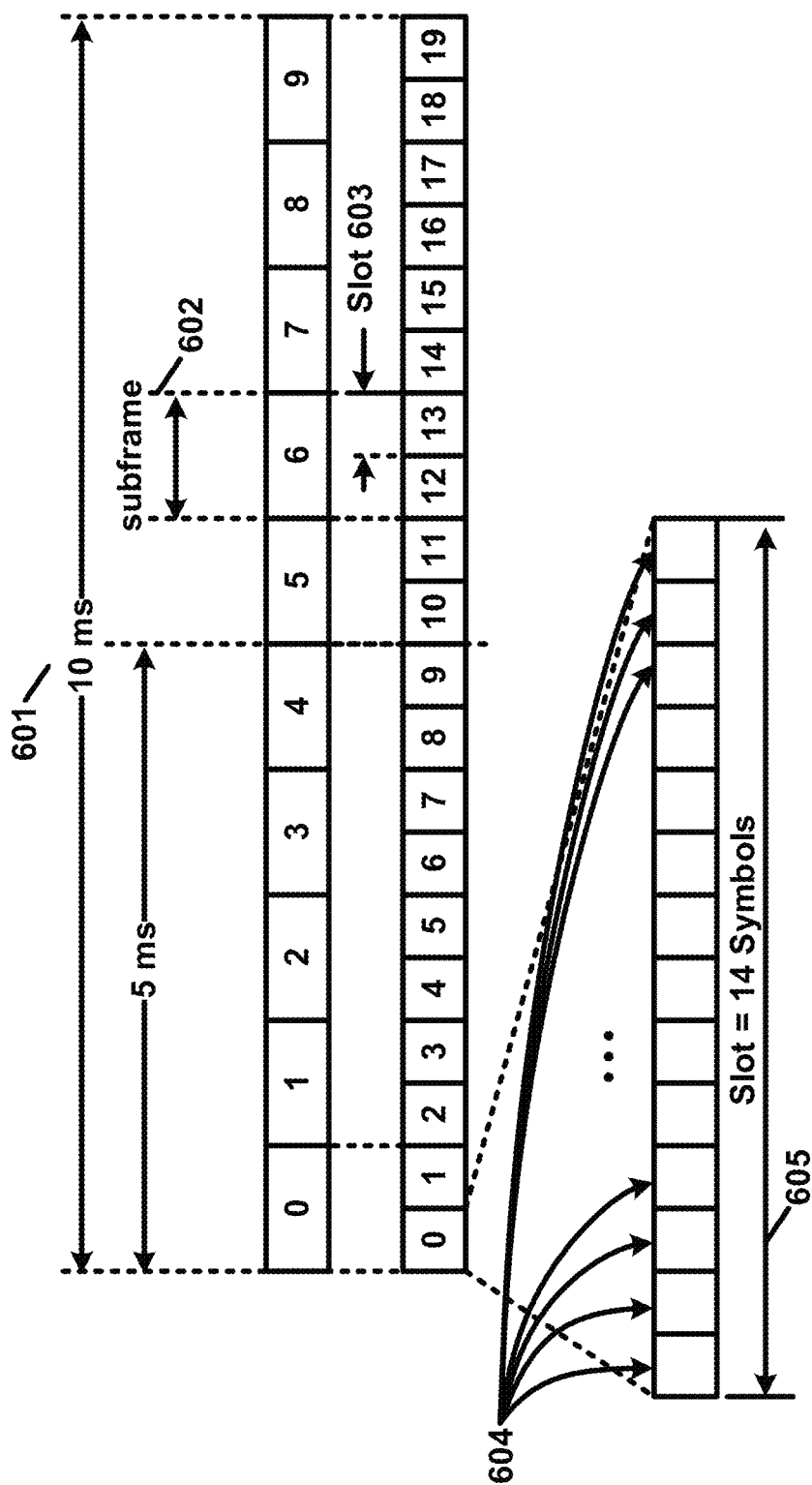
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
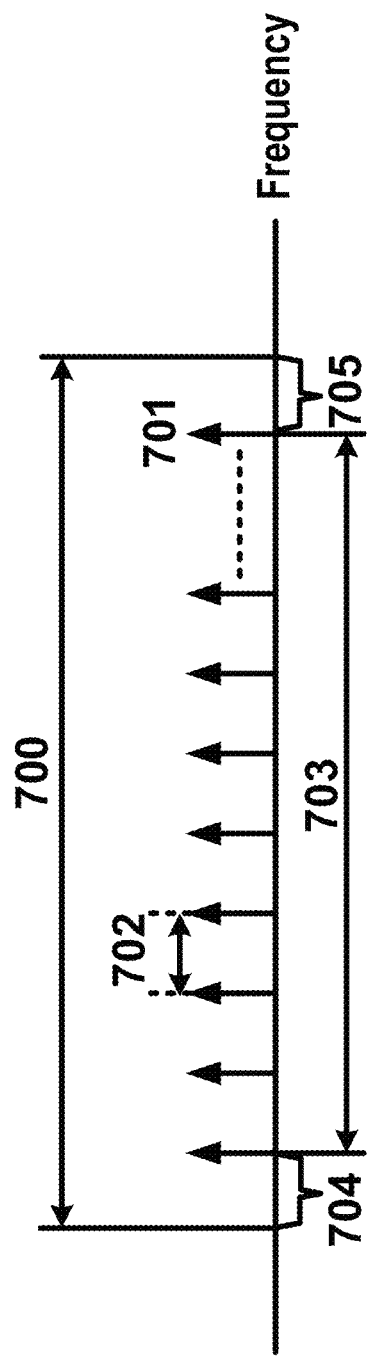
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
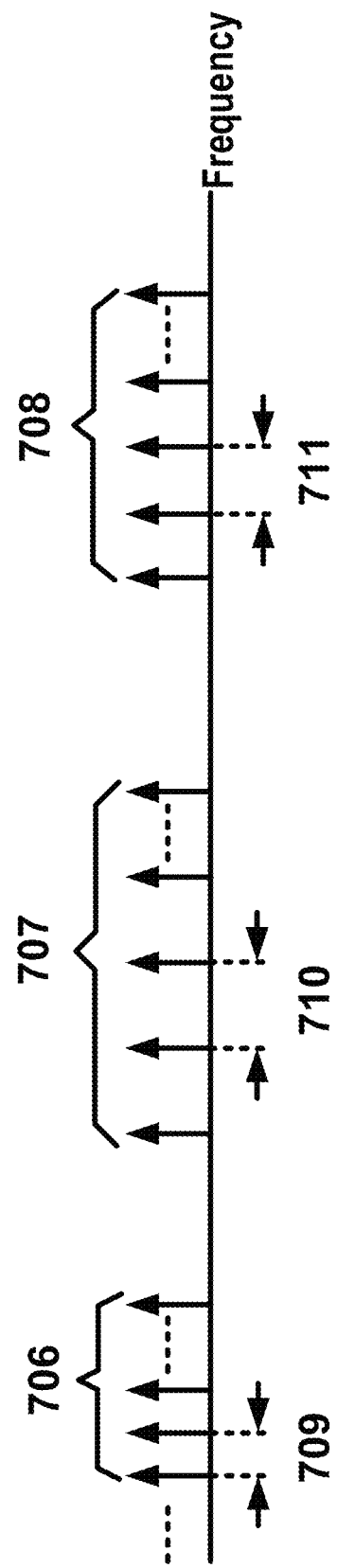

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
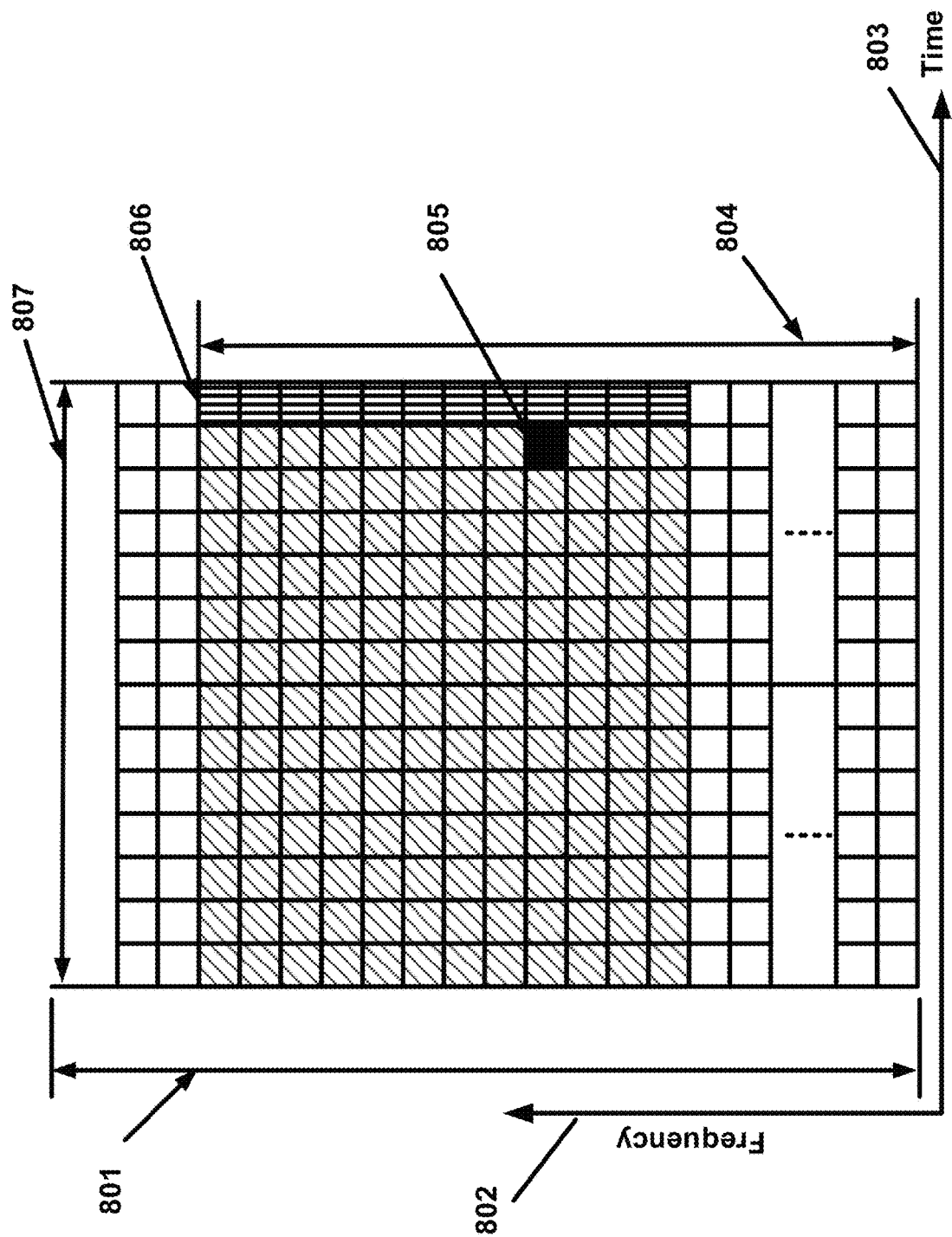
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message (s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
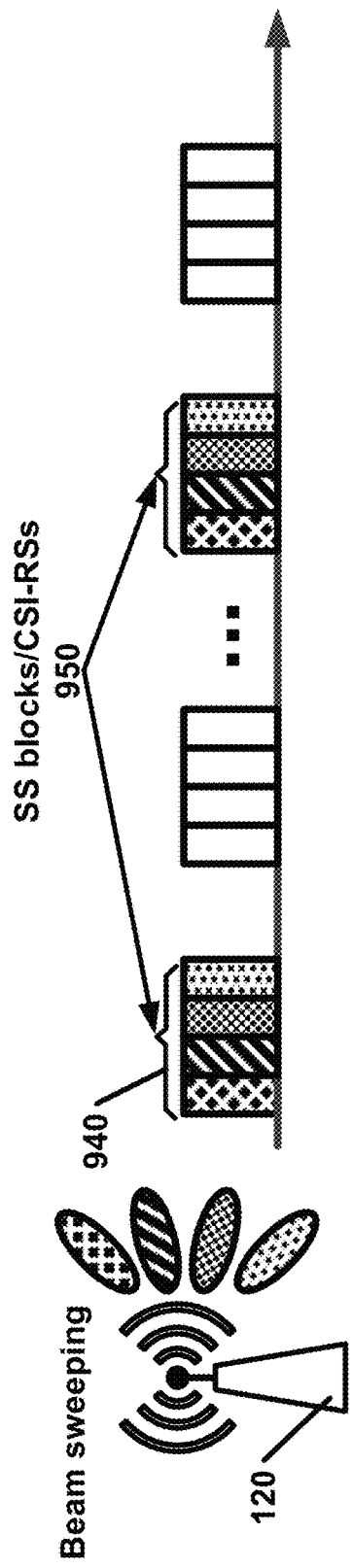
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
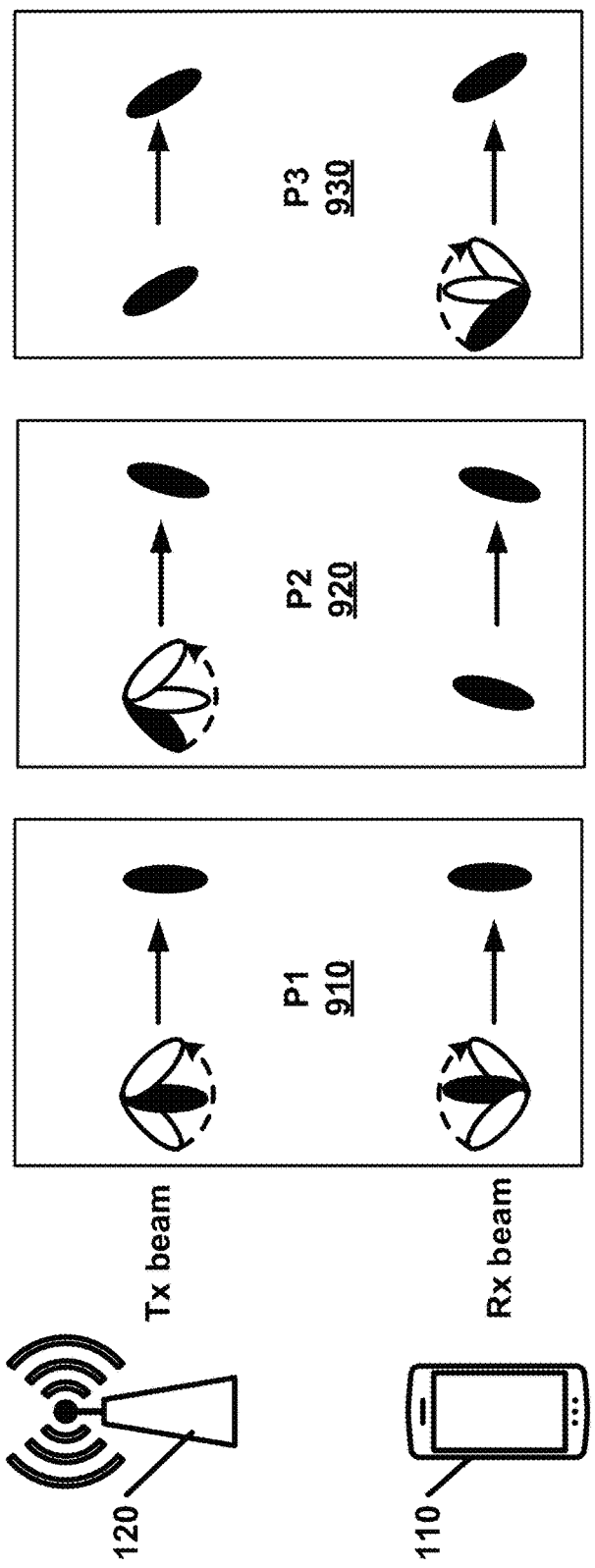
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth (s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
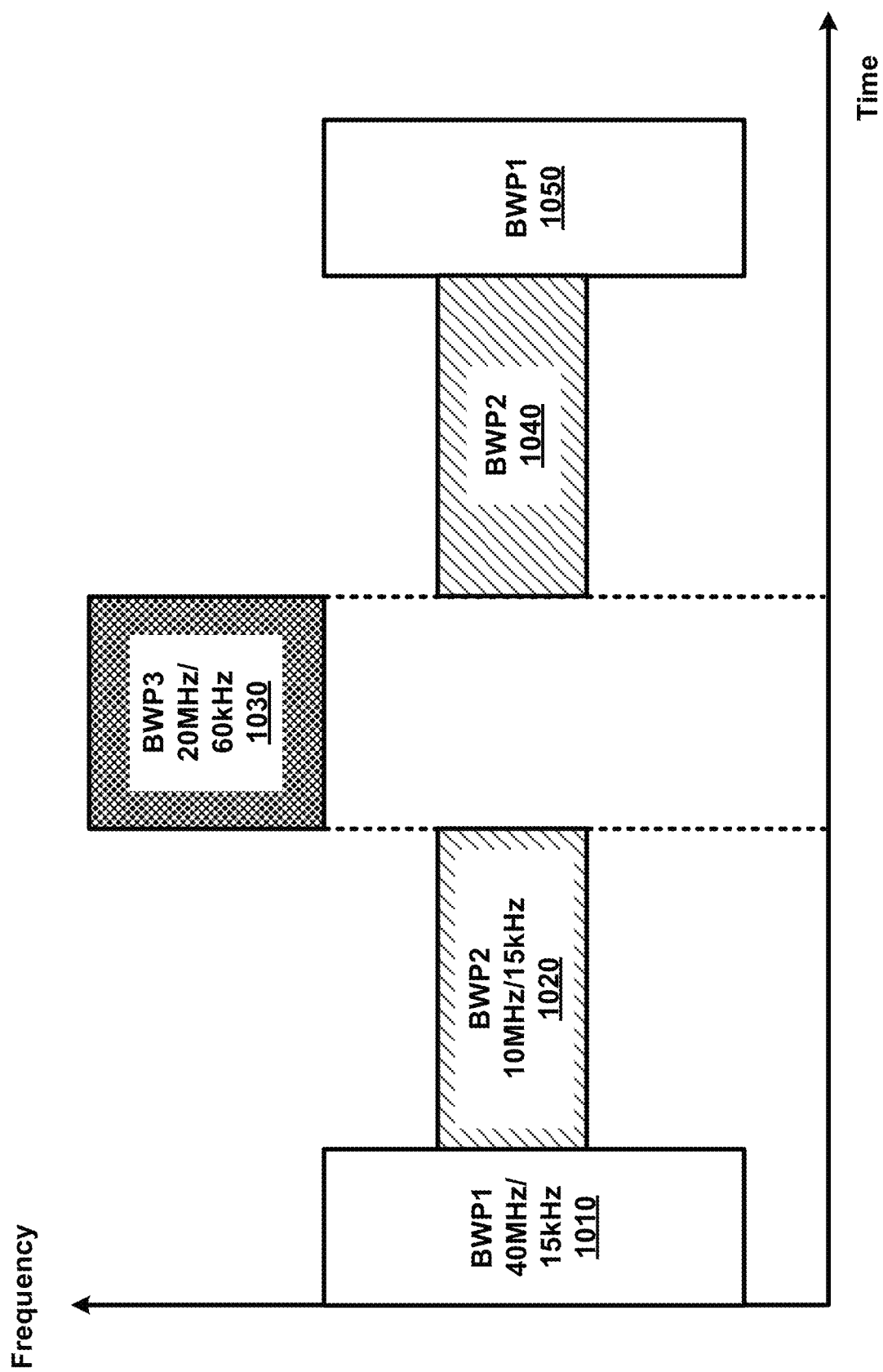
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base statin may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
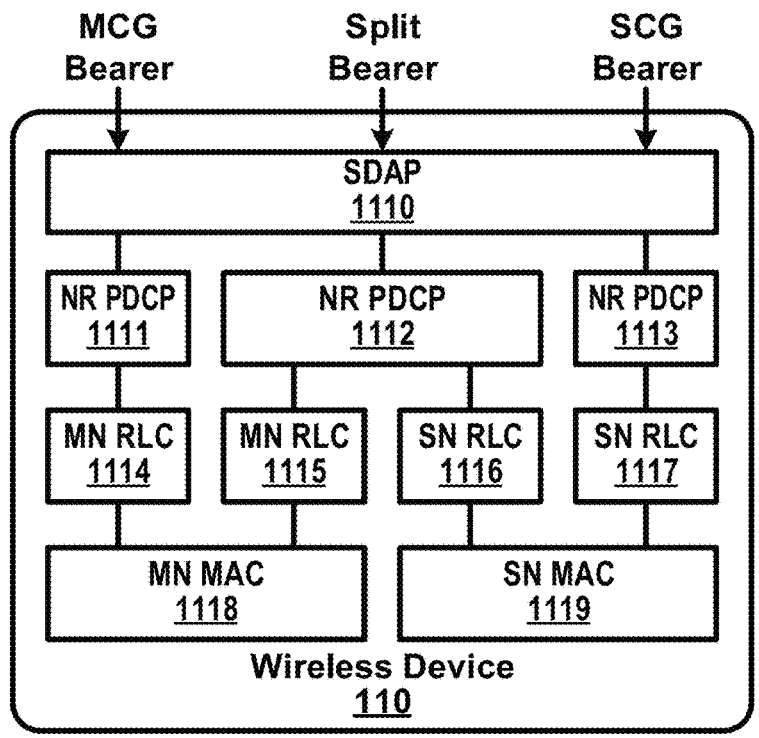
FIG. 11A and FIG. 11B show examples of multi connectivity.
Figure 11B:
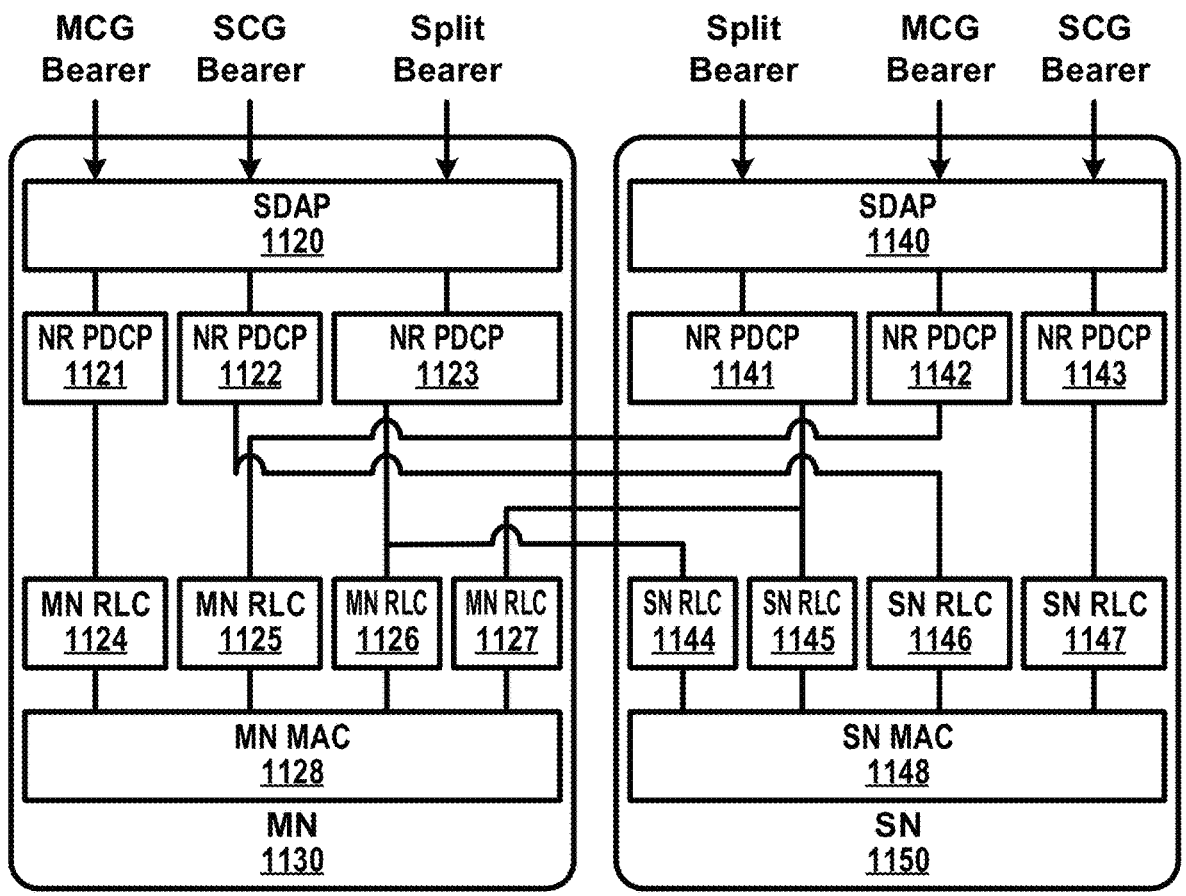

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
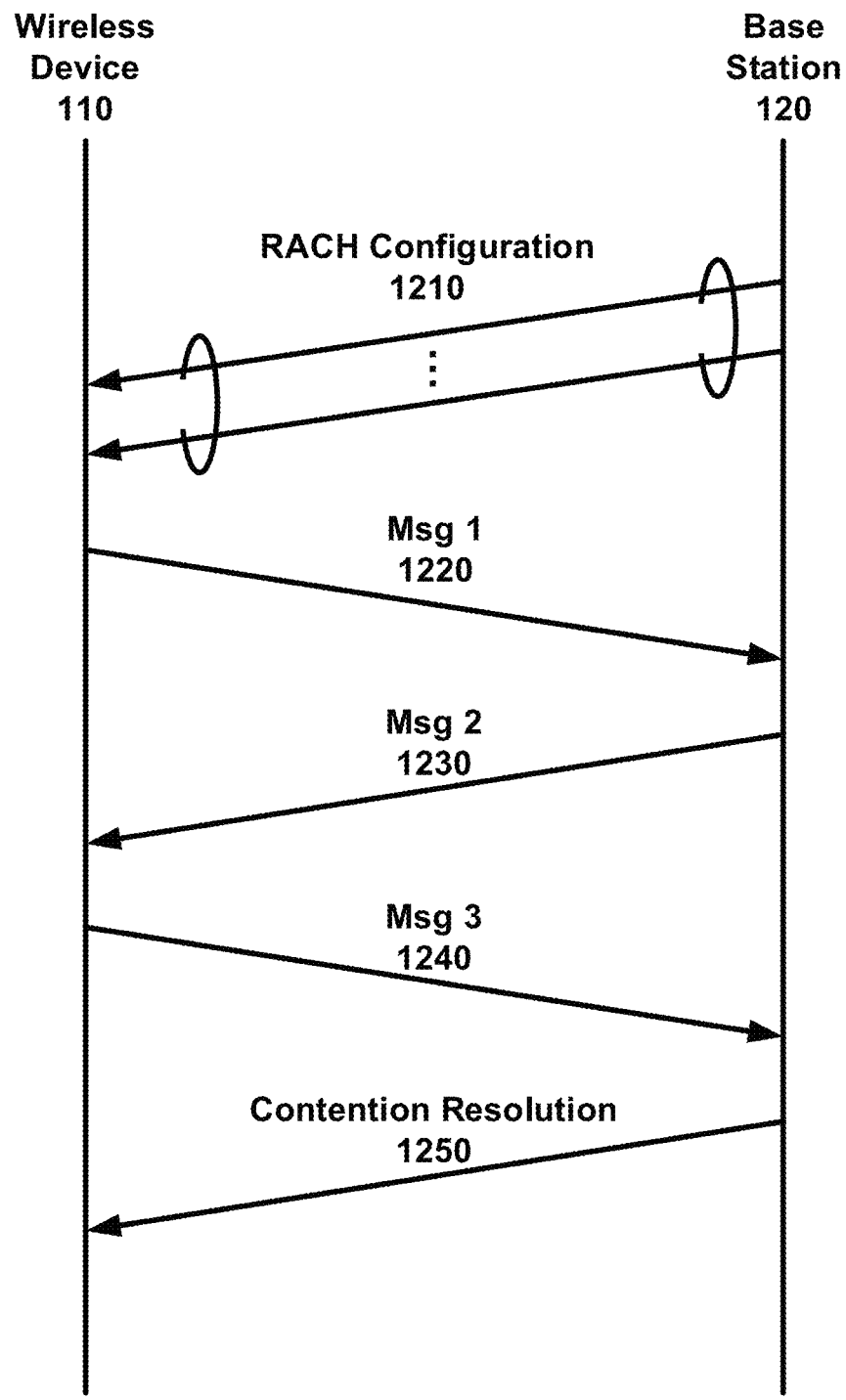
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery procedure and corresponding PRACH resource(s) (e.g., if any), a time window to monitor RA response(s), a time window to monitor response(s) on a beam failure recovery procedure, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery procedure associated with at least one of SS blocks and/or CSI-RSs. A wireless device may select a random access preamble index corresponding to a selected SS block or a CSI-RS from a set of one or more random access preambles for a beam failure recovery procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery procedure. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
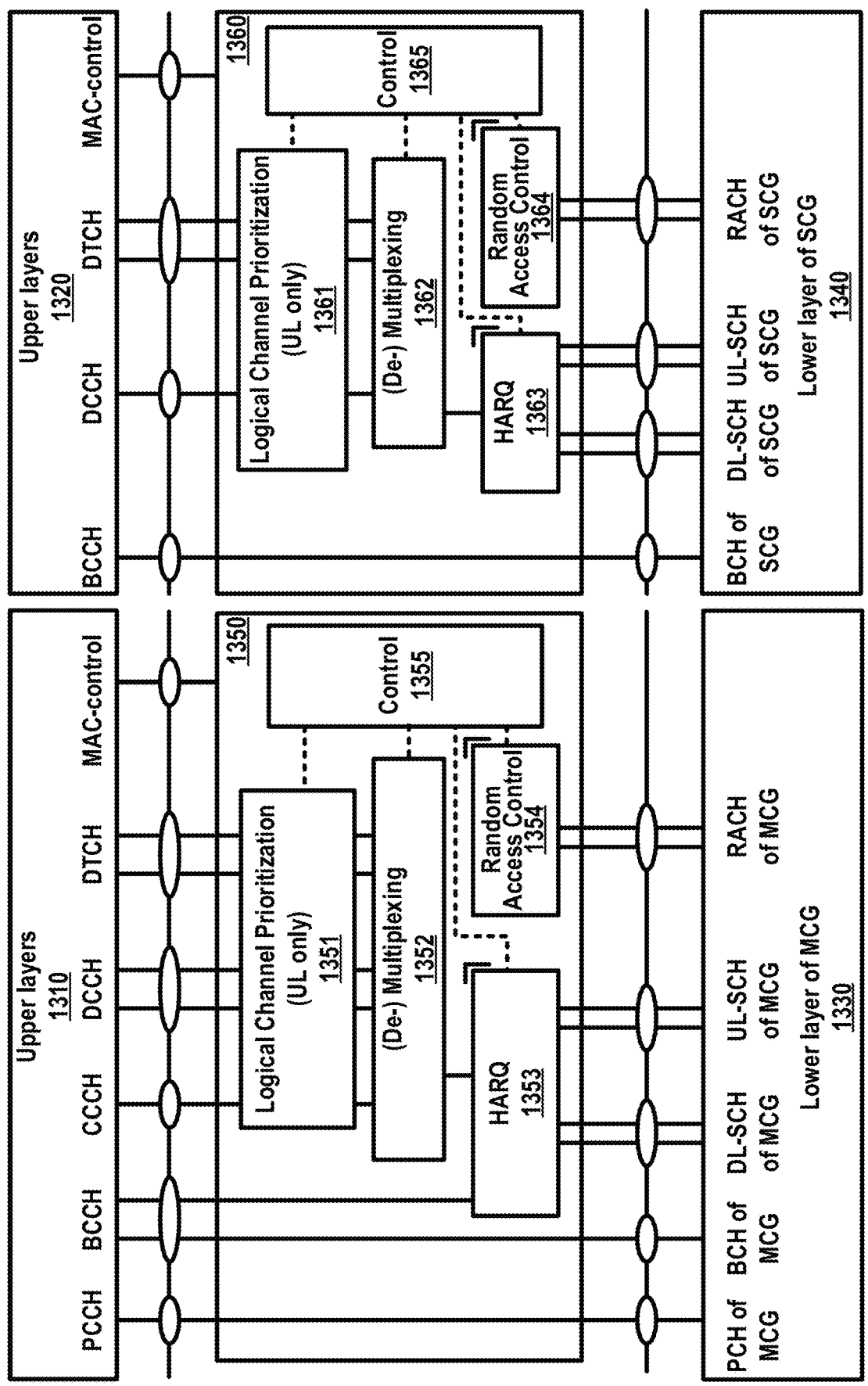
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
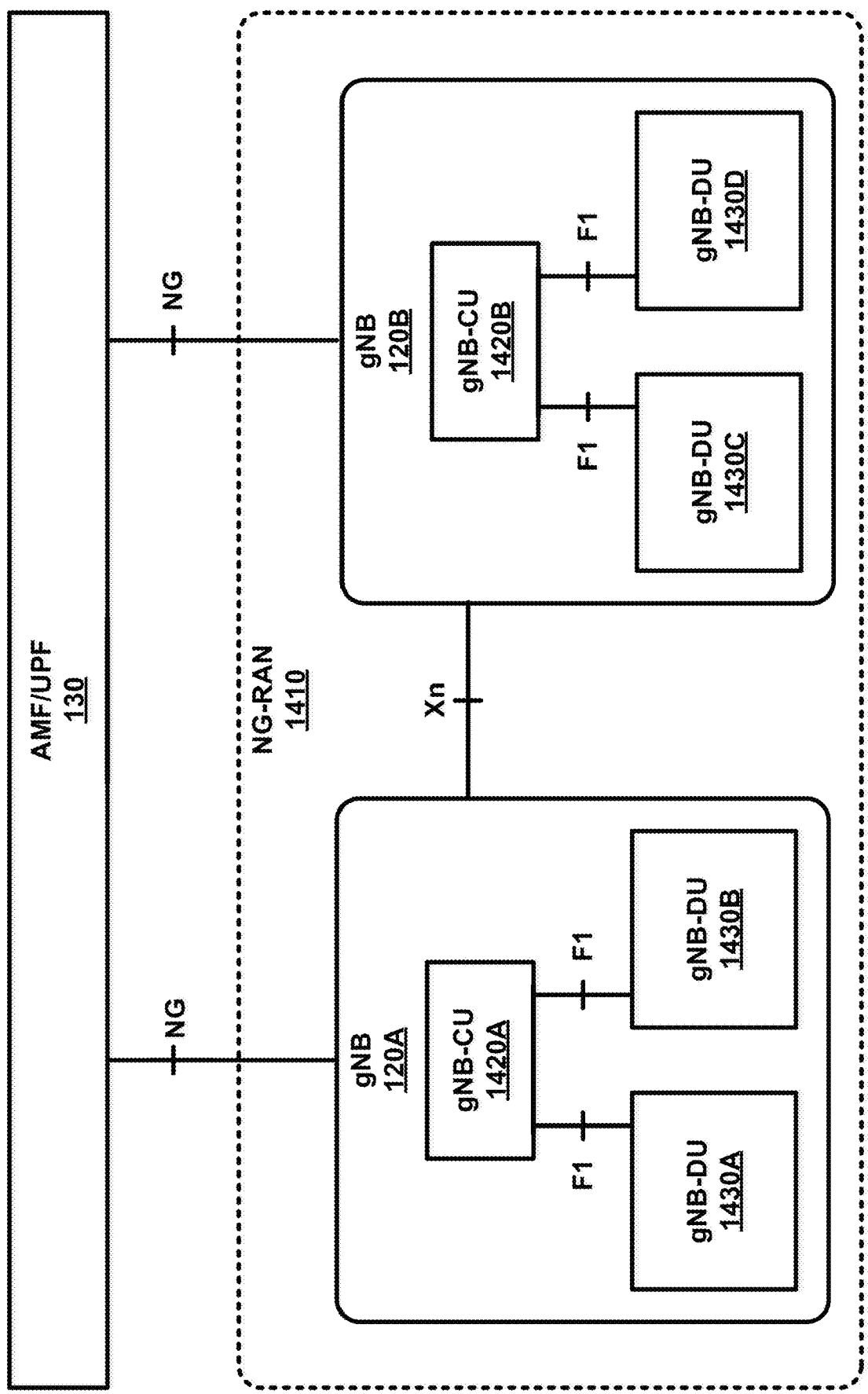
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
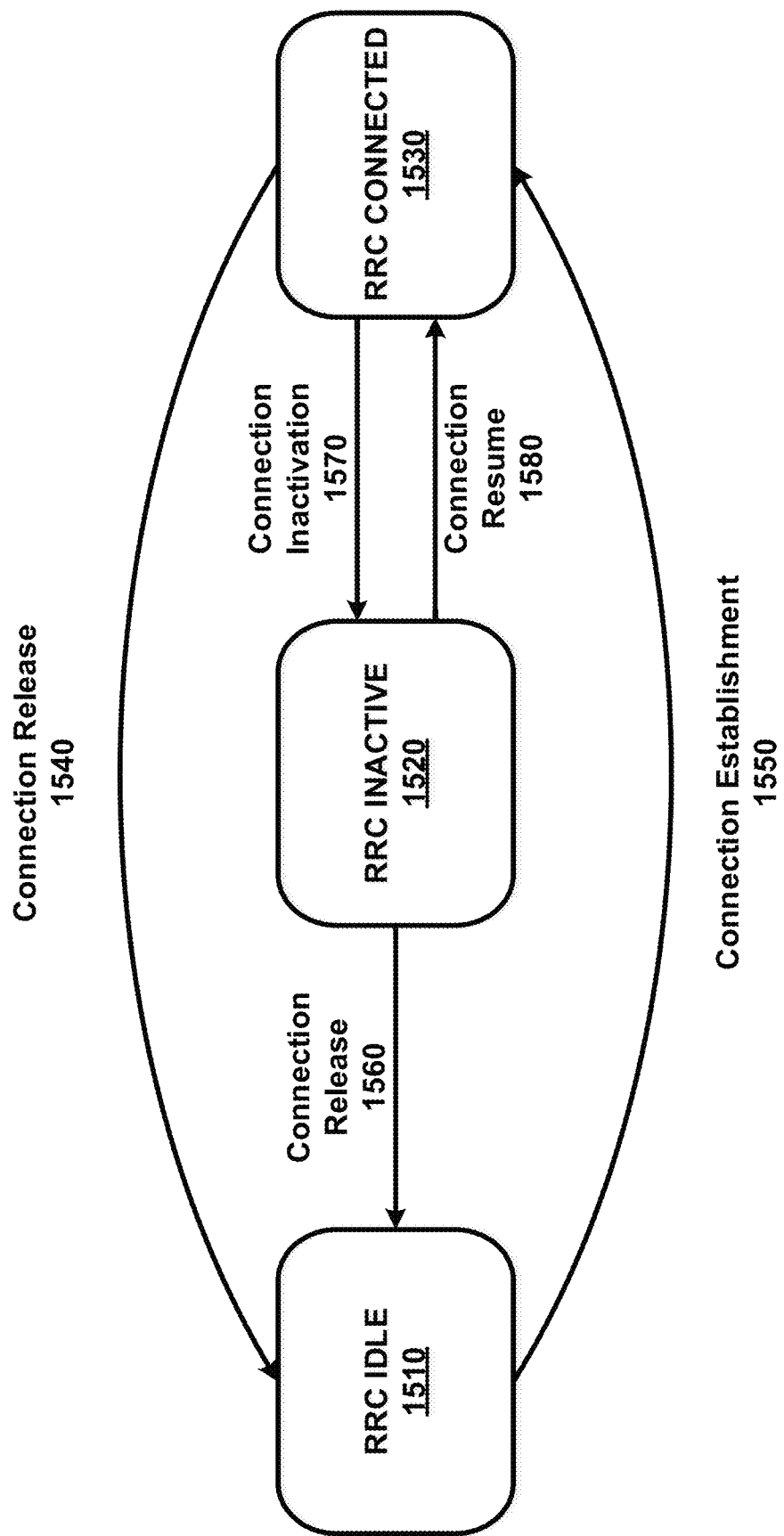
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station may send (e.g., transmit) one or more MAC PDUs to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and with the last and least significant bit in the rightmost bit.

A MAC SDU may comprise a bit string that is byte aligned (e.g., multiple of eight bits) in length. A MAC SDU may be included in a MAC PDU, for example, from the first bit onward. In an example, a MAC CE may be a bit string that is byte aligned (e.g., multiple of eight bits) in length. A MAC subheader may be a bit string that is byte aligned (e.g., multiple of eight bits) in length. A MAC subheader may be placed immediately in front of the corresponding MAC SDU, MAC CE, and/or padding. A MAC entity may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; an L field with multiple bits in length, for example, if the MAC subheader corresponds to a MAC SDU, a variable-sized MAC CE, and/or padding.

Figure 16A:
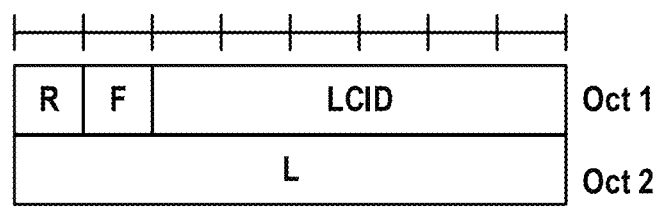
FIG. 16A, FIG. 16B and FIG. 16C show examples of MAC subheaders.

FIG. 16A shows an example of a MAC subheader comprising an eight-bit L field. The LCID field may have six bits in length. The L field may have eight bits in length.

Figure 16B:
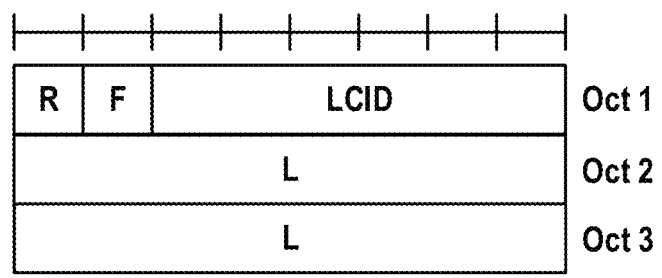

FIG. 16B shows an example of a MAC subheader with a sixteen-bit L field. The LCID field may have six bits in length. The L field may have sixteen bits in length. A MAC subheader may comprise: a R field comprising two bits in length; and an LCID field comprising multiple bits in length (e.g., if the MAC subheader corresponds to a fixed sized MAC CE), and/or padding.

Figure 16C:
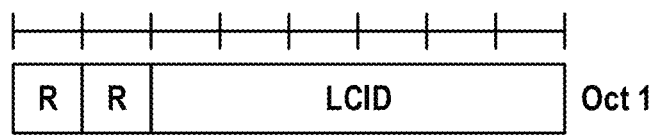

FIG. 16C shows an example of the MAC subheader. The LCID field may comprise six bits in length, and the R field may comprise two bits in length.

Figure 17A:
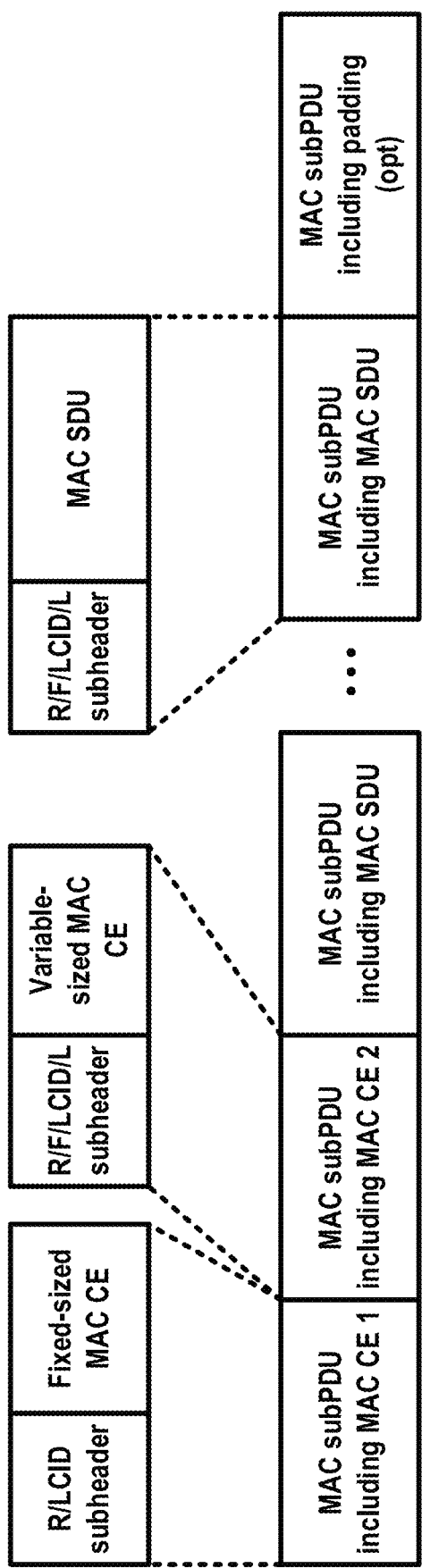
FIG. 17A and FIG. 17B show examples of MAC packet data units (PDUs).

FIG. 17A shows an example of a DL MAC PDU. Multiple MAC CEs may be placed together. A MAC subPDU comprising MAC CE may be placed before any MAC subPDU comprising a MAC SDU, and/or before a MAC subPDU comprising padding.

Figure 17B:
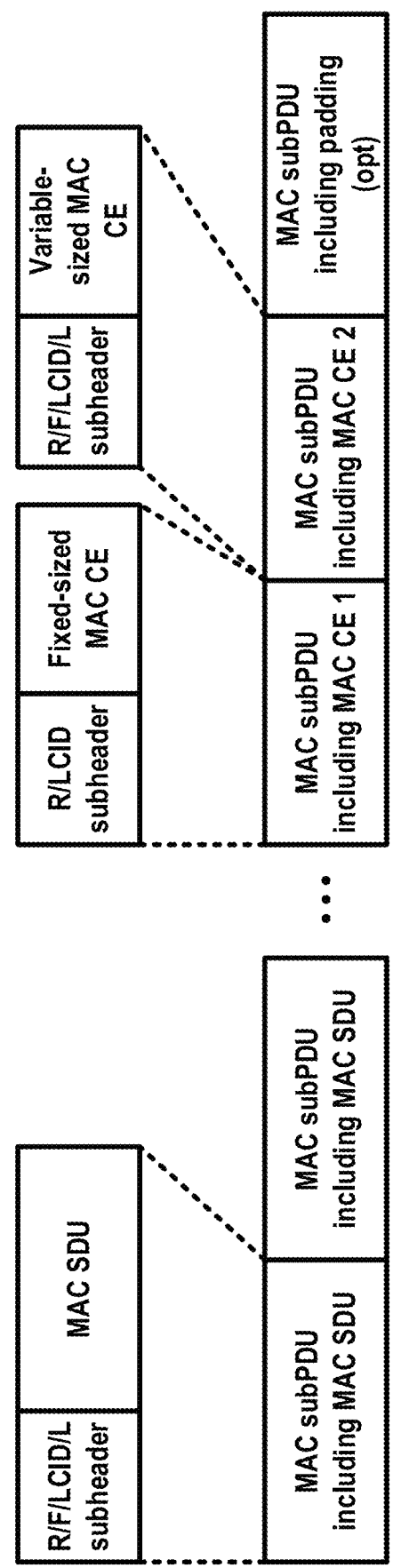

FIG. 17B shows an example of a UL MAC PDU. Multiple MAC CEs may be placed together. A MAC subPDU comprising a MAC CE may be placed after all MAC subPDU comprising a MAC SDU. The MAC subPDU may be placed before a MAC subPDU comprising padding.

FIG. 18A shows examples of multiple LCIDs associated with the one or more MAC CEs. A MAC entity of a base station may send (e.g., transmit) to a MAC entity of a wireless device one or more MAC CEs. The one or more MAC CEs may comprise at least one of: a wireless device (e.g., UE) contention resolution identity MAC CE; a timing advance command MAC CE; a DRX command MAC CE; a long DRX command MAC CE; an SCell activation and/or deactivation MAC CE (e.g., 1 Octet); an SCell activation and/or deactivation MAC CE (e.g., 4 Octet); and/or a duplication activation and/or deactivation MAC CE. A MAC CE may comprise an LCID in the corresponding MAC subheader. Different MAC CEs may have different LCID in the corresponding MAC subheader. An LCID with 111011 in a MAC subheader may indicate a MAC CE associated with the MAC subheader is a long DRX command MAC CE.

FIG. 18B shows further examples of LCIDs associated with one or more MAC CEs. The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry power headroom report (PHR) MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. The LCID with 111011 in a MAC subheader may indicate a MAC CE associated with the MAC subheader is a short-truncated command MAC CE.

Two or more component carriers (CCs) may be aggregated, for example, in a carrier aggregation (CA). A wireless device may simultaneously receive and/or transmit on one or more CCs, for example, depending on capabilities of the wireless device. The CA may be supported for contiguous CCs. The CA may be supported for non-contiguous CCs.

A wireless device may have one RRC connection with a network, for example, if configured with CA. At (e.g., during) an RRC connection establishment, re-establishment and/or handover, a cell providing a NAS mobility information may be a serving cell. At (e.g., during) an RRC connection re-establishment and/or handover procedure, a cell providing a security input may be a serving cell. The serving cell may be referred to as a primary cell (PCell). A base station may send (e.g., transmit), to a wireless device, one or more messages comprising configuration parameters of a plurality of one or more secondary cells (SCells), for example, depending on capabilities of the wireless device.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an sCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivationTimer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivationTimer timer) associated with an activated SCell expires. The wireless device may stop the timer (e.g., sCellDeactivationTimer timer) associated with the activated SCell, for example, after or in response to deactivating the activated SCell. The wireless device may clear one or more configured downlink assignments and/or one or more configured uplink grant Type 2 associated with the activated SCell, for example, after or in response to the deactivating the activated SCell. The wireless device may suspend one or more configured uplink grant Type 1 associated with the activated SCell, for example, after or in response to deactivating the activated SCell. The wireless device may flush HARQ buffers associated with the activated SCell.

A wireless device may not perform certain operations, for example, if an SCell is deactivated. The wireless device may not perform one or more of the following operations if an SCell is deactivated: transmitting SRS on the SCell; reporting CQI, PMI, RI, and/or CRI for the SCell on a PCell;

transmitting on UL-SCH on the SCell; transmitting on a RACH on the SCell; monitoring at least one first PDCCH on the SCell; monitoring at least one second PDCCH for the SCell on the PCell; and/or transmitting a PUCCH on the SCell.

A wireless device may restart a timer (e.g., an sCellDeactivationTimer timer) associated with the activated SCell, for example, if at least one first PDCCH on an activated SCell indicates an uplink grant or a downlink assignment. A wireless device may restart a timer (e.g., an sCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

FIG. 18A shows first examples of LCIDs. FIG. 18B shows second examples of LCIDs. The left columns comprise indices. The right columns comprises corresponding LCID values for each index.

Figure 19A:
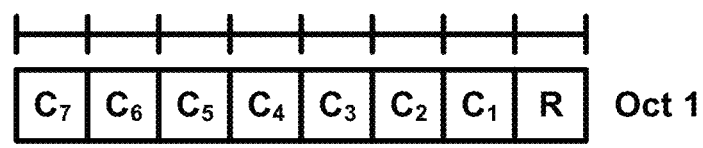
FIG. 19A and FIG. 19B show examples of SCell activation/deactivation MAC control elements (CEs).

FIG. 19A shows an example of an SCell activation/deactivation MAC CE of one octet. A first MAC PDU subheader comprising a first LCID may identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

Figure 19B:
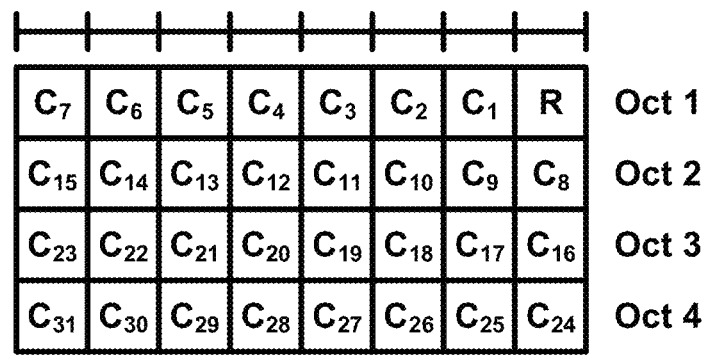

FIG. 19B shows an example of an SCell Activation/Deactivation MAC CE of four octets. A second MAC PDU subheader with a second LCID may identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A C_i field may indicate an activation/deactivation status of an SCell with an SCell index i. An SCell with an SCell index i may be activated, for example, if the C_i field is set to one. An SCell with an SCell index i may be deactivated, for example, In an example, if the C_i field is set to zero. An R field may indicate a reserved bit. The R field may be set to zero.

A base station may configure a wireless device with uplink (UL) bandwidth parts (BWPs) and downlink (DL) BWPs, for example, to enable bandwidth adaptation (BA) for a PCell. The base station may configure the wireless device with at least DL BWP(s) (e.g., an SCell may not have UL BWPS) to enable BA for an SCell, for example, if CA is configured. For the PCell, a first initial BWP may be a first BWP used for initial access. For the SCell, a second initial BWP may be a second BWP configured for the wireless device to first operate on the SCell if the SCell is activated.

A first DL and a first UL may switch BWP independently, for example, in paired spectrum (e.g., FDD). A second DL and a second UL may switch BWP simultaneously, for example, in unpaired spectrum (e.g., TDD). Switching between configured BWPs may be based on DCI and/or an inactivity timer. An expiry of the inactivity timer associated with a cell may switch an active BWP to a default BWP, for example, if the inactivity timer is configured for a serving cell. The default BWP may be configured by the network.

One UL BWP for each uplink carrier and one DL BWP may be active at a time in an active serving cell, for example, in FDD systems configured with BA. One DL/UL BWP pair may be active at a time in an active serving cell, for example, in TDD systems. Operating on the one UL BWP and the one DL BWP (and/or the one DL/UL pair) may enable a wireless device to use a reasonable amount of power (e.g., reasonable battery consumption). BWPs other than the one UL BWP and the one DL BWP that the wireless device may be configured with may be deactivated. The wireless device may refrain from monitoring a PDCCH, and/or may refrain from transmitting via a PUCCH, PRACH and/or UL-SCH, for example, on deactivated BWPs.

A serving cell may be configured with a first number (e.g., four) of BWPs. A wireless device and/or a base station may have one active BWP at any point in time, for example, for an activated serving cell. A BWP switching for a serving cell may be used to activate an inactive BWP and/or deactivate an active BWP. The BWP switching may be controlled by a PDCCH indicating a downlink assignment or an uplink grant. The BWP switching may be controlled by an inactivity timer (e.g., bandwidthpartInactivityTimer). The BWP switching may be controlled by a MAC entity, for example, based on initiating a random access procedure. A BWP may be initially active without receiving a PDCCH indicating a downlink assignment or an uplink grant, for example, based on an addition of an SpCell or an activation of an SCell. The active BWP for a serving cell may be indicated by an RRC message and/or a PDCCH message (e.g., PDCCH order). A DL BWP may be paired with an UL BWP, and/or BWP switching may be common for both UL and DL, for example, for unpaired spectrum.

A MAC entity may use operations on an active BWP for an activated serving cell configured with a BWP, such as one or more of: transmitting via an UL-SCH; transmitting via a RACH; monitoring a PDCCH; transmitting via a PUCCH; receiving via a DL-SCH; initializing and/or reinitializing suspended configured uplink grants of configured grant Type 1 according to a stored configuration, if any and/or to start in a symbol based on a procedure. On an inactive BWP for each activated serving cell configured with a BWP, a MAC entity: may refrain from transmitting via an UL-SCH, may refrain from transmitting via a RACH, may refrain from monitoring a PDCCH, may refrain from transmitting via a PUCCH, may refrain from transmitting an SRS, may refrain from receiving via a DL-SCH, may clear any configured downlink assignment and configured uplink grant of configured grant Type 2, and/or may suspend any configured uplink grant of configured Type 1.

A MAC entity may perform a random access procedure (e.g., based on an initiation of the random access procedure) on an active DL BWP and the active UL BWP, for example, if PRACH resources are configured for the active UL BWP. A MAC entity may switch to an initial DL BWP and an initial UL BWP, for example, if PRACH resources are not configured for an active UL BWP (e.g., based on initiation of a random access procedure). The MAC entity may perform the random access procedure on the initial DL BWP and the initial UL BWP, for example, based on the BWP switching.

A wireless device may perform BWP switching to a BWP indicated by a PDCCH, for example, if a MAC entity receives a PDCCH (e.g., a PDCCH order) for a BWP switching of a serving cell, for example, if a random access procedure associated with this serving cell is not ongoing. A wireless device may determine whether to switch a BWP or ignore the PDCCH for the BWP switching, for example, if a MAC entity received a PDCCH for a BWP switching while a random access procedure is ongoing in the MAC entity. The MAC entity may stop the ongoing Random Access procedure and initiate a second Random Access procedure on a new activated BWP, for example, if the MAC entity decides to perform the BWP switching. The MAC entity may continue with the ongoing Random Access procedure on the active BWP, for example if the MAC decides to ignore the PDCCH for the BWP switching. A wireless device may perform the BWP switching to a BWP indicated by the PDCCH, for example, if a MAC entity receives a PDCCH for a BWP switching addressed to a C-RNTI for a successful completion of a Random Access procedure.

The MAC entity may start or restart the BWP-InactivityTimer associated with the active DL BWP for a variety of reasons. The MAC entity may start or restart the BWP-InactivityTimer associated with the active DL BWP, for example, if one or more of the following occur: a BWP-InactivityTimer is configured for an activated serving sell, if a Default-DL-BWP is configured and an active DL BWP is not a BWP indicated by the Default-DL-BWP, if the Default-DL-BWP is not configured and the active DL BWP is not the initial BWP; and/or if one or more of the following occur: if a PDCCH addressed to C-RNTI or CS-RNTI indicating downlink assignment or uplink grant is received on the active BWP, and/or if there is not an ongoing random access procedure associated with the activated serving cell.

The MAC entity may start or restart the BWP-InactivityTimer associated with the active DL BWP, for example, if one or more of the following occur: if a BWP-InactivityTimer is configured for an activated serving cell, if a Default-DL-BWP is configured and an active DL BWP is not a BWP indicated by the Default-DL-BWP, and/or if the Default-DL-BWP is not configured and the active DL BWP is not the initial BWP; and/or if one or more of the following occur: if a MAC-PDU is transmitted in a configured uplink grant or received in a configured downlink assignment, and/or if there is not an ongoing random access procedure associated with the activated serving cell.

The MAC entity may start or restart the BWP-InactivityTimer associated with the active DL BWP, for example, if one or more of the following occur: if a BWP-Inactivity-Timer is configured for an activated serving cell, if a Default-DL-BWP is configured and an active DL BWP is not a BWP indicated by the Default-DL-BWP, and/or if the Default-DL-BWP is not configured and the active DL BWP is not the initial BWP; and/or if one or more of the following occur: if a PDCCH addressed to C-RNTI or CS-RNTI indicating downlink assignment or uplink grant is received on the active BWP, if a MAC-PDU is transmitted in a configured uplink grant or received in a configured downlink assignment, and/or if an ongoing random access procedure associated with the activated Serving Cell is successfully completed in response to receiving the PDCCH addressed to a C-RNTI.

The MAC entity may start or restart the BWP-InactivityTimer associated with the active DL BWP based on switching the active BWP. For example, the MAC entity may start or restart the BWP-InactivityTimer associated with the active DL BWP if a PDCCH for BWP switching is received and the wireless device switches an active DL BWP to the DL BWP, and/or if one or more of the following occur: if a default downlink BWP is configured and the DL BWP is not the default downlink BWP, and/or if a default downlink BWP is not configured and the DL BWP is not the initial downlink BWP.

The MAC entity may stop the BWP-InactivityTimer associated with an active DL BWP of the activated serving cell, for example, if one or more of the following occur: if BWP-InactivityTimer is configured for an activated serving cell, if the Default-DL-BWP is configured and the active DL BWP is not the BWP indicated by the Default-DL-BWP, and/or if the Default-DL-BWP is not configured and the active DL BWP is not the initial BWP; and/or if a random access procedure is initiated. The MAC entity may stop a second BWP-InactivityTimer associated with a second active DL BWP of an SpCell, for example, if the activated Serving Cell is an SCell (other than a PSCell).

The MAC entity may perform BWP switching to a BWP indicated by the Default-DL-BWP, for example, if one or more of the following occur: if a BWP-InactivityTimer is configured for an activated serving cell, if the Default-DL-BWP is configured and the active DL BWP is not the BWP indicated by the Default-DL-BWP, if the Default-DL-BWP is not configured and the active DL BWP is not the initial BWP, if BWP-InactivityTimer associated with the active DL BWP expires, and/or if the Default-DL-BWP is configured. The MAC entity may perform BWP switching to the initial DL BWP, for example, if the MAC entity may refrain from performing BWP switching to a BWP indicated by the Default-DL-BWP.

A wireless device may be configured for operation in BWPs of a serving cell. The wireless device may be configured by higher layers for the serving cell for a set of (e.g., four) bandwidth parts (BWPs) for receptions by the wireless device (e.g., DL BWP set) in a DL bandwidth by a parameter (e.g., DL-BWP). The wireless device may be configured with a set of (e.g., four) BWPs for transmissions by the wireless device (e.g., UL BWP set) in an UL bandwidth by a parameter (e.g., UL-BWP) for the serving cell. An initial active DL BWP may be determined, for example, by: a location and number of contiguous PRBs; a subcarrier spacing; and/or a cyclic prefix (e.g., for the control resource set for a Type0-PDCCH common search space). A wireless device may be provided (e.g., by a higher layer) a parameter (e.g., initial-UL-BWP) for an initial active UL BWP for a random access procedure, for example, for operation on a primary cell. The wireless device may be provided (e.g., by a higher layer) a parameter (e.g., Active-BWP-DL-Pcell) for first active DL BWP for receptions, for example, if a wireless device has a dedicated BWP configuration. The wireless device may be provided (e.g., by a higher layer) a parameter (e.g., Active-BWP-UL-Pcell) for a first active UL BWP for transmissions on a primary cell, for example, if a wireless device has a dedicated BWP configuration.

The wireless device may be configured with a variety of parameters for a DL BWP and/or for an UL BWP in a set of DL BWPs and/or UL BWPs, respectively, for a serving cell. The wireless device may be configured with one or more of: a subcarrier spacing (e.g., provided by higher layer parameter DL-BWP-mu or UL-BWP-mu), a cyclic prefix (e.g., provided by higher layer parameter DL-BWP-CP or UL-BWP-CP), a PRB offset with respect to the PRB (e.g., determined by higher layer parameters offset-pointA-low-scs and ref-scs) and a number of contiguous PRBs (e.g., provided by higher layer parameter DL-BWP-BW or UL-BWP-BW), an index in the set of DL BWPs or UL BWPs (e.g., by respective higher layer parameters DL-BWP-index or UL-BWP-index), a DCI format 1_0 or DCI format 1_1 detection to a PDSCH reception timing values (e.g., provided by higher layer parameter DL-data-time-domain), a PDSCH reception to a HARQ-ACK transmission timing values (e.g., provided by higher layer parameter DL-data- DL-acknowledgement), and/or a DCI 0_0 or DCI 0_1 detection to a PUSCH transmission timing values (e.g., provided by higher layer parameter UL-data-time-domain).

A DL BWP from a set of configured DL BWPs (e.g., with an index provided by higher layer parameter DL-BWP-index) may be paired with an UL BWP from a set of configured UL BWPs (e.g., with an index provided by higher layer parameter UL-BWP-index). A DL BWP from a set of configured DL BWPs may be paired with an UL BWP from a set of configured UL BWPs, for example, if the DL BWP index and the UL BWP index are equal (e.g., for unpaired spectrum operation). A wireless device may not be expected to receive a configuration where the center frequency for a DL BWP is different from the center frequency for an UL BWP, for example, if the DL-BWP-index of the DL BWP is equal to the UL-BWP-index of the UL BWP (e.g., for unpaired spectrum operation).

A wireless device may be configured with control resource sets (e.g., coresets) for every type of common search space and/or for wireless device-specific search space, for example, for a DL BWP in a set of DL BWPs on a primary cell. The wireless device may not be expected to be configured without a common search space on the PCell, or on the PSCell, in the active DL BWP. The wireless device may be configured with control resource sets for PUCCH transmissions, for example, for an UL BWP in a set of UL BWPs. A wireless device may receive a PDCCH message and/or a PDSCH message in a DL BWP, for example, according to a configured subcarrier spacing and/or a CP length for the DL BWP. A wireless device may transmit via a PUCCH and/or via a PUSCH in an UL BWP, for example, according to a configured subcarrier spacing and CP length for the UL BWP.

The BWP indicator field value may indicate an active DL BWP, from the configured DL BWP set, for DL receptions, for example, if a BWP indicator field is configured in DCI format 1_1. The BWP indicator field value may indicate the active UL BWP, from the configured UL BWP set, for UL transmissions. A wireless device may be provided (e.g., for the primary cell) with a higher layer parameter (e.g., Default-DL-BWP, or any other a default DL BWP among the configured DL BWPs), for example, if a BWP indicator field is configured in DCI format 0_1. The default BWP may be the initial active DL BWP, for example, if a wireless device is not provided a default DL BWP by higher layer parameter Default-DL-BWP. A wireless device may be expected to detect a DCI format 0_1 indicating active UL BWP change, or a DCI format 1_1 indicating active DL BWP change, for example, if a corresponding PDCCH is received within first 3 symbols of a slot.

A wireless device may be provided (e.g., for a primary cell) with a higher layer parameter (e.g., Default-DL-BWP, or any other a default DL BWP among the configured DL BWPs). The default DL BWP may be the initial active DL BWP, for example, if a wireless device is not provided a default DL BWP by the higher layer parameter Default-DL-BWP. A wireless device may be provided with a higher layer parameter (e.g., BWP-InactivityTimer) for a timer value for the primary cell. The wireless device may increment the timer, if running, every interval of 1 millisecond for frequency range 1, every 0.5 milliseconds for frequency range 2, or any other interval, for example, if the wireless device may not detect a DCI format 1_1 for paired spectrum operation or, for example, if the wireless device may not detect a DCI format 1_1 or DCI format 0_1 for unpaired spectrum operation during the interval.

Wireless device procedures on the secondary cell may be same as on the primary cell. Wireless device procedures may use the timer value for the secondary cell and the default DL BWP for the secondary cell, for example, if a wireless device is configured for a secondary cell with a higher layer parameter (e.g., Default-DL-BWP) indicating a default DL BWP among the configured DL BWPs and the wireless device is configured with a higher layer parameter (e.g., BWP-InactivityTimer) indicating a timer value. The wireless device may use the indicated DL BWP and the indicated UL BWP on the secondary cell as the respective first active DL BWP and first active UL BWP on the secondary cell or carrier, for example, if a wireless device is configured by a higher layer parameter (e.g., Active-BWP-DL-SCell) for a first active DL BWP and by a higher layer parameter (e.g., Active-BWP-UL-SCell) for a first active UL BWP on a secondary cell or carrier.

A wireless device may not be expected to transmit (e.g., for paired spectrum operation) HARQ-ACK via a PUCCH resource indicated by a DCI format 1_0 or a DCI format 1_1, for example, if the wireless device changes its active UL BWP on a PCell between a time of a detection of the DCI format 1_0 or the DCI format 1_1 and a time of a corresponding HARQ-ACK transmission on the PUCCH. A wireless device may not be expected to monitor a PDCCH if the wireless device performs radio resource management (RRM) measurements over a bandwidth that is not within the active DL BWP for the wireless device.

A base station may send (e.g., transmit) DCI via a PDCCH for at least one of: a scheduling assignment and/or grant; a slot format notification; a preemption indication; and/or a power-control command. The DCI may comprise at least one of: an identifier of a DCI format; a downlink scheduling assignment(s); an uplink scheduling grant(s); a slot format indicator; a preemption indication; a power-control for PUCCH/PUSCH; and/or a power-control for SRS.

A downlink scheduling assignment DCI may comprise parameters indicating at least one of: an identifier of a DCI format; a PDSCH resource indication; a transport format; HARQ information; control information related to multiple antenna schemes; and/or a command for power control of the PUCCH. An uplink scheduling grant DCI may comprise parameters indicating at least one of: an identifier of a DCI format; a PUSCH resource indication; a transport format; HARQ related information; and/or a power control command of the PUSCH.

Different types of control information may correspond to different DCI message sizes. Supporting multiple beams, spatial multiplexing in the spatial domain, and/or noncontiguous allocation of RBs in the frequency domain, may require a larger scheduling message, in comparison with an uplink grant allowing for frequency-contiguous allocation. DCI may be categorized into different DCI formats. A DCI format may correspond to a certain message size and/or usage.

A wireless device may monitor (e.g., in common search space or wireless device-specific search space) one or more PDCCH for detecting one or more DCI with one or more DCI format. A wireless device may monitor a PDCCH with a limited set of DCI formats, for example, which may reduce power consumption. The more DCI formats that are to be detected, the more power may be consumed by the wireless device.

The information in the DCI formats for downlink scheduling may comprise at least one of: an identifier of a DCI format; a carrier indicator; an RB allocation; a time resource allocation; a bandwidth part indicator; a HARQ process number; one or more MCS; one or more NDI; one or more RV; MIMO related information; a downlink assignment index (DAI); a TPC for PUCCH; an SRS request; and/or padding (e.g., if necessary). The MIMO related information may comprise at least one of: a PMI; precoding information; a transport block swap flag; a power offset between PDSCH and a reference signal; a reference-signal scrambling sequence; a number of layers; antenna ports for the transmission; and/or a transmission configuration indication (TCI).

The information in the DCI formats used for uplink scheduling may comprise at least one of: an identifier of a DCI format; a carrier indicator; a bandwidth part indication; a resource allocation type; an RB allocation; a time resource allocation; an MCS; an NDI; a phase rotation of the uplink DMRS; precoding information; a CSI request; an SRS request; an uplink index/DAI; a TPC for PUSCH; and/or padding (e.g., if necessary).

A base station may perform CRC scrambling for DCI, for example, before transmitting the DCI via a PDCCH. The base station may perform CRC scrambling by binarily adding multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, and/or TPC-SRS-RNTI) on the CRC bits of the DCI. The wireless device may check the CRC bits of the DCI, for example, if detecting the DCI. The wireless device may receive the DCI, for example, if the CRC is scrambled by a sequence of bits that is the same as the at least one wireless device identifier.

A base station may send (e.g., transmit) one or more PDCCH in different control resource sets (e.g., coresets), for example, to support a wide bandwidth operation. A base station may transmit one or more RRC messages comprising configuration parameters of one or more coresets. A coreset may comprise at least one of: a first OFDM symbol; a number of consecutive OFDM symbols; a set of resource blocks; and/or a CCE-to-REG mapping. A base station may send (e.g., transmit) a PDCCH in a dedicated coreset for particular purpose, for example, for beam failure recovery confirmation. A wireless device may monitor a PDCCH for detecting DCI in one or more configured coresets, for example, to reduce the power consumption.

A base station and/or a wireless device may have multiple antennas, for example, to support a transmission with high data rate (such as in an NR system). A wireless device may perform one or more beam management procedures, as shown in FIG. 9B, for example, if configured with multiple antennas.

A wireless device may perform a downlink beam management based on one or more CSI-RSs and/or one or more SS blocks. In a beam management procedure, a wireless device may measure a channel quality of a beam pair link. The beam pair link may comprise a transmitting beam from a base station and a receiving beam at the wireless device. A wireless device may measure the multiple beam pair links between the base station and the wireless device, for example, if the wireless device is configured with multiple beams associated with multiple CSI-RSs and/or SS blocks.

A wireless device may send (e.g., transmit) one or more beam management reports to a base station. The wireless device may indicate one or more beam pair quality parameters, for example, in a beam management report. The one or more beam pair quality parameters may comprise at least one or more beam identifications; RSRP; and/or PMI, CQI, and/or RI of at least a subset of configured multiple beams.

A base station and/or a wireless device may perform a downlink beam management procedure on one or multiple Transmission and Receiving Point (TRPs), such as shown in FIG. 9B. Based on a wireless device's beam management report, a base station may send (e.g., transmit), to the wireless device, a signal indicating that a new beam pair link is a serving beam. The base station may transmit PDCCH and/or PDSCH to the wireless device using the serving beam.

A wireless device and/or a base station may trigger a beam failure recovery mechanism. A wireless device may trigger a beam failure recovery request (BFRQ) procedure, for example, if at least a beam failure occurs. A beam failure may occur if a quality of beam pair link(s) of at least one PDCCH falls below a threshold. The threshold comprise be an RSRP value (e.g., −140 dbm, −110 dbm, or any other value) and/or a SINR value (e.g., −3 dB, −1 dB, or any other value), which may be configured in a RRC message.

Figure 20A:
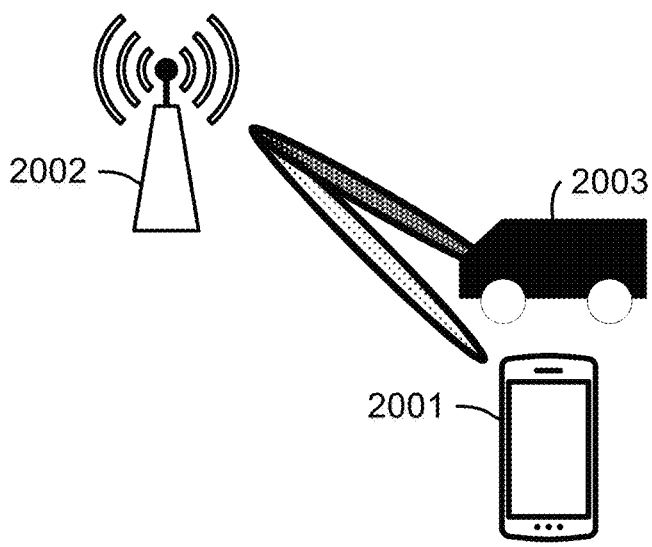
FIG. 20A and FIG. 20B show examples of downlink beam failure.

FIG. 20A shows an example of a first beam failure event. A base station 2002 may send (e.g., transmit) a PDCCH from a transmission (Tx) beam to a receiving (Rx) beam of a wireless device 2001 from a TRP. The base station 2002 and the wireless device 2001 may start a beam failure recovery procedure on the TRP, for example, if the PDCCH on the beam pair link (e.g., between the Tx beam of the base station 2002 and the Rx beam of the wireless device 2001) have a lower-than-threshold RSRP and/or SINR value due to the beam pair link being blocked (e.g., by a moving vehicle 2003, a building, or any other obstruction).

Figure 20B:
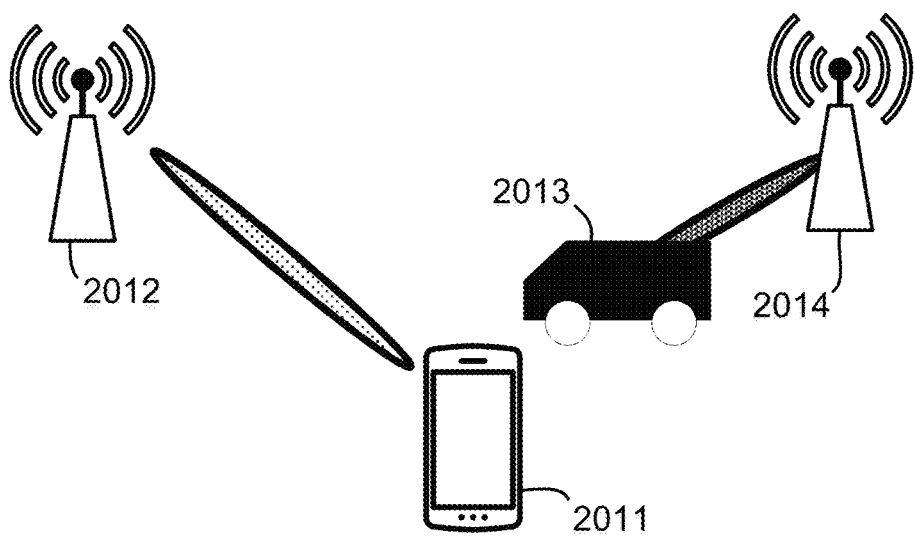

FIG. 20B shows an example of a second beam failure event. A base station may send (e.g., transmit) a PDCCH from a beam to a wireless device 2011 from a first TRP 2014. The base station and the wireless device 2011 may start a beam failure recovery procedure on a new beam on a second TRP 2012, for example, if the PDCCH on the beam is blocked (e.g., by a moving vehicle 2013, building, or any other obstruction).

A wireless device may measure a quality of beam pair links using one or more RSs. The one or more RSs may comprise one or more SS blocks and/or one or more CSI-RS resources. A CSI-RS resource may be determined by a CSI-RS resource index (CRI). A quality of beam pair links may be indicated by, for example, an RSRP value, a reference signal received quality (e.g., RSRQ) value, and/or a CSI (e.g., SINR) value measured on RS resources. A base station may indicate whether an RS resource, used for measuring beam pair link quality, is QCLed (Quasi-Co-Located) with DM-RSs of a PDCCH. The RS resource and the DM-RSs of the PDCCH may be QCLed, for example, if the channel characteristics from a transmission on an RS to a wireless device, and that from a transmission on a PDCCH to the wireless device, are similar or same under a configured criterion. The RS resource and the DM-RSs of the PDCCH may be QCLed, for example, if Doppler shift and/or Doppler shift of the channel from a transmission on an RS to a wireless device, and that from a transmission on a PDCCH to the wireless device, are the same.

A wireless device may monitor a PDCCH on M beams (e.g. 2, 4, 8) pair links simultaneously, where M≥1 and the value of M may depend at least on capability of the wireless device. Monitoring a PDCCH may comprise detecting DCI via the PDCCH transmitted on common search spaces and/or wireless device specific search spaces. Monitoring multiple beam pair links may increase robustness against beam pair link blocking. A base station may send (e.g., transmit) one or more messages comprising parameters indicating a wireless device to monitor PDCCH on different beam pair link(s) in different OFDM symbols.

A base station may send (e.g., transmit) one or more RRC messages and/or MAC CEs comprising parameters indicating Rx beam setting of a wireless device for monitoring PDCCH on multiple beam pair links. A base station may send (e.g., transmit) an indication of a spatial QCL between DL RS antenna port(s) and DL RS antenna port(s) for demodulation of DL control channel. The indication may comprise a parameter in a MAC CE, an RRC message, DCI, and/or any combinations of these signaling.

A base station may indicate spatial QCL parameters between DL RS antenna port(s) and DM-RS antenna port(s) of DL data channel, for example, for reception of data packet on a PDSCH. A base station may send (e.g., transmit) DCI comprising parameters indicating the RS antenna port(s) are QCLed with DM-RS antenna port(s).

A wireless device may measure a beam pair link quality based on CSI-RSs QCLed with DM-RS for PDCCH, for example, if a base station sends (e.g., transmits) a signal indicating QCL parameters between CSI-RS and DM-RS for PDCCH. The wireless device may start a BFR procedure, for example, if multiple contiguous beam failures occur.

A wireless device may send (e.g., transmit) a BFRQ signal on an uplink physical channel to a base station, for example, if starting a BFR procedure. The base station may send (e.g., transmit) DCI via a PDCCH in a coreset, for example, after or in response to receiving the BFRQ signal on the uplink physical channel. The wireless may determine that the BFR procedure is successfully completed, for example, after or in response to receiving the DCI via the PDCCH in the coreset.

A base station may send (e.g., transmit) one or more messages comprising configuration parameters of an uplink physical channel, or signal, for transmitting a beam failure recovery request. The uplink physical channel or signal may be based on one of: a contention-free PRACH (BFR-PRACH), which may be a resource orthogonal to resources of other PRACH transmissions; a PUCCH (e.g., BFR-PUCCH); and/or a contention-based PRACH resource (e.g., CF-PRACH). Combinations of these candidate signals and/or channels may be configured by the base station. A wireless device may autonomously select a first resource for transmitting the BFRQ signal, for example, if the wireless device is configured with multiple resources for a BFRQ signal. The wireless device may select a BFR-PRACH resource for transmitting a BFRQ signal, for example, if the wireless device is configured with the BFR-PRACH resource, a BFR-PUCCH resource, and/or a CF-PRACH resource. The base station may send (e.g., transmit) a message to the wireless device indicating a resource for transmitting the BFRQ signal, for example, if the wireless device is configured with a BFR-PRACH resource, a BFR-PUCCH resource, and/or a CF-PRACH resource.

A base station may send (e.g., transmit) a response to a wireless device, for example, after receiving one or more BFRQ signals. The response may comprise the CRI associated with the candidate beam that the wireless device may indicate in the one or multiple BFRQ signals. A base station and/or a wireless device may perform one or more beam management procedures, for example, if the base station and/or the wireless device are configured with multiple beams (e.g., in system such as in an NR system). The wireless device may perform a BFR procedure (e.g., send one or more BFRQ signals), for example, if one or more beam pair links between the base station and the wireless device fail.

Figure 21:
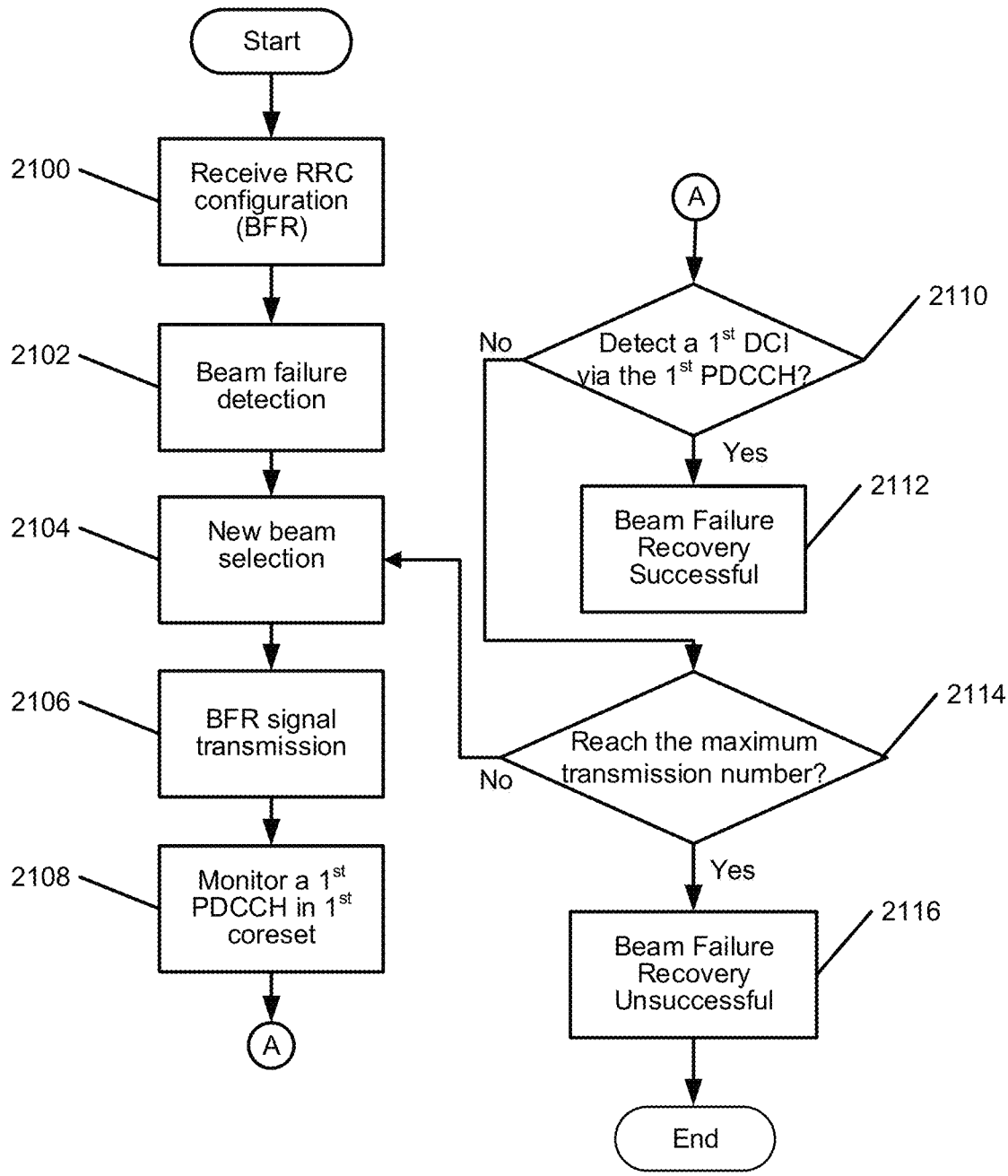
FIG. 21 shows an example of a downlink beam failure recovery procedure.

FIG. 21 shows an example of a BFR procedure. In some communication systems, a wireless device may stop a BWP inactivity timer if a random access procedure is initiated, and/or the wireless device may restart the BWP inactivity timer if the random access procedure is successfully completed (e.g., based on or in response to receiving DCI addressed to a C-RNTI of the wireless device). At step 2100, a wireless device may receive one or more RRC messages comprising BFR parameters. At step 2102, the wireless device may detect at least one beam failure according to at least one BFR parameter. The wireless device may start a first timer, if configured, based on detecting the at least one beam failure. At step 2104, the wireless device may select a beam (e.g., a selected beam) based on detecting the at least one beam failure. The selected beam may be a beam with good channel quality (e.g., based on RSRP, SINR, and/or BLER) that may be selected from a set of candidate beams. The candidate beams may be indicated by a set of reference signals (e.g., SSBs, or CSI-RSs). At step 2106, the wireless device may send (e.g., transmit) at least a first BFR signal to a base station, for example, based on selecting the beam (e.g., selected beam). The at least first BFR signal may be associated with the selected beam. The wireless device may send (e.g., transmit) the at least first BFR signal with a transmission beam corresponding to a receiving beam associated with the selected beam. The at least first BFR signal may be a preamble sent (e.g., transmitted) via a PRACH resource, an SR signal sent (e.g., transmitted) via a PUCCH resource, a beam failure recovery signal sent (e.g., transmitted) via a PUCCH resource, and/or a beam report sent (e.g., transmitted) via a PUCCH and/or PUSCH resource. At step 2108, the wireless device may start a response window, for example, based on sending (e.g., transmitting) the at least first BFR signal. The response window may be associated with a timer with a value configured by the base station. The wireless device may monitor a PDCCH in a first coreset, for example, if the response window is running. The first coreset may be associated with the BFR procedure. The wireless device may monitor the PDCCH in the first coreset in condition of transmitting the at least first BFR signal.

At step 2110, the wireless device may detect (e.g., receive) a first DCI via the PDCCH in the first coreset, for example, if the response window is running. At step 2112, the wireless device may determine that the BFR procedure has successfully completed, for example, if the wireless device receives the first DCI via the PDCCH in the first coreset before the response window expires. The wireless device may stop the first timer, if configured, based on the BFR procedure successfully being completed. The wireless device may stop the response window, for example, based on the BFR procedure successfully being completed. If the response window expires, and the wireless device does not receive the DCI (e.g., at step 2110), the wireless device may, at step 2114, increment a transmission number. The transmission number may be initialized to a first number (e.g., 0) before the BFR procedure is triggered. At step 2114, if the transmission number indicates a number less than the configured maximum transmission number, the wireless device may repeat one or more actions (e.g., at step 2104). The one or more actions to be repeated may comprise at least one of a BFR signal transmission, starting the response window, monitoring the PDCCH, and/or incrementing the transmission number, for example, if no response received during the response window is running. At step 2116, if the transmission number indicates a number equal or greater than the configured maximum transmission number, the wireless device may declare the BFR procedure is unsuccessfully completed.

A MAC entity of a wireless device may be configured by an RRC message, for example, for a beam failure recovery procedure. The beam failure recovery procedure may be used for indicating to a serving base station of a new synchronization signal block (SSB) and/or CSI-RS, for example, if a beam failure is detected. The beam failure may be detected on one or more serving SSB(s) and/or CSI-RS(s) of the serving base station. The beam failure may be detected by counting a beam failure instance indication from a lower layer of the wireless device (e.g., PHY layer) to the MAC entity.

An RRC message may configure a wireless device with one or more parameters (e.g., in BeamFailureRecoveryConfig) for a beam failure detection and recovery procedure. The one or more parameters may comprise one or more of: beamFailureInstanceMaxCount for a beam failure detection, beamFailureDetectionTimer for the beam failure detection, an RSRP threshold (e.g., beamFailureCandidateBeamThreshold) for a beam failure recovery, preamblePowerRampingStep for the beam failure recovery, preambleReceivedTargetPower for the beam failure recovery, preambleTxMax for the beam failure recovery, and/or ra-ResponseWindow. The ra-ResponseWindow may be a time window to monitor one or more responses for the beam failure recovery using a contention-free RA preamble.

A wireless device may use at least one wireless device variable for a beam failure detection. BFI_COUNTER may be one of the at least one wireless device variable. The BFI_COUNTER may be a counter for a beam failure instance indication. The BFI_COUNTER may be initially set to zero. The wireless device may start or restart beamFailureDetectionTimer, for example, if a MAC entity of a wireless device receives a beam failure instance indication from a lower layer (e.g., PHY) of the wireless device. The wireless device may increment BFI_COUNTER, for example, in addition to starting or restarting the beamFailureDetectionTimer. The wireless device may initiate a random access procedure (e.g., on an SpCell) based on the BFI_COUNTER being equal to beamFailureInstanceMaxCount+1. The wireless device may use the one or more parameters in the BeamFailureRecoveryConfig, for example, based on the initiating the random access procedure. The wireless device may set the BFI_COUNTER to zero, for example, if the beamFailureDetectionTimer expires. The wireless device may determine that the beam failure recovery procedure has successfully completed, for example, if the random access procedure is successfully completed.

A MAC entity may start ra-ResponseWindow at a first PDCCH occasion from the end of the transmitting the contention-free random access preamble, for example, if a MAC entity of a wireless device sends (e.g., transmits) a contention-free random access preamble for a beam failure recovery request (BFRQ). The ra-ResponseWindow may be configured in BeamFailureRecoveryConfig. The wireless device may monitor at least one PDCCH (e.g., of an SpCell) for a response to the beam failure recovery request, for example, if the ra-ResponseWindow is running. The beam failure recovery request may be identified by a C-RNTI. The wireless device may determine that a random access procedure has successfully completed, for example, if a MAC entity of a wireless device receives, from a lower layer of the wireless device, a notification of a reception of at least one PDCCH transmission, and if the at least one PDCCH transmission is addressed to a C-RNTI, and/or if a contention-free random access preamble for a beam failure recovery request is transmitted by the MAC entity.

A wireless device may initiate a contention-based random access preamble for a beam failure recovery request. A MAC entity of the wireless device may start ra-ContentionResolutionTimer, for example, if the wireless device transmits Msg3. The ra-ContentionResolutionTimer may be configured by RRC. Based on the starting the ra-ContentionResolutionTimer, the wireless device may monitor at least one PDCCH if the ra-ContentionResolutionTimer is running. The wireless device may consider the random access procedure successfully completed, for example, if the MAC entity receives, from a lower layer of the wireless device, a notification of a reception of the at least one PDCCH transmission, if a C-RNTI MAC-CE is included in the Msg3, if a random access procedure is initiated for a beam failure recovery, and/or the at least one PDCCH transmission is addressed to a C-RNTI of the wireless device. The wireless device may stop the ra-ContentionResolutionTimer, for example, based on the random access procedure being successfully completed. The wireless device may determine that the beam failure recovery has successfully completed, for example, if a random access procedure of a beam failure recovery is successfully completed.

A wireless device may be configured (e.g., for a serving cell) with a first set of periodic CSI-RS resource configuration indexes by a higher layer parameter (e.g., Beam-Failure-Detection-RS-ResourceConfig). The wireless device may be configured with a second set of CSI-RS resource configuration indexes and/or SS/PBCH block indexes by a higher layer parameter (e.g., Candidate-Beam-RS-List). The first set of CSI-RS resource configuration indexes and/or SS/PBCH block indexes and/or the second set of CSI-RS resource configuration indexes and/or SS/PBCH block indexes may be used for radio link quality measurements on the serving cell. The wireless device may determine a first set to include SS/PBCH block indexes and periodic CSI-RS resource configuration indexes, for example, if a wireless device is not provided with higher layer parameter Beam-Failure-Detection-RS-ResourceConfig. The SS/PBCH block indexes and the periodic CSI-RS resource configuration indexes may comprise the same values as one or more RS indexes in one or more RS sets. The one or more RS indexes in the one or more RS sets may be indicated by one or more TCI states. The one or more TCI states may be used for respective control resource sets for which the wireless device may be configured to monitor a PDCCH. The wireless device may expect a single port RS in the first set.

A first threshold (e.g., Qout,LR) may correspond to a first default value of a first higher layer parameter (e.g., RLM-IS-OOS-thresholdConfig). A second threshold (e.g., Qin, LR) may correspond to a second default value of a higher layer parameter (e.g., Beam-failure-candidate-beam-threshold). A physical layer in the wireless device may compare a first radio link quality according to the first set of periodic CSI-RS resource configurations with the first threshold. For the first set, the wireless device may assess the first radio link quality based on periodic CSI-RS resource configurations or SS/PBCH blocks. The periodic CSI-RS resource configurations and/or the SS/PBCH blocks may be associated (e.g., quasi co-located) with at least one DM-RS of a PDCCH that may be monitored by the wireless device. The wireless device may apply the second threshold to a first L1-RSRP for SS/PBCH blocks. The wireless device may apply the second threshold to a second L1-RSRP for periodic CSI-RS resources, for example after scaling a respective CSI-RS reception power with a value provided by a higher layer parameter (e.g., Pc_SS).

A physical layer in a wireless device may, for example, in slots for which the first radio link quality according to the first set is assessed, provide an indication to higher layers (e.g., MAC layer). The wireless device may provide an indication to higher layers, for example, if the first radio link quality for all corresponding resource configurations in the first set is less than the first threshold. The wireless device may use the corresponding resource configurations in the first set to assess the first radio link quality. The physical layer may inform the higher layers (e.g., MAC, RRC), for example, if the first radio link quality is less than the first threshold with a first periodicity. The first periodicity may be determined by a maximum of the shortest periodicity of periodic CSI-RS configurations or SS/PBCH blocks in the first set and a time value (e.g., 10 ms). Based on a request from higher layers (e.g., MAC layer), a wireless device may provide to higher layers the periodic CSI-RS configuration indexes and/or the SS/PBCH block indexes from the second set. The wireless device may provide, to higher layers, corresponding L1-RSRP measurements that may be greater than or equal to the second threshold.

A wireless device may be configured with one control resource set (coreset), for example, by a higher layer parameter (e.g., Beam-failure-Recovery-Response-CORESET). The wireless device may be configured with an associated search space that may be provided by a higher layer parameter (e.g., search-space-config). The associated search space may be used for monitoring a PDCCH in the one control resource set. The wireless device may receive from higher layers (e.g., MAC layer), by a parameter (e.g., Beam-failure-recovery-request-RACH-Resource), a configuration for a PRACH transmission. For the PRACH transmission in slot n and based on antenna port quasi co-location parameters associated with periodic CSI-RS configuration or SS/PBCH block with a first RS index, the wireless device may monitor the PDCCH for detection of a DCI format starting from a slot (e.g., slot n+4) within a window. The window may be configured by a higher layer parameter (e.g., Beam-failure-recovery-request-window). The DCI format may be CRC scrambled by a C-RNTI. For a PDSCH reception, the wireless device may use the antenna port quasi-collocation parameters (e.g., as for monitoring the PDCCH) until the wireless device receives, by higher layers, an activation for a TCI state or a parameter (e.g., TCI-StatesPDCCH).

The MAC entity may start or restart the BWP inactivity timer associated with the active DL BWP, for example, if one or more of the following occur: if a BWP inactivity timer is configured for an activated serving cell, if a Default-DL-BWP is configured and an active DL BWP is not a BWP indicated by the Default-DL-BWP, if the Default-DL-BWP is not configured and the active DL BWP is not an initial BWP, if a PDCCH addressed to C-RNTI or CS-RNTI indicating downlink assignment or uplink grant is received on the active BWP, and/or if there is not an ongoing random access procedure associated with the activated serving cell.

The MAC entity may start or restart the BWP inactivity timer associated with the active DL BWP, for example, if one or more of the following occur: if a BWP inactivity timer is configured for an activated serving cell, if a Default-DL-BWP is configured and an active DL BWP is not a BWP indicated by the Default-DL-BWP, if the Default-DL-BWP is not configured and the active DL BWP is not an initial BWP; and/or if one or more of the following occur: if a MAC-PDU is transmitted in a configured uplink grant or received in a configured downlink assignment, and/or if there is not an ongoing random access procedure associated with the activated Serving Cell.

The MAC entity may start or restart the BWP inactivity timer associated with the active DL BWP, for example, if one or more of the following occur: if a BWP inactivity timer is configured for an activated serving cell, if a Default-DL-BWP is configured and an active DL BWP is not a BWP indicated by the Default-DL-BWP, if the Default-DL-BWP is not configured and the active DL BWP is not an initial BWP; and/or if one or more of the following occur: if a PDCCH addressed to a C-RNTI is received on the active DL BWP, and/or if an ongoing random access procedure associated with the activated serving cell is successfully completed based on (e.g., in response to) receiving the PDCCH addressed to the C-RNTI.

A wireless device may initiate a random access procedure for a primary cell (PCell) or a secondary cell (SCell). In some systems, if a wireless device initiates a random access procedure for an SCell, the wireless device may stop a bandwidth part (BWP) inactivity timer of the SCell. In such systems, the wireless device may initiate the random access procedure for the SCell based on (e.g., in response to) a command by a base station (e.g., a PDCCH order). The base station may be aware of the random access procedure for the SCell, for example, if the base station sends a command to initiate the random access procedure. The base station may stop its BWP inactivity timer for the SCell, for example, if the base station sends the command to initiate the random access procedure. By both the base station and the wireless device stopping their respective BWP inactivity timers, the base station and the wireless device may maintain synchronization of their BWP inactivity timers. If the random access procedure for the SCell is unsuccessfully completed, the base station may be aware of the active BWP of the wireless device if, for example, there is no misalignment on the active BWP of the wireless device relative to the active BWP of the base station. Misalignment may be avoided, for example, by the base station and the wireless device both stopping their respective BWP inactivity timers for the random access procedure for the SCell. The base station may send (e.g., transmit) a downlink signal (e.g., DCI, MAC-CE, etc.) on the active BWP of the SCell to provide information to the wireless device (e.g., for maintaining synchronization between the base station and the wireless device), for example, if the random access procedure is unsuccessfully completed.

A wireless device may initiate a random access procedure for a beam failure recovery (BFR) of an SCell autonomously (e.g., without a command from a base station). A base station may not be aware of a random access procedure (e.g., for a BFR procedure) that may be initiated autonomously by a wireless device, which may cause a timing misalignment between the base station and the wireless device. The wireless device may stop a BWP inactivity timer of the SCell, for example, if the wireless device initiates a random access procedure for a BFR for an SCell. The BWP inactivity timer at the base station may continue running, for example, even if the wireless stops its BWP inactivity for the SCell. The base station may fail to stop its BWP inactivity timer, for example, because the base station may not be aware of the BFR procedure (e.g., that may comprise a random access procedure) on the SCell. The base station may continue the BWP inactivity timer running at the base station during a random access procedure for a BFR of an SCell that may be initiated by a wireless device autonomously. A gap (e.g., timing misalignment) between the BWP inactivity timer at the wireless device and the BWP inactivity timer at the base station may increase, for example, at least until the base station may become aware of the BFR procedure. The gap between the BWP inactivity timer at the wireless device and the BWP inactivity timer at the base station may continue to increase, for example, if the BWP inactivity timer at the wireless device has stopped but the BWP inactivity timer at the base station continues to run.

A base station may fail to become aware of a BFR procedure (e.g., comprising a random access procedure) on an SCell initiated (e.g., autonomously) by a wireless device, for example, if the wireless device unsuccessfully completes the BFR procedure. A gap (e.g., timing misalignment) between a BWP inactivity timer at the base station and a BWP inactivity timer at the wireless device may continue to increase, for example, if the base station is not aware of a BFR procedure and/or if the wireless device unsuccessfully completes the BFR procedure. The wireless device may determine to restart the BWP inactivity timer at the wireless device, for example, if the wireless device unsuccessfully completes the BFR procedure for the SCell. The wireless device may restart the BWP inactivity timer, for example, based on or in response to unsuccessfully completing the BFR procedure for the SCell. By restarting the BWP inactivity at the wireless device (e.g., such that the BWP inactivity timer will run) if the wireless device unsuccessfully completes the BFR procedure, the wireless device may reduce and/or prevent the gap (e.g., timing misalignment) between the BWP inactivity timer at the wireless device and the BWP inactivity timer at the base station (e.g., which may have continued to run during the BFR procedure) from continuing to increase. By restarting the BWP inactivity at the wireless device if the wireless device unsuccessfully completes the BFR procedure, misalignment between the BWP inactivity timer of the wireless device and the BWP inactivity timer of the base station may be reduced.

The BWP inactivity timer at the base station may expire if, for example, the base station does not stop the BWP inactivity timer. Based on the BWP inactivity timer at the base station expiring, the base station may determine that the wireless device switched to a default BWP of the SCell. The base station may incorrectly determine that the wireless device switched to a default BWP of the SCell, for example, if the wireless device is still operating on an old BWP. The wireless device may still be operating on an old BWP if, for example, the wireless device stopped the BWP inactivity timer of the wireless device. By stopping its BWP activity timer, the wireless device may avoid BWP switching (e.g., avoid switching from an old BWP to a default BWP). The base station may incorrectly determine that the wireless device is active on the default BWP, if the wireless device may still be active on the old BWP (e.g., if the wireless device stopped the BWP inactivity timer of the wireless device such that the BWP inactivity timer of the wireless device did not expire and BWP switching did not occur). A BWP misalignment may occur between the base station and the wireless device if, for example, the base station incorrectly determines that the wireless device is active on the default BWP while the wireless device is actually active on the old BWP. The wireless device may switch to a default BWP if, for example, the random access procedure for the BFR of the SCell is unsuccessfully completed. By switching to a default BWP (e.g., based on or in response to unsuccessful completion of the random access procedure), the wireless device may prevent and/or reduce BWP misalignment between the base station and the wireless device.

BWP misalignment and/or timing misalignment may cause a variety of issues, such as increased latency; wasted resources and/or inefficient usage of resources; and/or wasted power and/or increased power consumption. A base station may send (e.g., transmit) one or more downlink signals (e.g., DCI, MAC-CE, RRC, etc.) on a BWP. The base station may send (e.g., transmit) the one or more signals on a BWP (e.g., a default BWP) that may not be monitored by the wireless device (e.g., which may be monitoring an old BWP). The base station may not be able to promptly determine the BWP on which the wireless device is active, which may result in increased latency for communications between the base station and the wireless device. The base station may send (e.g., transmit) scheduling information via DCI to the wireless device on a BWP. The base station may send (e.g., transmit) the scheduling information on a BWP (e.g., a default BWP) that may not be monitored by the wireless device (e.g., which may be monitoring an old BWP). Each scheduling information indicates time/frequency resources, that may not be used, for example, if the wireless device may not receive the DCI with the scheduling information (e.g., if the wireless device is active on another BWP). By not using time/frequency resources indicated in scheduling information that may not be received by the wireless device, resources may be wasted and/or resource efficiency may be reduced. The wireless device may monitor a BWP (e.g., an old BWP) that may not be served by the base station (e.g., which may serve a default BWP). The base station may send (e.g., transmit) one or more downlink signals (e.g., DCI, MAC-CE, RRC, etc.) on a second BWP (e.g., default BWP in this case) on which it assumes the wireless device is active. The wireless device may monitor a first BWP (e.g., an old BWP) on which the base station does not send (e.g., transmit) the one or more downlink signals for the wireless device. By monitoring a BWP on which the one or more downlink signals are not sent (e.g., transmitted) by the base station, the wireless device may increase its power consumption and/or waste power.

By restarting the BWP inactivity at the wireless device (e.g., for the secondary cell and/or for the primary cell) if the wireless device unsuccessfully completes the BFR procedure, and/or by not stopping the BWP inactivity timer for the primary cell if a random access procedure is initiated for a BFR procedure on the secondary cell, misalignment between the BWP inactivity timer of the wireless device and the BWP inactivity timer of the base station may be reduced. Additionally or alternatively, by switching to a default BWP if the wireless device unsuccessfully completes the BFR procedure, misalignment between the BWP used by the base station and the BWP used by the wireless device may be avoided. By reducing and/or preventing timing misalignment and/or BWP misalignment between the base station and the wireless device, latency may be improved; resources may be used more efficiently; and/or power may be conserved.

A base station may send (e.g., transmit), to a wireless device, one or more messages comprising configuration parameters of one or more cells. The one or more cells may comprise at least one PCell and/or PSCell, and one or more SCells. An SpCell (e.g., PCell or PSCell) and one or more SCells may operate on different frequencies and/or different bands. An SCell may support a multi-beam operation. In the multi-beam operation, a wireless device may perform one or more beam management procedures (e.g., a beam failure recovery procedure) on the SCell. The wireless device may perform a BFR procedure if at least one of one or more beam pair links between the SCell and the wireless device fails.

Some BFR procedures may result in inefficiencies if there is a beam failure for one of the one or more SCells.

Some BFR procedures may be enhanced, for example, to improve downlink radio efficiency and/or reduce uplink signaling overhead, for example, if there is a beam failure for an SCell. Downlink signaling processes may be enhanced for recovery of a beam failure for an SCell. Uplink signaling may be enhanced for recovery a beam failure for an SCell. A wireless device and a base station may enhance a BFR procedure for an SCell. Some BFR procedures may be enhanced, for example, to improve downlink radio efficiency and/or reduce uplink signaling overhead, for example, if CA is configured for a wireless device.

A base station may configure a wireless device with one or more BWPs, for example, to achieve a bandwidth adaptation (BA). A base station may indicate, to a wireless device, which of the one or more (e.g., configured) BWPs is an active BWP. The active BWP may comprise an active UL BWP and/or an active DL BWP configured by a higher layer (e.g., RRC layer). An active DL BWP and an active UL BWP may switch BWPs independently, for example, in a paired spectrum (e.g., FDD). An active DL BWP and an active UL BWP may switch BWPs simultaneously, for example, in an unpaired spectrum (e.g., TDD). The switching BWPs between one or more (e.g., configured) BWPs may be controlled by DCI, a BWP inactivity timer, and/or by a wireless device (e.g., based on initiating a random access procedure). An expiry of the BWP inactivity timer may switch an active DL BWP to a default DL BWP, for example, if a BWP inactivity timer is configured for a serving cell. The default DL BWP may be configured by a network. The switching the active DL BWP to the default DL BWP may activate the default DL BWP and/or deactivate the active DL BWP.

A MAC entity may stop a BWP inactivity timer, for example, if a random access procedure is initiated. Based on the random access procedure being initiated, the BWP inactivity timer may be reset in addition to being stopped. Stopping the BWP inactivity timer may prevent BWP switching during the random access procedure.

A first BWP inactivity timer of the PCell may be stopped, for example, if a random access process is initiated for a PCell. A second BWP inactivity timer of the SCell may be stopped, for example, if a random access is initiated for an SCell. For a random access procedure on an SCell (e.g., other than PSCell), a PRACH preamble may be sent (e.g., transmitted) via the SCell. A wireless device may receive a response (e.g., RAR) of the PRACH preamble via an SpCell. BWP switching may occur on the SpCell during the random access procedure, even if the second BWP inactivity timer of the SCell is stopped. The second BWP inactivity timer of the SCell and the first BWP inactivity timer of the SpCell may be stopped based on initiating a random access procedure for the SCell, for example, if the random access procedure is initiated for the SCell.

Based on a random access procedure being initiated on an SCell (e.g., other than PSCell), a MAC entity may stop a first BWP inactivity timer of an SpCell (e.g., SpCell corresponding to the SCell) and a second BWP inactivity timer of the SCell. Based on a random access procedure being initiated on an SpCell, a MAC entity may stop a first BWP inactivity timer associated with the SpCell.

A BWP inactivity timer may be started and/or re-started, for example, based on a wireless device sending (e.g., transmitting) a first MAC PDU via a configured uplink grant or a wireless device receiving a second MAC PDU via a configured downlink assignment. A BWP inactivity timer of a serving cell may refrain from starting and/or may re-start based on receiving DCI, for example, if a random access procedure is ongoing and associated with the serving cell. The BWP inactivity timer of the serving cell may start and/or re-start based on receiving DCI scheduling msg2 (e.g., RAR) and/or msg4 (e.g., associated with wireless device's C-RNTI), for example, if an RA procedure is ongoing associated with the serving cell.

Based on receiving a DCI scheduling msg4 with wireless device's C-RNTI, the wireless device may consider contention resolution successful. A wireless device may start a BWP inactivity timer, for example, based on receiving the DCI. The wireless device may start a BWP inactivity timer, for example, based on receiving a DCI scheduling msg2 with a C-RNTI of a wireless device. A BWP inactivity timer associated with a deactivated SCell may be stopped, for example, if configured with CA. The wireless device may stop a BWP inactivity timer associated with an SCell, for example, based on a deactivation of the SCell, A wireless device may perform one or more beam management procedures (e.g., a BFR procedure) on an active BWP. The wireless device may perform a BFR procedure, for example, if at least one of one or more beam pair links of the wireless device on the active BWP fails. BFR procedures may be enhanced to improve downlink radio efficiency and/or reduce uplink signaling overhead, for example, if BWPs are configured for a cell.

A wireless device may stop a BWP inactivity timer associated with an active BWP, for example, if the wireless device initiates a random access procedure. The random access procedure may be for a beam failure recovery. The wireless device may restart the BWP inactivity timer based on completing the random access procedure. The random access procedure may be completed based on receiving DCI. The DCI may be addressed to a C-RNTI of the wireless device.

The random access procedure may be unsuccessful (e.g., not successfully completed). A maximum number of preamble transmissions for the random access procedure may be reached. A lower layer of the wireless device (e.g., PHY layer) may send an indication to a higher layer of the wireless device (e.g., RRC layer), for example, based on the random access procedure being unsuccessful. The higher layer of the wireless device may declare a radio link failure (RLF), for example, based on receiving the indication. The wireless device may initiate an initial random access procedure for an active BWP, for example, based on declaring the RLF. The wireless device may switch from an active BWP to a default BWP, for example, based on declaring the RLF.

A wireless device may initiate a random access procedure for a beam failure recovery. The beam failure recovery may be associated with an active DL BWP. The wireless device may stop a BWP inactivity timer of the active DL BWP, for example, based on the initiating the random access procedure. The random access procedure for the beam failure recovery may be unsuccessful. A maximum number of preamble transmissions for the random access procedure may be reached. A lower layer of the wireless device (e.g., PHY layer) may send an indication to a higher layer of the wireless device (e.g., RRC layer), for example, based on the random access procedure being unsuccessful. The higher layer of the wireless device may refrain from declaring a radio link failure (RLF), for example, based on receiving the indication. The wireless device may continue to monitor the active DL BWP for a control information. The wireless device may miss the control information sent (e.g., transmitted) by the base station. A wireless device missing the control information from the base station may lead to data loss and/or signaling overhead. The active DL BWP may have a wider bandwidth than a default DL BWP. Monitoring the active DL BWP by the wireless device may result in a high power consumption (e.g., battery power usage). A wireless device may switch to a default BWP, for example, based on the random access procedure being unsuccessful. A wireless device may restart the BWP inactivity timer, for example, based on the random access procedure being unsuccessful.

A default BWP may have a narrow bandwidth (e.g., small control resource set). An active DL BWP may have a wide bandwidth (e.g., a bandwidth wider than a default BWP). The wireless device may switch to the default BWP (e.g., default UL BWP and/or default DL BWP) for power saving, for example, if a wireless device is monitoring the active DL BWP for a long time (e.g., greater than a threshold duration) without an activity. Monitoring for DCI in the narrow bandwidth (e.g., small control resource set) may reduce power consumption of the wireless device. Monitoring the wide bandwidth by the wireless device until the wireless device receives DCI may not be power efficient.

A wireless device may switch from an active BWP to a default BWP, for example, based on a random access procedure being unsuccessful. A wireless device may restart a BWP inactivity timer, for example, based on a random access procedure being unsuccessful. The random access procedure may be initiated for a beam failure recovery of an active DL BWP. At least one second PDCCH in one or more coresets of the default BWP may not have a beam failure. The second PDCCH of the default BWP may be robust against a beam failure.

Figure 22:
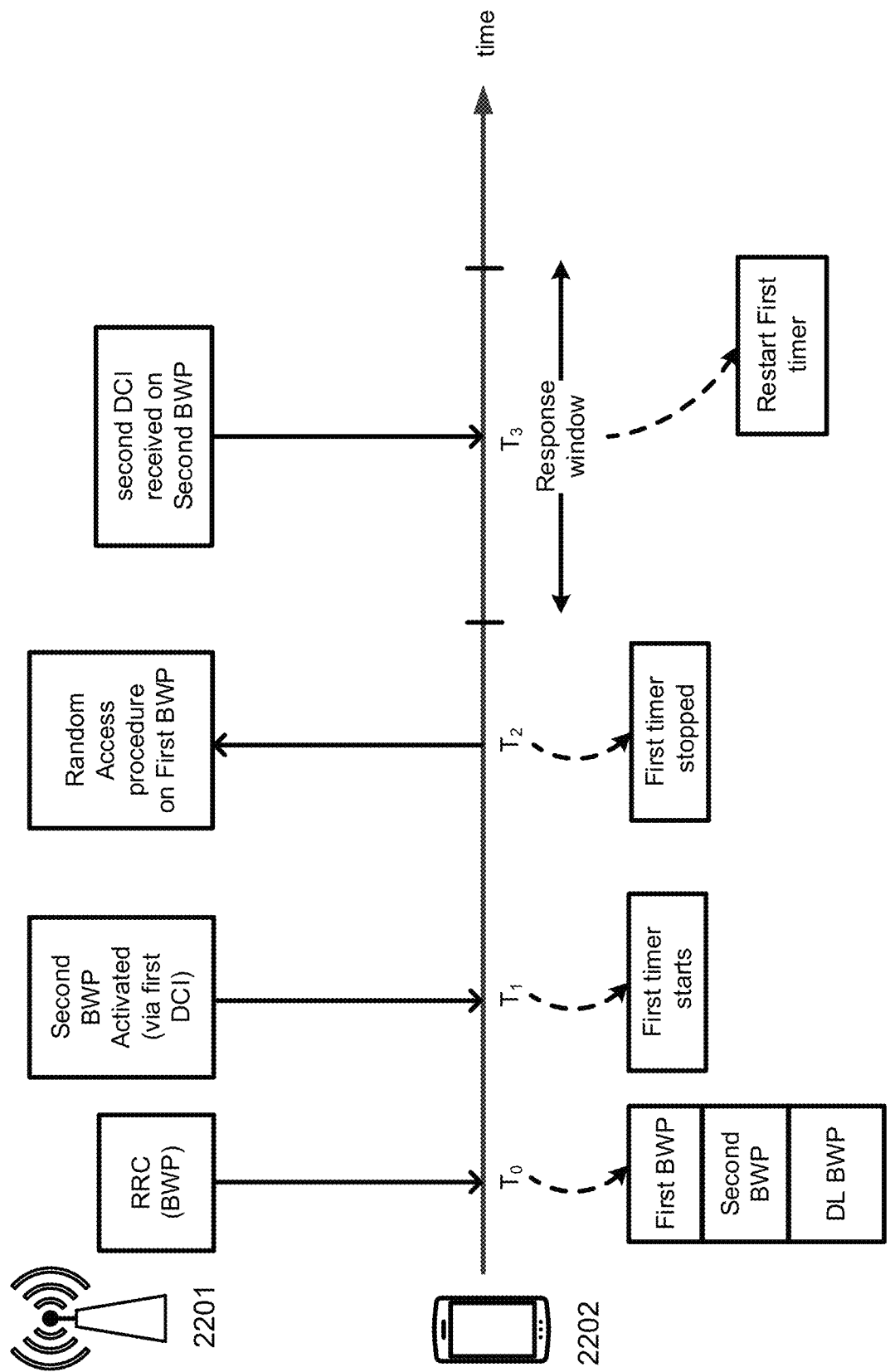
FIG. 22 shows an example of a random access procedure for a bandwidth part.

FIG. 22 shows an example of a random access procedure for a bandwidth part on a PCell. In some communication systems, a wireless device 2202 may restart a BWP inactivity timer, for example, if the wireless device 2202 completes a random access procedure such as by receiving DCI (e.g., associated with an C-RNTI). The wireless device 2202 may receive, from a base station 2201, one or more messages comprising configuration parameters at time T0. The one or more messages may comprise one or more RRC messages (e.g., RRC connection reconfiguration message, RRC connection reestablishment message, and/or RRC connection setup message). The configuration parameters may comprise BWP configuration parameters for a plurality of BWPs. The plurality of BWPs may comprise at least a DL BWP (e.g., default), a first BWP (e.g., UL BWP) and a second BWP (e.g., DL BWP). A wireless device may receive first DCI indicating switching an active BWP from the default DL BWP to the second BWP (e.g., at time T1). The first DCI may comprise a BWP indicator. The wireless device 2202 may determine that the first DCI indicates BWP switching based on the BWP indicator indicating a BWP different from the active BWP. The wireless device 2202 may start a first inactivity timer, for example, based on switching the active BWP from the DL BWP to the second BWP (e.g., at time T1).

At time T2, the wireless device 2202 may send (e.g., transmit) a random access preamble via the first BWP (e.g., active BWP) to initiate a random access procedure (e.g., contention free random access). The random access preamble may be dedicated to the wireless device 2202. The random access preamble may be wireless device-specific. The random access preamble may be configured for the wireless device by the base station 2201. The wireless device may stop a first inactivity timer of the second BWP (e.g., at time T2), for example, based on the initiating the random access procedure.

The wireless device 2202 may determine a start of a response window (e.g., ra-ResponseWindow) at a first PDCCH occasion from the end of the sending (e.g., transmitting) the random access preamble. The response window may be configured by a higher layer (e.g., MAC, RRC, etc.). The wireless device 2202 may monitor the first PDCCH occasion for second DCI, for example, if the response window is running. The second DCI may be indicated by an RA-RNTI of the wireless device. The second DCI indicated by the RA-RNTI may schedule a PDSCH transmission and/or a PUSCH transmission. The random access procedure may be completed successfully (e.g., at time T3), for example, if the wireless device 2202 receives the second DCI indicated by the RA-RNTI (e.g., during the response window). The wireless device 2202 may restart the first inactivity timer of the second BWP (e.g., at time T3), for example, based on the random access procedure being successfully completed.

Figure 23:
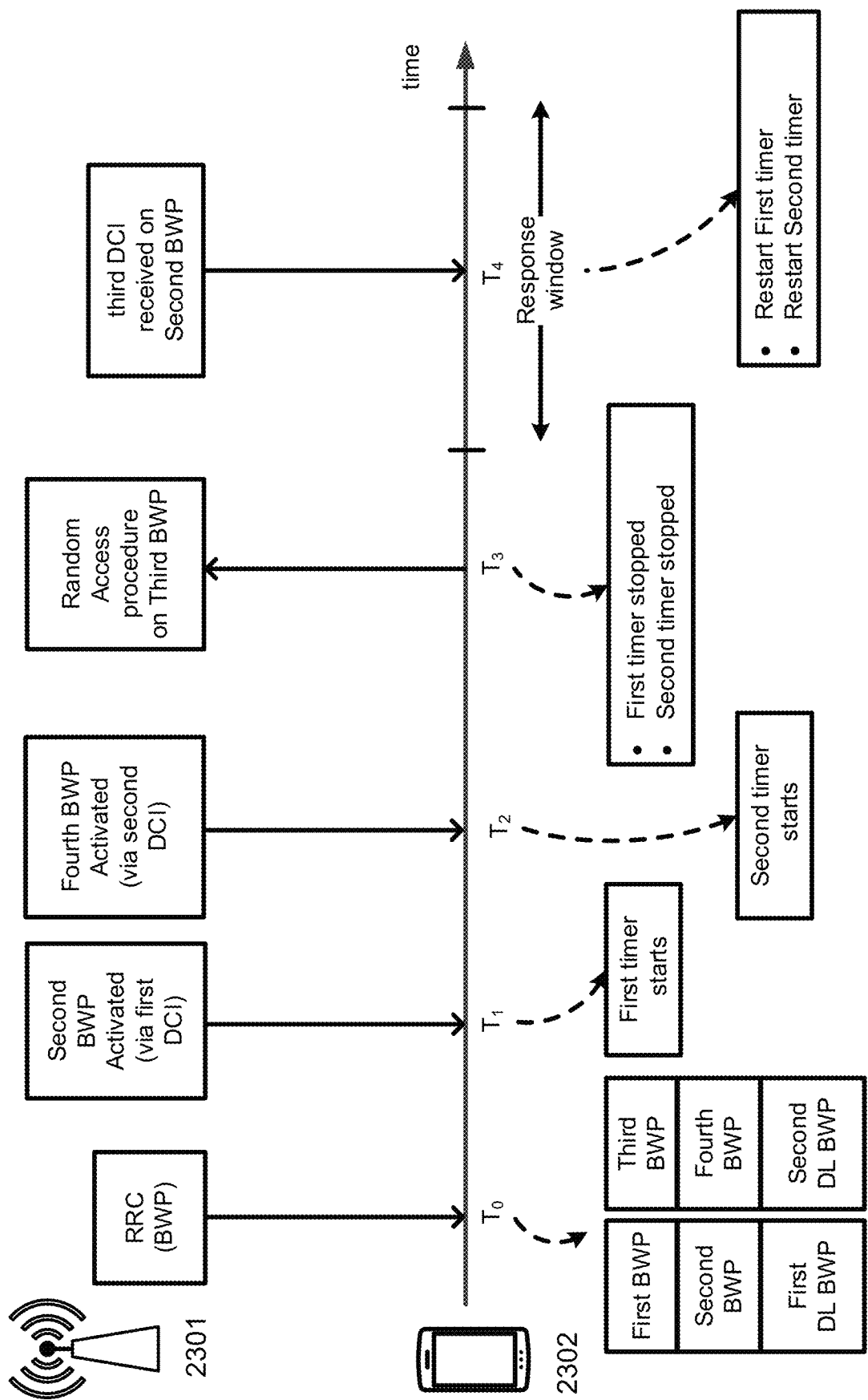
FIG. 23 shows an example of a random access procedure for a bandwidth part in carrier aggregation.

FIG. 23 shows an example of a random access procedure for a bandwidth part in carrier aggregation (e.g., on a secondary cell). In some communication systems, a wireless device may restart a BWP inactivity timer, for example, if the wireless device completes a random access procedure such as by receiving DCI associated with a C-RNTI and/or by receiving DCI associated with an RA-RNTI. A wireless device may receive, from a base station, one or more messages comprising configuration parameters (e.g., at time T0). The one or more messages may comprise one or more RRC messages (e.g., RRC connection reconfiguration message, RRC connection reestablishment message, and/or RRC connection setup message). The configuration parameters may comprise configuration parameters for a primary cell and one or more secondary cells. The one or more secondary cells may comprise at least a first secondary cell. The configuration parameters may comprise BWP configuration parameters for a plurality of BWPs. The plurality of BWPs may comprise a first plurality of BWPs of the primary cell comprising a first DL BWP (e.g., default DL BWP), a first BWP (e.g. UL BWP), and a second BWP (e.g. DL BWP). The plurality of BWPs may comprise a second plurality of BWPs of the first secondary cell comprising a second DL BWP (e.g., default DL BWP), a third BWP (e.g. UL BWP) and a fourth BWP (e.g. DL BWP).

A wireless device may receive first DCI indicating switching a first active BWP of the primary cell from the first DL BWP to the second BWP (e.g., at time T1). The first DCI may comprise a first BWP indicator. The wireless device may determine that the first DCI indicates BWP switching, for example, based on the first BWP indicator indicating a BWP different from the first active BWP. The wireless device may start a first inactivity timer, for example, based on switching the first active BWP from the first DL BWP to the second BWP (e.g., at time T1).

A wireless device may receive second DCI indicating switching a second active BWP of the first secondary cell from the second default DL BWP to the fourth BWP (e.g., at time T2). The second DCI may comprise a second BWP indicator. The wireless device may determine that the second DCI indicates BWP switching, for example, based on the second BWP indicator indicating a BWP different from the second active BWP. The wireless device may start a second inactivity timer, for example, based on switching the second active BWP from the second DL BWP to the fourth BWP (e.g., at time T2). The wireless device may start the second inactivity timer, for example, based on (e.g., in response to) receiving an SCell activation/deactivation MAC CE signal activating the first secondary cell.

The wireless device may send (e.g., transmit) a random access preamble via the third BWP (e.g., active BWP) of the first secondary cell, for example, to initiate a random access procedure (e.g., contention free random access) on the first secondary cell (e.g., at time T3). The random access preamble may be dedicated to the wireless device. The random access preamble may be dedicated to the wireless network. The random access preamble may be wireless device-specific. The random access preamble may be configured for the wireless device by the base station. The wireless device may stop a first inactivity timer of the second BWP of the primary cell and a second inactivity timer of the fourth BWP of the first secondary cell (e.g., at time T3), for example, based on the initiating the random access procedure. The wireless device may determine the beginning of a response window (e.g., ra-ResponseWindow) at a first PDCCH occasion on the second BWP of the primary cell from the end of the transmitting the random access preamble. The response window may be configured by a higher layer (e.g., MAC, RRC, etc.). The wireless device may monitor the first PDCCH occasion for third DCI, for example, if the response window is running.

The third DCI may be indicated by an RA-RNTI of the wireless device. The third DCI indicated by the RA-RNTI may schedule a PDSCH transmission and/or PUSCH transmission. The random access procedure may be completed successfully (e.g., at time T4), for example, if the wireless device receives the third DCI indicated by the RA-RNTI. The wireless device may restart the first inactivity timer of the second BWP and the second inactivity timer of the fourth BWP (e.g., at time T4), for example, based on the random access procedure being successfully completed.

Figure 24:
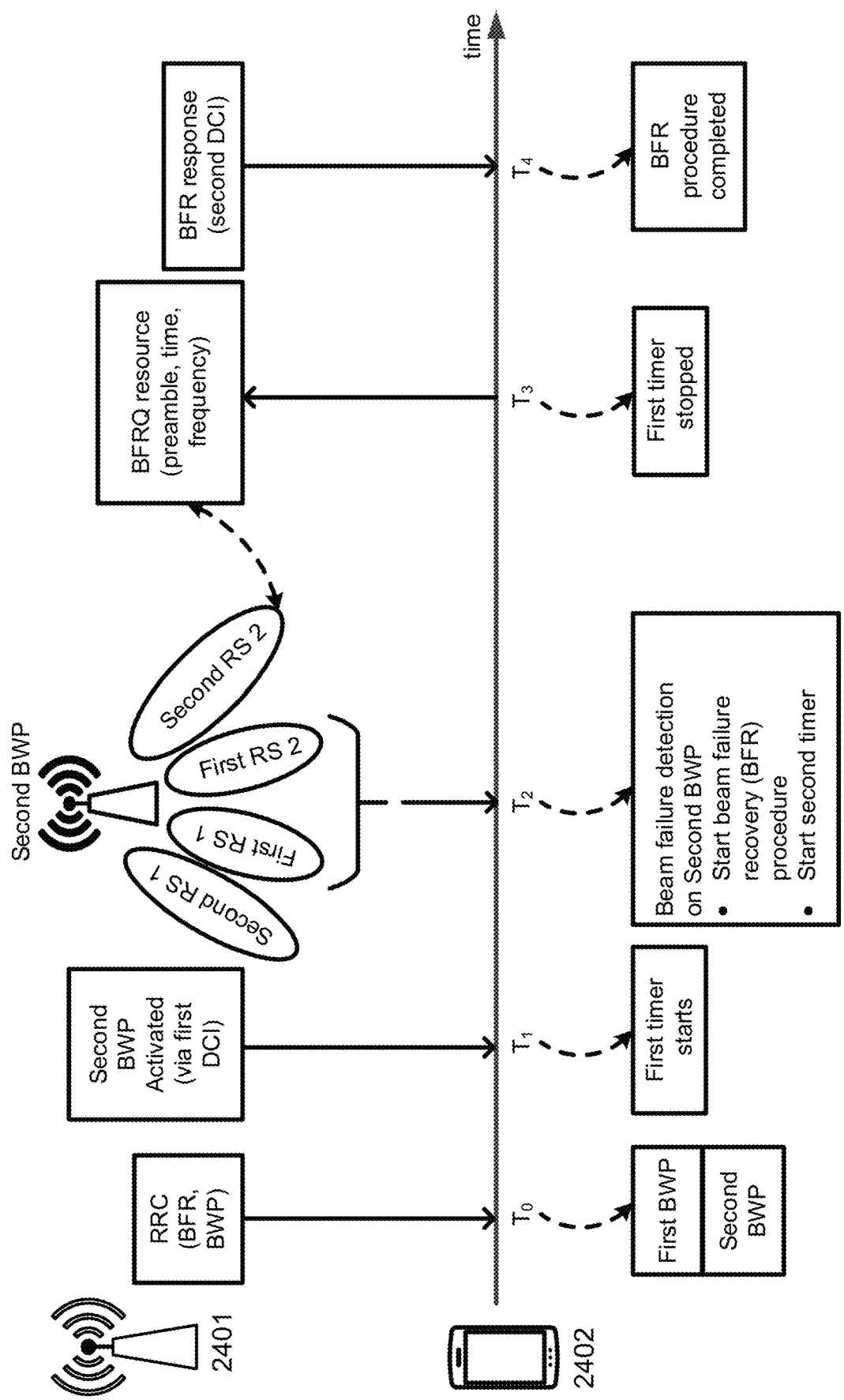
FIG. 24 shows an example of a downlink beam failure recovery procedure for a bandwidth part.

FIG. 24 shows an example of a beam failure recovery procedure for a primary cell. A wireless device 2402 may receive, from a base station 2401, one or more messages comprising configuration parameters at time T0. The one or more messages may comprise one or more RRC messages. The configuration parameters may comprise BWP configuration parameters for a plurality of BWPs comprising a first BWP (e.g., default BWP) and a second BWP (e.g., non-default BWP). The configuration parameters may comprise one or more BFR configuration parameters. The one or more BFR configuration parameters may comprise a first set of RS resource configurations for the second BWP. The first set of RS resource configurations may comprise one or more first RSs (e.g., CSI-RS or SS blocks) of the second BWP. The one or more BFR configuration parameters may comprise a second set of RS resource configurations comprising one or more second RSs (e.g., CSI-RS or SS blocks) of the second BWP. The wireless device 2402 may measure radio link quality of one or more beams associated with the one or more first RSs and/or the one or more second RSs. The one or more BFR configuration parameters may comprise one or more beam failure recovery request (BFRQ) resources associated with the second BWP. The one or more BFR configuration parameters may comprise an association between each of the one or more second RSs and each of the one or more BFRQ resources.

The wireless device 2402 may receive a first DCI indicating switching a current active BWP from a first BWP to a second BWP (e.g., at time T1). The first DCI may comprise a BWP indicator. The wireless device 2402 may determine that the first DCI indicates BWP switching, for example, based on the BWP indicator indicating a BWP different from the current active BWP. At time T1, the wireless device 2402 may start a first inactivity timer, for example, based on switching the current active BWP from the first BWP to the second BWP.

The wireless device 2402 may compare a first radio link quality of the one or more first RSs (First RS 1 and First RS 2) with a first threshold. The first threshold (e.g., hypothetical BLER, L1-RSRP) may be a first value provided by a higher layer (e.g., RRC, MAC, etc.). The wireless device 2402 may monitor at least one PDCCH of the second BWP. At least one RS (e.g., DM-RS) of the at least one PDCCH may be associated with (e.g., QCLed) the one or more first RSs.

The wireless device 2402 may detect a beam failure on the second BWP, for example, if the first radio link quality of the one or more first RSs satisfies certain criteria (e.g., at time T2). The wireless device 2402 may determine that a beam failure may occur, for example, if RSRP/SINR of the one or more first RSs is less than the first threshold and/or if BLER is greater than the first threshold. Such an assessment may be for a number (e.g., a consecutive number) of times, wherein a value of the number of times may be provided by a higher layer (e.g., RRC, MAC).

The wireless device 2402 may initiate a BFR procedure for the second BWP (e.g., at time T2), for example, based on detecting the beam failure on the second BWP. The wireless device 2402 may start a second timer (e.g., if configured) and/or initiate a candidate beam identification procedure, for example, based on initiating the BFR procedure. For the candidate beam identification procedure, the wireless device 2402 may identify a first RS in the one or more second RSs. The first RS (e.g., Second RS 2) may be associated with a BFRQ resource of the one or more BFRQ resources. The BFRQ resource may comprise at least one preamble and at least one PRACH (e.g., time and/or frequency) resource. A second radio link quality (e.g., BLER, L1-RSRP) of the first RS may be better (e.g., lower BLER, higher L1-RSRP, and/or higher SINR) than a second threshold. The second threshold may be a second value provided by the higher layer (e.g., RRC, MAC).

The wireless device 2402 may initiate a BFRQ transmission, for example, based on detecting the beam failure on the second BWP and identifying the first RS of the second BWP. The BFRQ transmission may comprise sending (e.g., transmitting), in a first slot, the at least one preamble via the at least one PRACH resource for the BFR procedure of the second BWP (e.g., at time T3). The wireless device 2402 may stop the first inactivity timer, for example, based on the initiating the BFRQ transmission. The wireless device 2402 may reset the first inactivity timer in addition to the stopping the first inactivity timer. The wireless device 2402 may start, from a second slot, monitoring for a BFR response, for example, based on sending (e.g., transmitting) the at least one preamble in the first slot.

The monitoring for the BFR response may comprise monitoring at least one second PDCCH in one or more coresets associated with the second BWP for a second DCI (e.g., a downlink assignment or an uplink grant) within a configured response window. The second DCI may be CRC scrambled by a C-RNTI of the wireless device 2402. The BFR procedure may be successfully completed (e.g., at time T4), for example, based on receiving the second DCI on the at least one second PDCCH in the one or more coresets, within the configured response window.

Figure 25:
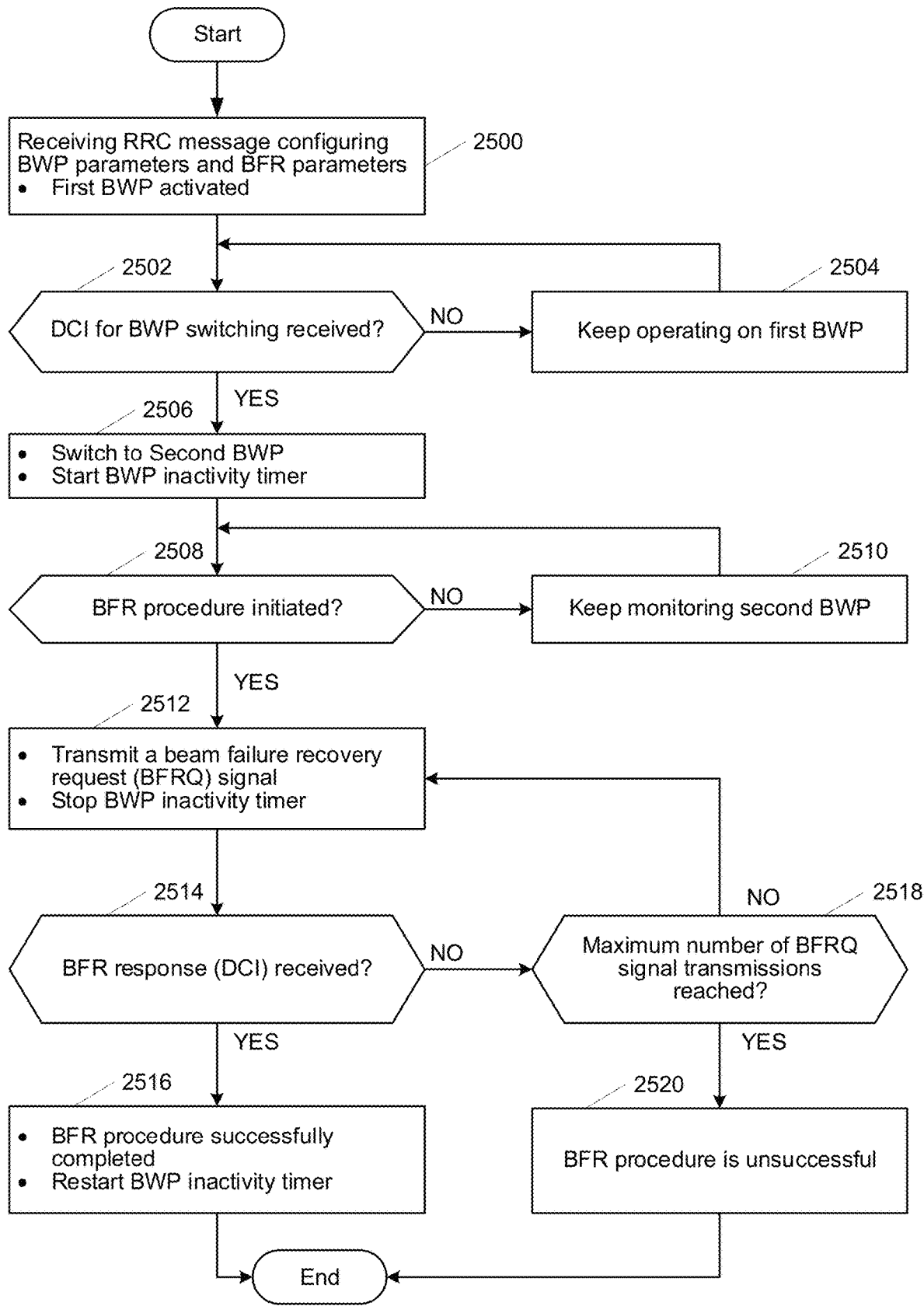
FIG. 25 shows an example flowchart of a downlink beam failure recovery procedure for a bandwidth part.

FIG. 25 shows an example flowchart of a BFR procedure for a primary cell. At step 2500, a wireless device may receive an RRC message configuring BWP parameters and BFR parameters. The first BWP may be activated. At step 2502, a wireless device may receive DCI for BWP switching. If the DCI is not received, the wireless device may keep operating via the first BWP at step 2504. At step 2506, if the DCI for BWP switching is received, the wireless device may switch to a second BWP and start a BWP inactivity timer. At step 2508, a BFR procedure may be initiated. If the BFR procedure is not initiated, the wireless device may keep monitoring the second BWP at step 2510. If the BFR procedure is initiated, at step 2512, the wireless device may transmit a BFRQ signal and stop the BWP inactivity timer. At step 2514, the wireless device may receive a BFR response. The BFR response may be received via DCI. At step 2516, if the BFR response is received, the wireless device may successfully complete the BFR procedure and restart the BWP inactivity timer. At step 2518, the wireless device may determine if a maximum number of BFRQ signal transmissions has been reached. If the maximum number of BFRQ signal transmissions has not been reached, the wireless device may transmit a BFRQ signal at step 2512. If the maximum number of BFRQ signal transmissions has been reached, the BFR procedure may end unsuccessfully at step 2520.

Figure 26:
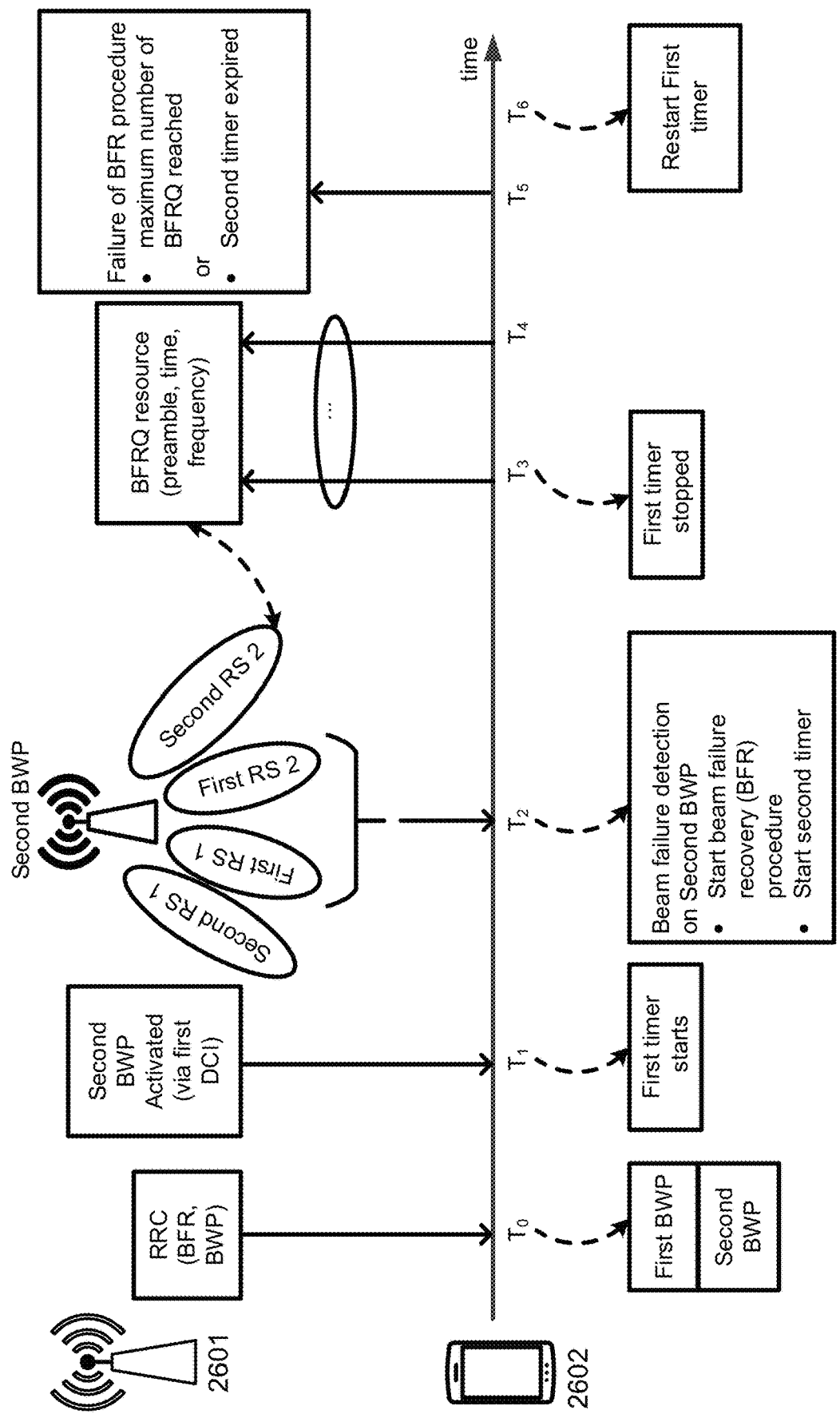
FIG. 26 shows an example of a downlink beam failure recovery procedure for a bandwidth part.

FIG. 26 is an example of a downlink beam failure recovery procedure for a bandwidth part. A wireless device 2602 may restart a BWP inactivity timer, for example, if a BFR procedure is unsuccessfully completed for a PCell and/or for an SCell. The wireless device 2602 may restart the BWP inactivity timer, for example, if a random access procedure (e.g., in a BFR procedure) is unsuccessfully completed for a PCell and/or for an SCell. The wireless device 2602 may determine a radio link failure and/or start re-establishing connection with a base station 2601 via an initial random access procedure, for example, if the wireless 2602 unsuccessfully completes a BFR procedure (e.g., for a primary cell). Steps at T0, T1, T2, and T3 as shown in FIG. 26 may be performed as described above with respect to T0, T1, T2, and T3 in FIG. 24. A maximum number of the BFRQ transmissions (e.g., preamble transmissions) for the BFR procedure may be reached before the BFR procedure is successfully completed (e.g., at time T4). The maximum number of the BFRQ transmissions (e.g., preamble transmissions) may be configured by a higher layer. A lower layer (e.g., physical layer) of the wireless device may indicate a failure of the BFR procedure to a higher layer (e.g., RRC) at a time T5. The lower layer (e.g., MAC layer) of the wireless device 2602 may restart the first inactivity timer at time T6, for example, based on indicating the failure of the BFR procedure.

The higher layer may indicate to a lower layer (e.g., physical layer, MAC layer, etc.) to restart the first inactivity timer at time T6, for example, based on receiving the failure of the BFR procedure at time T5. The second timer (e.g., if configured) may expire (e.g., at time T4) before the BFR procedure is successfully completed. A lower layer (e.g., physical layer) of the wireless device may indicate a failure of the BFR procedure to a higher layer (e.g., RRC) at time T5. The lower layer (e.g., MAC layer) of the wireless device 2602 may restart the first inactivity timer at time T6, for example, based on indicating the failure of the BFR procedure. The higher layer may indicate to a lower layer (e.g., physical layer, MAC layer) to restart the first inactivity timer at time T6, for example, based on receiving the failure of the BFR procedure at time T5.

Figure 27:
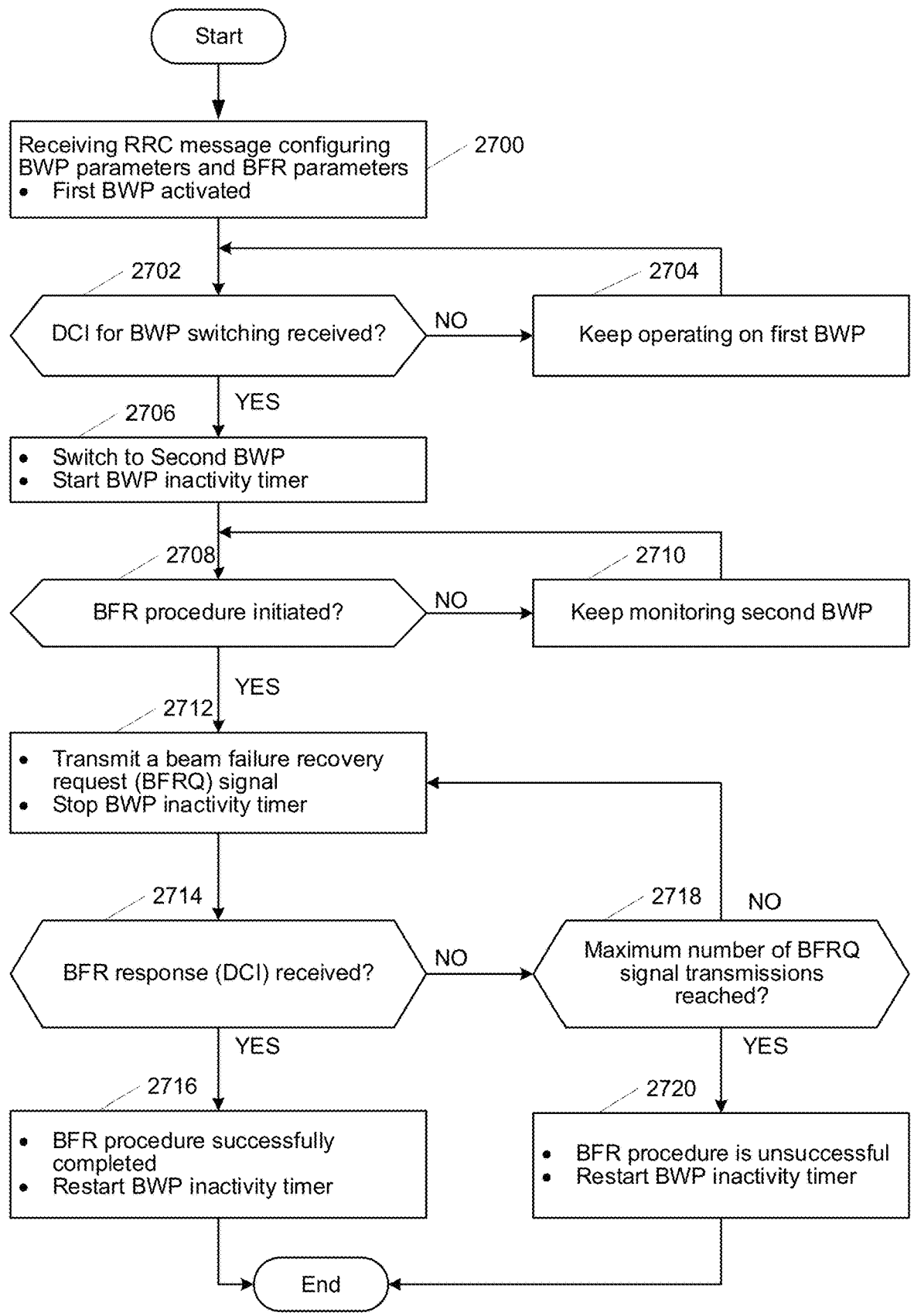
FIG. 27 shows an example flowchart of a downlink beam failure recovery procedure for a bandwidth part.

FIG. 27 shows an example flowchart of a downlink beam failure recovery procedure for a bandwidth part. At step 2700, a wireless device may receive an RRC message configuring BWP parameters and BFR parameters. The first BWP may be activated. At step 2702, a wireless device may receive DCI for BWP switching. If the DCI is not received, the wireless device may keep operating via the first BWP at step 2704. At step 2706, if the DCI for BWP switching is received, the wireless device may switch to a second BWP and start a BWP inactivity timer. At step 2708, a BFR procedure may be initiated. If the BFR procedure is not initiated, the wireless device may keep monitoring the second BWP at step 2710. If the BFR procedure is initiated, at step 2712 the wireless device may transmit a BFRQ signal and stop the BWP inactivity timer. At step 2714, a BFR response may be received. The BFR response may be received via DCI. At step 2716, if the BFR response is received, the wireless device may successfully complete the BFR procedure and restart the BWP inactivity timer. At step 2718, the wireless device may determine if a maximum number of BFRQ signal transmissions has been reached. If the maximum number of BFRQ signal transmissions has not been reached, the wireless device may transmit a BFRQ signal at step 2712. If the maximum number of BFRQ signal transmissions has been reached, the wireless device may determine that the BFR procedure has ended unsuccessfully and the wireless device may restart the BWP inactivity timer at step 2720.

A wireless device may receive, from a base station, one or more messages comprising one or more configuration parameters. The one or more configuration parameters may indicate at least a first value of a first BWP inactivity timer of a first BWP. The one or more configuration parameters may comprise at least one of one or more first reference signals of the first BWP, one or more second RSs of the first BWP, and/or one or more beam failure recovery request (BFRQ) resources via the first BWP. The one or more configuration parameters may indicate an association between each of the one or more second RSs and each of the one or more BFRQ resources. The one or more first RSs may comprise one or more first CSI-RSs and/or one or more first SS blocks. The one or more second RSs may comprise one or more second CSI-RSs and/or one or more second SS blocks. The wireless device may start the first BWP inactivity timer with the first value, for example, based on switching to the first BWP as an active BWP. The switching may be indicated by DCI and/or an expiry of an inactivity timer.

The wireless device may initiate a random access procedure for a beam failure recovery based on reaching a number of beam failure instance indications for the first BWP. The number of beam failure instance indications may be configured by a higher layer (e.g., RRC). The beam failure instance indications may comprise an indication of a beam failure instance from a physical layer of the wireless device to a medium-access layer of the wireless device. The beam failure instance may comprise determining whether the one or more first RSs have a radio quality less than a first threshold. The first threshold may be based on hypothetical BLER, RSRP, RSRQ, and/or SINR.

The random access procedure may comprise selecting an RS (e.g., a selected RS) from the one or more second RSs. The selected RS may be associated with a BFRQ resource. The BFRQ resource may be one of the one or more BRFQ resources. The BFRQ resource may comprise at least one preamble and at least one random access channel resource of the first BWP. The random access procedure may further comprise sending (e.g., transmitting), by a wireless device, the at least one preamble via the at least one random access channel resource. The at least one random access channel resource may comprise one or more time resources and/or one or more frequency resources. The selected RS may be associated with one of the one or more second RSs having a radio quality greater than a second threshold. The second threshold may be based on L1-RSRP, RSRQ, hypothetical BLER, and/or SINR. The wireless device may restart the first BWP inactivity timer, for example, based on the random access procedure being unsuccessful. The wireless device may monitor a control channel received via the first BWP.

Figure 28:
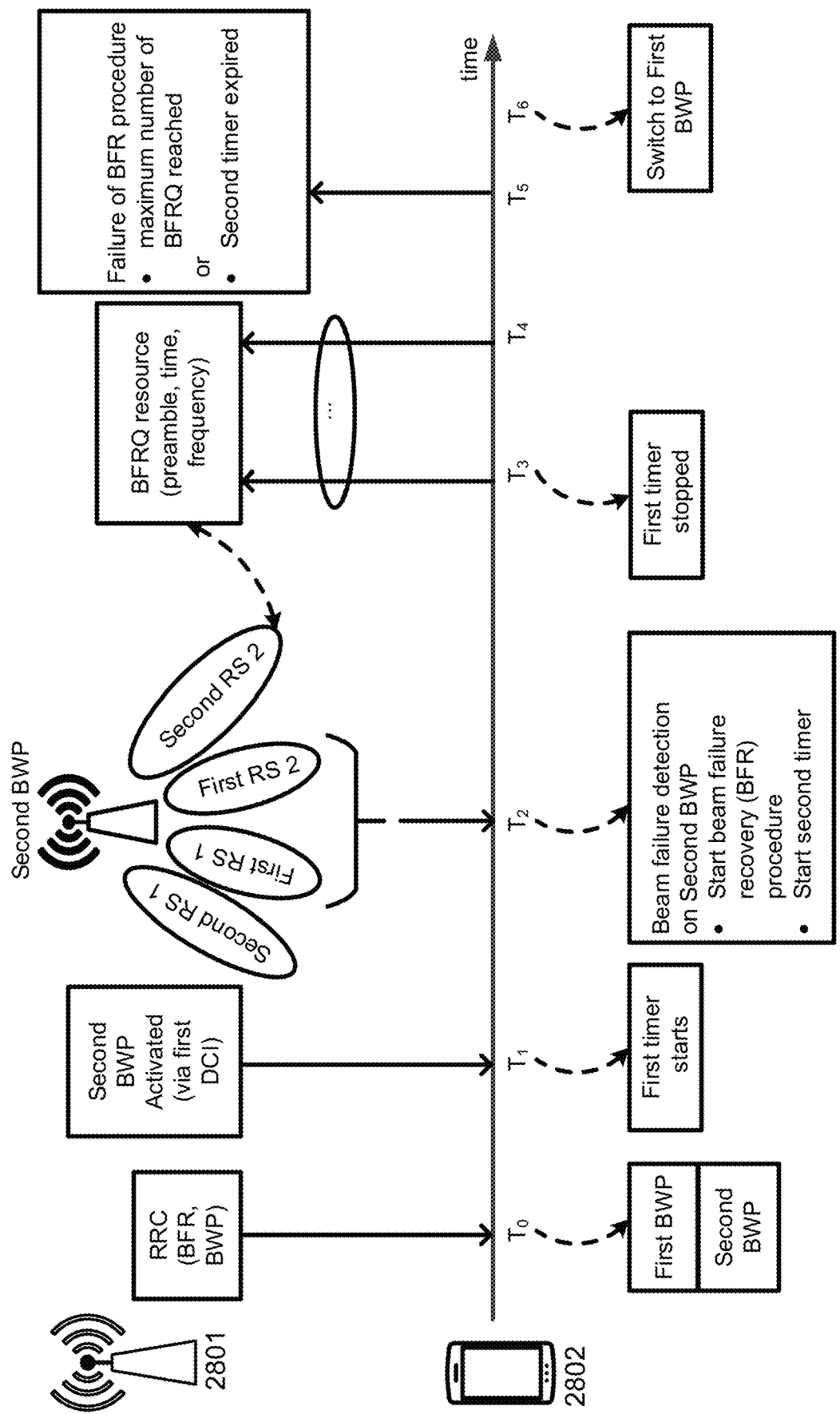
FIG. 28 shows an example of a downlink beam failure recovery procedure for a bandwidth part.

FIG. 28 shows an example of a downlink beam failure recovery procedure for a bandwidth part. A wireless device 2802 may switch (e.g., for a PCell and/or an SCell) to a default BWP, for example, if a BFR procedure is unsuccessfully completed. The wireless device 2802 may determine a radio link failure and/or start re-establishing a connection with a base station 2801 via an initial random access procedure, for example, if the wireless device 2802 unsuccessfully completes a BFR procedure for a primary cell. Steps at T0, T1, T2 and T3 may be performed as described above with respect to steps T0, T1, T2 and T3 in FIG. 24. The second timer (e.g., if configured) may expire before the BFR procedure is successfully completed. A lower layer (e.g., physical layer) of the wireless device may indicate a failure of the BFR procedure to a higher layer (e.g., RRC) at time T5. The wireless device 2802 may switch an active BWP from the second BWP to the first BWP (e.g., default BWP) at time T6, for example, based on indicating the failure of the BFR procedure. The higher layer may indicate to a lower layer (e.g., physical layer, medium-access layer) to switch an active BWP from the second BWP to the first BWP (e.g., default BWP) at time T6, for example, based on receiving the failure of the BFR procedure at time T5.

A maximum number of the BFRQ transmissions (e.g., preamble transmissions) for the BFR procedure may be reached before the BFR procedure is successfully completed (e.g., at time T4). The maximum number of the BFRQ transmissions may be configured by the higher layer. A lower layer (e.g. physical layer) of the wireless device 2802 may indicate a failure of the BFR procedure to a higher layer (e.g. RRC) at time T5. Based on indicating the failure of the BFR procedure, the wireless device 2802 may switch an active BWP from the second BWP to the first BWP (e.g. default BWP) at time T6. Based on receiving the failure of the BFR procedure at time T5, the higher layer may indicate to a lower layer (e.g. physical layer, medium-access layer) to switch an active BWP from the second BWP to the first BWP (e.g. default BWP) at time T6.

The wireless device 2802 may receive, from the base station 2801, one or more messages comprising one or more configuration parameters. The one or more configuration parameters may indicate at least a plurality of bandwidth parts (BWPs) comprising a first BWP and a second BWP. The one or more configuration parameters may indicate a first value of a first BWP inactivity timer of the first BWP. The one or more configuration parameters may indicate one or more first reference signals of the first BWP, one or more second RSs of the first BWP, and/or one or more beam failure recovery request (BFRQ) resources via the first BWP. The one or more configuration parameters may indicate an association between each of the one or more second RSs and each of the one or more BFRQ resources. The one or more first RSs may comprise one or more first CSI-RSs and/or one or more first SS blocks. The one or more second RSs may comprise one or more second CSI-RSs and/or one or more second SS blocks. The wireless device may start the first BWP inactivity timer with the first value, for example, based on switching to the first BWP as an active BWP. The switching may be indicated by DCI and/or by an expiry of an inactivity timer.

The wireless device 2802 may initiate a random access procedure for a beam failure recovery, for example, based on reaching a number of beam failure instance indications for the first BWP. The number of beam failure instance indications may be configured by a higher layer (e.g., RRC layer). The beam failure instance indications may comprise an indication of a beam failure instance from a physical layer of the wireless device 2802 to a medium-access layer of the wireless device. The beam failure instance may comprise assessing the one or more first RSs with radio quality lower than a first threshold. The first threshold may be based on hypothetical BLER, or RSRP, or RSRQ, or SINR.

The random access procedure may comprise the wireless device 2802 selecting an RS (e.g., a selected RS) from the one or more second RSs. The selected RS may be associated with a BFRQ resource. The BFRQ resource may be one of the one or more BRFQ resources. The BFRQ resource may comprise at least one preamble and/or at least one random access channel resource of the first BWP. The random access procedure may comprise sending (e.g., transmitting), by the wireless device 2802, the at least one preamble via the at least one random access channel resource. The at least one random access channel resource may comprise one or more time resources and/or one or more frequency resources. The selected RS may be associated with one of the one or more second RSs having a radio quality higher than a second threshold. The second threshold may be based on an L1-RSRP, RSRQ, hypothetical BLER, and/or SINR. The wireless device 2802 may switch from the first BWP to the second BWP as the active BWP, for example, based on the random access procedure being unsuccessful. The wireless device 2802 may start monitoring a control channel received via the second BWP.

Figure 29:
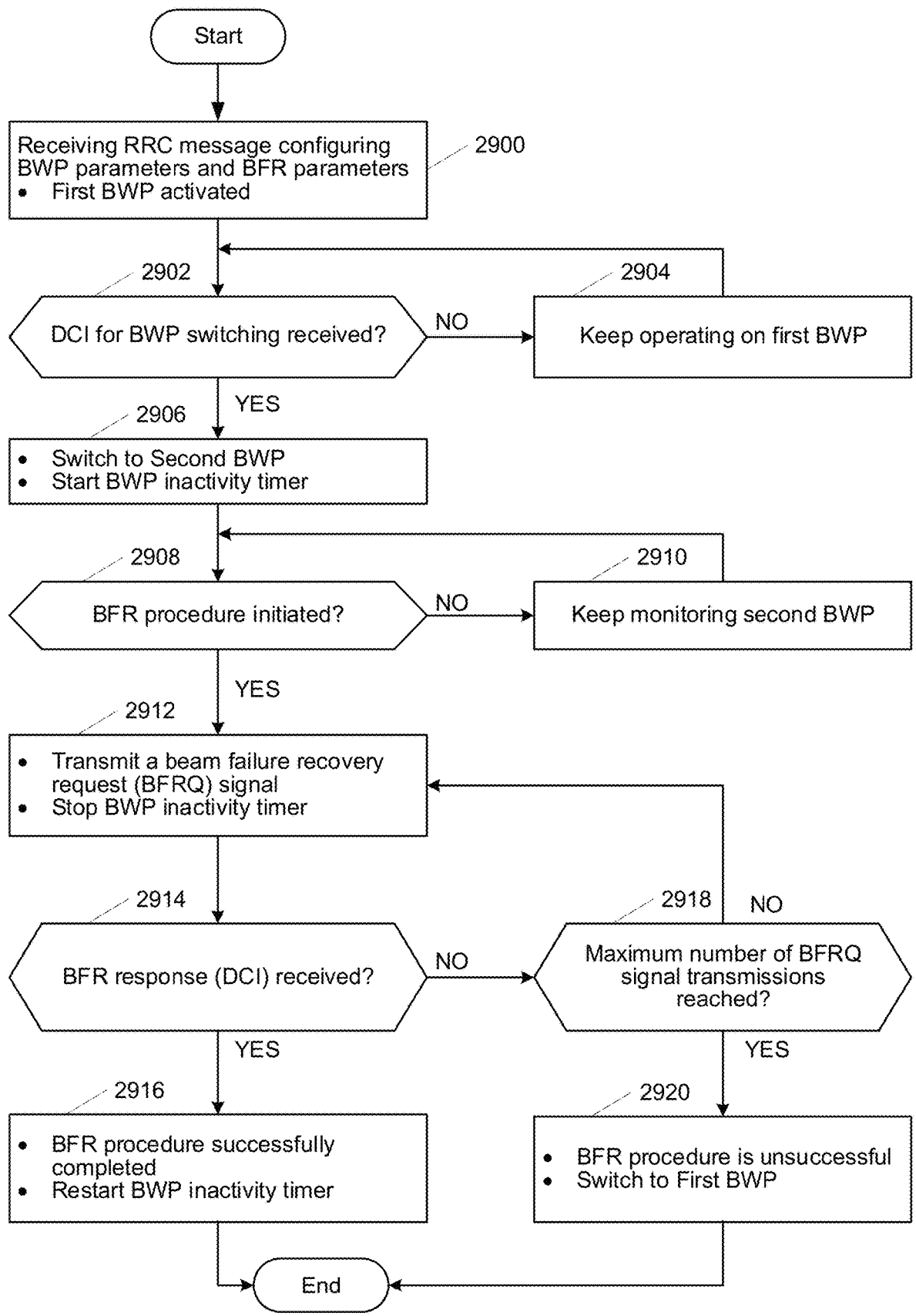
FIG. 29 shows an example flowchart of a downlink beam failure recovery procedure for a bandwidth part.

FIG. 29 shows an example flowchart of a downlink beam failure recovery procedure for a bandwidth part. At step 2900, a wireless device may receive a RRC message configuring BWP parameters and BFR parameters. The first BWP may be activated. At step 2902, a wireless device may receive DCI for BWP switching. If the DCI is not received, the wireless device may continue to operate via the first BWP at step 2904. At step 2906, if the DCI for BWP switching is received, the wireless device may switch to a second BWP and start a BWP inactivity timer. At step 2908, a BFR procedure may be initiated. If the BFR procedure is not initiated, the wireless device may continue to monitor the second BWP at step 2910. If the BFR procedure is initiated, at step 2912 the wireless device may transmit a BFRQ signal and stop the BWP inactivity timer. At step 2914, the wireless device may receive a BFR response. The BFR response may be received via DCI. At step 2916, if the BFR response is received, the wireless device may successfully complete the BFR procedure and restart the BWP inactivity timer. At step 2918, the wireless device may determine if a maximum number of BFRQ signal transmissions has been reached. If the maximum number of BFRQ signal transmissions has not been reached, the wireless device may send (e.g., transmit) a BFRQ signal, at step 2912. If the maximum number of BFRQ signal transmissions has been reached, the wireless device may determine that the BFR procedure has ended unsuccessfully and the wireless device may switch to the first BWP, at step 2920.

A wireless device may stop the BWP inactivity timer of the SCell and/or the PCell, for example, if the wireless device initiates a random access procedure for a secondary cell. The wireless device may stop the BWP inactivity timer of the PCell, for example, if a random access response is received via the PCell. The wireless device may stop the BWP inactivity timer of the SCell, for example, if the random access preamble is sent (e.g., transmitted) via the SCell. A number of options may be used to send (e.g., transmit) the BFR uplink signal (e.g., preamble) and the BFR response (e.g., DCI) for a BFR procedure of an SCell. The BFR uplink signal may be sent (e.g., transmitted) via a PCell and the BFR response may be received via the PCell. The wireless device may send (e.g., transmit) the BFR uplink signal via the PCell and/or receive the BFR response via the SCell. The wireless device may send (e.g., transmit) the BFR uplink signal may via the SCell and/or receive the BFR response via the SCell. The wireless device may send (e.g., transmit) the BFR uplink signal via the SCell and/or receive the BFR response via the PCell.

Figure 30:
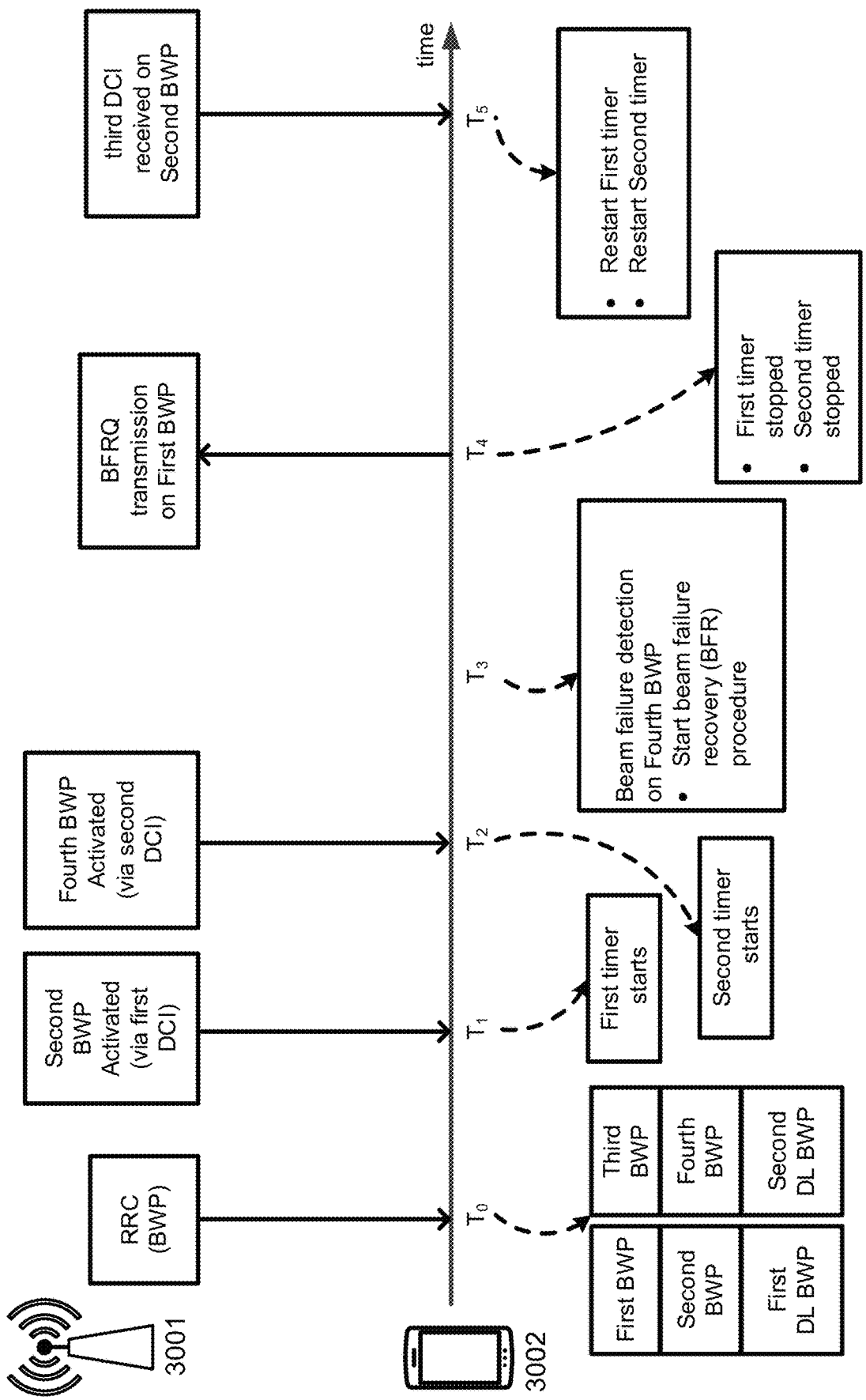
FIG. 30 shows an example of a downlink beam failure recovery procedure for a bandwidth part in carrier aggregation.

FIG. 30 shows an example of a downlink beam failure recovery procedure for a bandwidth part in carrier aggregation. A wireless device 3002 may receive, from a base station 3001, one or more messages comprising configuration parameters (e.g., at time T0). The one or more messages may comprise one or more RRC messages (e.g., RRC connection reconfiguration message, RRC connection reestablishment message, and/or RRC connection setup message). The configuration parameters may comprise configuration parameters for a primary cell and one or more secondary cells. The one or more secondary cells may comprise a first secondary cell. The configuration parameters may comprise BWP configuration parameters for a plurality of BWPs. The plurality of BWPs may comprise a first plurality of BWPs of the primary cell comprising a first DL BWP (e.g., default DL BWP), a first BWP (e.g., UL BWP), and/or a second BWP (e.g., DL BWP). The plurality of BWPs may comprise a second plurality of BWPs of the first secondary cell comprising: a second DL BWP (e.g., default DL BWP), a third BWP (e.g., UL BWP), and/or a fourth BWP (e.g., DL BWP).

The configuration parameters may comprise one or more BFR configuration parameters. The one or more BFR configuration parameters may comprise a first set of RS resource configurations for the fourth BWP. The first set of RS resource configurations may comprise one or more first RSs (e.g., CSI-RS and/or SS blocks) of the fourth BWP. The one or more BFR configuration parameters may comprise a second set of RS resource configurations comprising one or more second RSs (e.g., CSI-RS and/or SS blocks) of the fourth BWP. The wireless device 3002 may measure radio link quality of one or more beams associated with the one or more first RSs and/or the one or more second RSs. The one or more BFR configuration parameters may comprise one or more BFRQ resources of the first BWP. The one or more BFR configuration parameters may further comprise an association between each of the one or more second RSs and each of the one or more BFRQ resources.

The wireless device 3002 may receive a first DCI indicating switching a first current active DL BWP from a first default DL BWP of the primary cell to the second BWP (e.g., at time T1). The first DCI may comprise a first BWP indicator. The wireless device 3002 may determine that the first DCI indicates BWP switching, for example, based on the first BWP indicator indicating a BWP different from the first current active DL BWP. The wireless device 3002 may start a first inactivity timer, for example, based on switching the first current active DL BWP from the first DL BWP to the second BWP (e.g., at time T1).

The wireless device 3002 may receive a second DCI indicating switching a second current active DL BWP from a second default DL BWP of the first secondary cell to the fourth BWP (e.g., at time T2). The second DCI may comprise a second BWP indicator. The wireless device 3002 may determine that the second DCI indicates BWP switching, for example, based on the second BWP indicator indicating a BWP different from the second current active DL BWP. The wireless device 3002 may start a second inactivity timer, for example, based on switching the second current active DL BWP from the second DL BWP to the fourth BWP (e.g., at time T2).

The wireless device 3002 may compare a first radio link quality of the one or more first RSs with a first threshold. The first threshold (e.g., hypothetical BLER, L1-RSRP, etc.) may comprise a first value provided by a higher layer (e.g., RRC, MAC). The wireless device 3002 may monitor at least one PDCCH of the fourth BWP. At least one RS (e.g., DM-RS) of the at least one PDCCH may be associated with (e.g., QCLed) the one or more first RSs.

The wireless device 3002 may detect a beam failure on the fourth BWP, for example, if the first radio link quality of the one or more first RSs satisfies certain criteria (e.g., at time T3). The wireless device 3002 may determine that a beam failure has occurred, for example, if RSRP/SINR of the one or more first RSs is less than the first threshold and/or if BLER is greater than the first threshold. Such an assessment may be for a number (e.g., a consecutive number) of times, wherein a value of the number of times may be provided by a higher layer (e.g. RRC, MAC).

The wireless device 3002 may initiate a BFR procedure for the fourth BWP (e.g., at time T3), for example, based on detecting the beam failure on the fourth BWP. The wireless device 3002 may start a beam failure recovery timer (e.g., if configured), and/or the wireless device 3002 may initiate a candidate beam identification procedure, for example, based on initiating the BFR procedure. For the candidate beam identification procedure, the wireless device 3002 may identify a first RS of the one or more second RSs. The first RS may be associated with a BFRQ resource of the one or more BFRQ resources of the first BWP of the primary cell. The BFRQ resource may comprise at least one preamble and at least one PRACH (e.g., time and/or frequency) resource. A second radio link quality (e.g., BLER, L1-RSRP) of the first RS may be better (e.g., lower BLER, higher L1-RSRP, and/or higher SINR) than a second threshold. The second threshold may be associated with a second value provided by the higher layer (e.g., RRC, MAC).

The wireless device 3002 may initiate a BFRQ transmission via the first BWP of the primary cell (e.g., at time T4), for example, based on detecting the beam failure on the fourth BWP and identifying the first RS of the fourth BWP. The BFRQ transmission may comprise sending (e.g., transmitting), in a first slot, the at least one preamble via the at least one PRACH resource for a BFR procedure of the first secondary cell (e.g., at time T4). The wireless device 3002 may stop a first inactivity timer of the second BWP of the primary cell, for example, based on the initiating the BFRQ transmission. The wireless device 3002 may refrain from stopping (e.g., not shown in FIG. 30) a second inactivity timer of the fourth BWP. The wireless device 3002 may stop a second inactivity timer of the fourth BWP in addition to the stopping the first inactivity timer of the second BWP.

Based on transmitting the at least one preamble in the first slot, the wireless device 3002 may start, from a second slot, monitoring for a BFR response. The monitoring for the BFR response may comprise monitoring at least one second PDCCH in one or more coresets of the second BWP for third DCI (e.g., a downlink assignment or an uplink grant) within a configured response window. The third DCI may be scrambled with a CRC by a C-RNTI of the wireless device 3002. One or more RSs (e.g., DMRS) of the at least one second PDCCH may be associated (e.g., QCLed) with one or more serving RSs of the second BWP.

The BFR procedure may be successfully completed at time T5, for example, based on the wireless device 3002 receiving the third DCI on the at least one second PDCCH in the one or more coresets, within the configured response window. The wireless device may restart the first inactivity timer of the second BWP of the primary cell, for example, if the wireless device receives the third DCI addressed to the C-RNTI of the wireless device 3002. The wireless device 3002 may restart the second inactivity timer of the fourth BWP of the first secondary cell, in addition to restarting the first inactivity timer of the second BWP of the primary cell (if stopped), for example, if the wireless device 3002 receives the third DCI addressed to the C-RNTI of the wireless device.

The beam failure recovery timer (e.g., if configured) may expire before the BFR procedure is successfully completed. A lower layer (e.g., physical layer) of the wireless device 3002 may indicate a failure of the BFR procedure to a higher layer (e.g., RRC). The wireless device 3002 may declare a failure of the BFR procedure, for example, based on the beam failure recovery timer being expired. The wireless device 3002 may restart the first inactivity timer of the second BWP of the primary cell, for example, based on declaring the failure of the BFR procedure. Declaring the failure of the BFR procedure may result in the wireless device restarting the second inactivity timer of the fourth BWP of the first secondary cell, for example, in addition to the wireless device 3002 restarting the first inactivity timer of the second BWP of the primary cell (if stopped). Declaring the failure of the BFR procedure may result in the wireless device 3002 switching the second current active DL BWP of the first secondary cell from the fourth BWP to the second DL BWP, for example, in addition to the wireless device 3002 restarting the first inactivity timer of the second BWP of the primary cell.

A maximum number of the BFRQ transmissions (e.g., preamble transmissions) for the BFR procedure may be reached before the BFR procedure is successfully completed. The maximum number of the BFRQ transmissions may be configured by the higher layer. The wireless device 3002 may declare a failure of the BFR procedure, for example, based on the maximum number of the BFRQ transmissions being reached. The wireless device 3002 may restart the first inactivity timer of the second BWP of the primary cell, for example, based on declaring the failure of the BFR procedure. Declaring the failure of the BFR procedure may result in the wireless device 3002 restarting the second inactivity timer of the fourth BWP of the first secondary cell, for example, in addition to the wireless device 3002 restarting the first inactivity timer of the second BWP of the primary cell, if stopped. Declaring the failure of the BFR procedure may result in the wireless device 3002 switching the second current active DL BWP of the first secondary cell from the fourth BWP to the second DL BWP, for example, in addition to the wireless device 3002 restarting the first inactivity timer of the second BWP of the primary cell.

Figure 31:
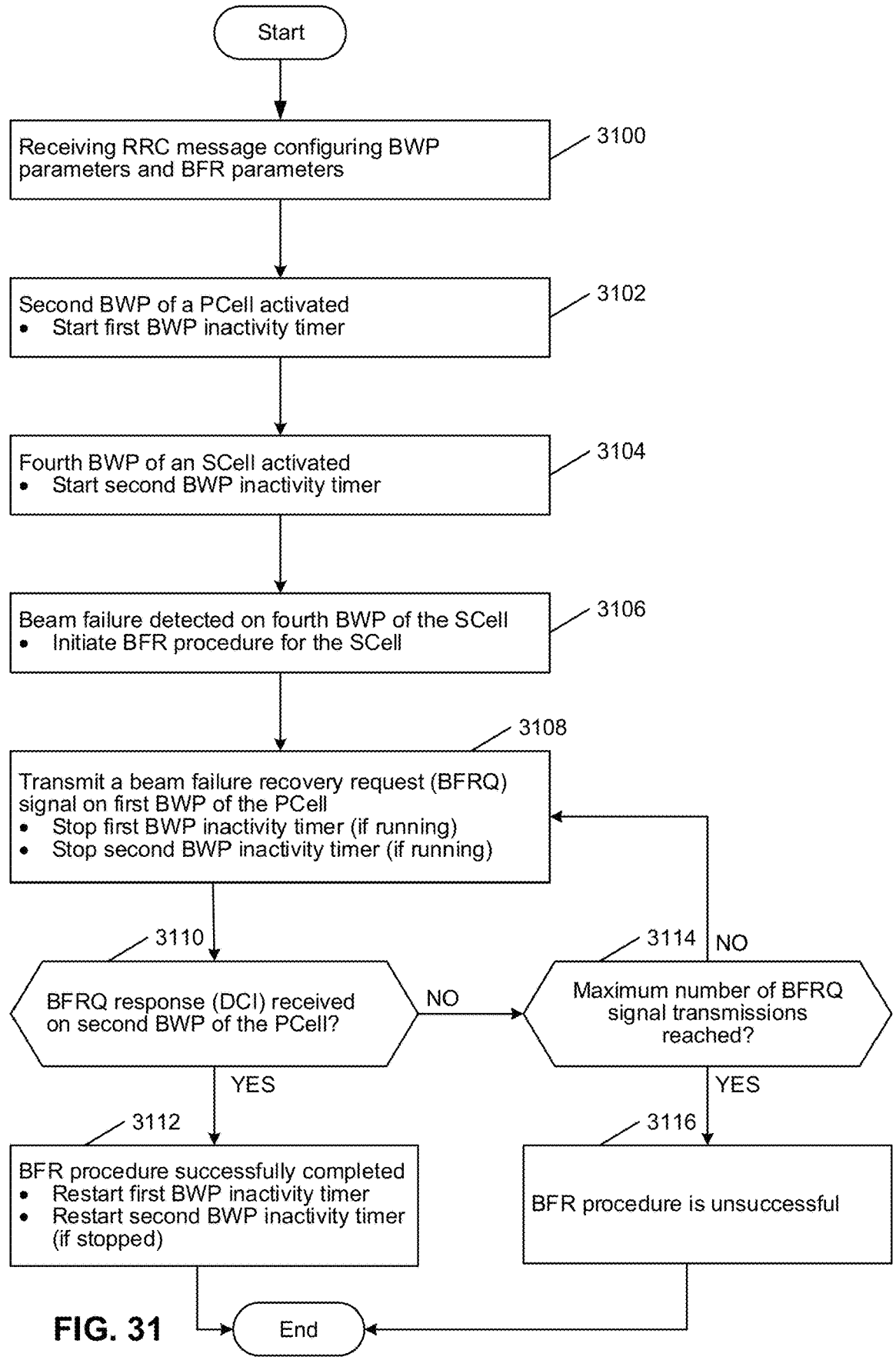
FIG. 31 shows an example flowchart of a downlink beam failure recovery procedure for a bandwidth part in carrier aggregation.

FIG. 31 shows an example flowchart of a downlink beam failure recovery procedure for a bandwidth part in carrier aggregation. At step 3100, a wireless device may receive RRC parameters configuring a BWP and BFR parameters. At step 3102, a second BWP of a PCell may be activated and a wireless device may start a first BWP inactivity timer. At step 3104, a fourth BWP of a SCell may be activated and a wireless device may start a second BWP inactivity timer. At step 3106, a beam failure may be detected on the fourth BWP of the SCell and the wireless device may initiate a BFR procedure for the SCell. At step 3108, the wireless device may send (e.g., transmit) a BFRQ signal via the first BWP of the PCell. The wireless device may stop the first BWP inactivity timer and/or the second BWP inactivity timer, for example, if running. At step 3110, if the wireless device receives a BFRQ response on a second BWP of the PCell, the BFR procedure may be successfully completed at step 3112. The wireless device may restart the first BWP inactivity timer and/or the second BWP inactivity timer, for example, if stopped. At step 3110, if the wireless device does not receive a BFRQ response on a second BWP of the PCell, the wireless device may determine if a maximum number of BFRQ signal transmissions has been reached at step 3114. If the maximum number of BFRQ signal transmissions has not been reached at step 3114, the wireless device may send (e.g., transmit) a BFRQ signal via the first BWP of the PCell at step 3108. If the maximum number of BFRQ signal transmissions has been reached at step 3114, the wireless device may determine that the BFR procedure is unsuccessful at step 3116.

A BFR uplink signal may be sent (e.g., transmitted) and on the SCell and the BFR response may be received on the SCell. The wireless device may refrain from stopping the BWP inactivity timer of the PCell, such that operations on the PCell may not be affected by the BFR procedure on the SCell.

Figure 32:
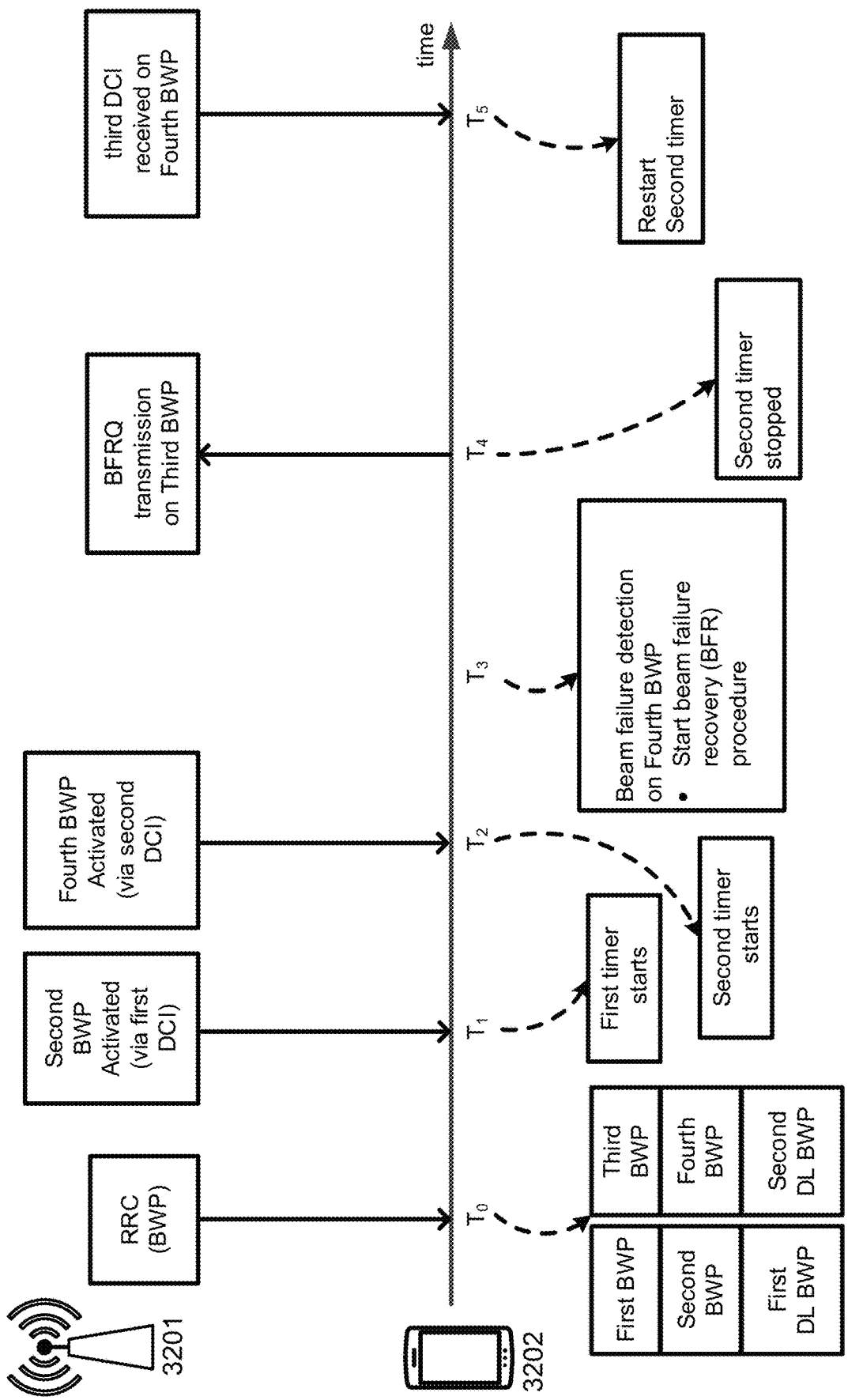
FIG. 32 shows an example of a downlink beam failure recovery procedure for a bandwidth part in carrier aggregation.

FIG. 32 shows an example of a downlink beam failure recovery procedure for a bandwidth part in carrier aggregation. A wireless device 3202 may receive, from a base station 3201, one or more messages comprising configuration parameters (e.g., at time T0). The one or more messages may comprise one or more RRC messages (e.g., RRC connection reconfiguration message, RRC connection reestablishment message, and/or RRC connection setup message). The configuration parameters may comprise configuration parameters for a primary cell and one or more secondary cells. The one or more secondary cells may comprise a first secondary cell. The configuration parameters may comprise BWP configuration parameters for a plurality of BWPs. The plurality of BWPs may comprise a first plurality of BWPs of the primary cell comprising a first DL BWP (e.g., default DL BWP), a first BWP (e.g. UL BWP), and/or a second BWP (e.g. DL BWP). The plurality of BWPs may comprise a second plurality of BWPs of the first secondary cell comprising a second DL BWP (e.g., default DL BWP), a third BWP (e.g. UL BWP), and a fourth BWP (e.g. DL BWP).

The configuration parameters may comprise one or more BFR configuration parameters. The one or more BFR configuration parameters may comprise a first set of RS resource configurations for the fourth BWP. The first set of RS resource configurations may comprise one or more first RSs (e.g., CSI-RS or SS blocks) of the fourth BWP. The one or more BFR configuration parameters may comprise a second set of RS resource configurations comprising one or more second RSs (e.g., CSI-RS or SS blocks) of the fourth BWP. The wireless device 3202 may measure radio link quality of one or more beams associated with the one or more first RSs and/or the one or more second RSs. The one or more BFR configuration parameters may comprise one or more BFRQ resources of the third BWP. The one or more BFR configuration parameters may comprise an association between each of the one or more second RSs and each of the one or more BFRQ resources.

The wireless device 3202 may receive first DCI indicating switching a first current active DL BWP from a first default DL BWP of the primary cell to the second BWP (e.g., at time T1). The first DCI may comprise a first BWP indicator. The wireless device 3202 may determine that the first DCI indicates BWP switching, for example, based on the first BWP indicator indicating a BWP different from the first current active DL BWP. The wireless device 3202 may start a first inactivity timer, for example, based on switching the first current active DL BWP from the first DL BWP to the second BWP (e.g., at time T1).

The wireless device 3202 may receive a second DCI indicating switching a second current active DL BWP from a second DL BWP of the first secondary cell to the fourth BWP (e.g., at time T2). The second DCI may comprise a second BWP indicator. The wireless device 3202 may determine that the second DCI indicates BWP switching, for example, based on the second BWP indicator indicating a BWP different from the second current active DL BWP. The wireless device 3202 may start a second inactivity timer, for example, based on switching the second current active DL BWP from the second DL BWP to the fourth BWP (e.g., at time T2).

The wireless device 3202 may compare a first radio link quality of the one or more first RSs with a first threshold. The first threshold (e.g., hypothetical BLER, L1-RSRP) may be a first value provided by a higher layer (e.g., RRC, MAC). The wireless device 3202 may monitor at least one PDCCH of the fourth BWP. At least one RS (e.g., DM-RS) of the at least one PDCCH may be associated with (e.g., QCLed) the one or more first RSs.

The wireless device 3202 may detect a beam failure on the fourth BWP, for example, if the first radio link quality of the one or more first RSs satisfies certain criteria (e.g., at time T3). The wireless device 3202 may determine that a beam failure may occur, for example, if RSRP/SINR of the one or more first RSs is less than the first threshold and/or if BLER is greater than the first threshold. Such an assessment may be for a number (e.g., a consecutive number) of times, wherein a value of the number of times may be provided by a higher layer (e.g., RRC, MAC).

The wireless device 3202 may initiate a BFR procedure for the fourth BWP (e.g., at time T3), for example, based on detecting the beam failure on the fourth BWP. The wireless device 3202 may start a beam failure recovery timer (if configured) and/or initiate a candidate beam identification procedure, for example, based on initiating the BFR procedure. For the candidate beam identification procedure, the wireless device 3202 may identify a first RS in the one or more second RSs. The first RS may be associated with a BFRQ resource of the one or more BFRQ resources of the third BWP of the first secondary cell. The BFRQ resource may comprise at least one preamble and at least one PRACH (e.g., time and/or frequency) resource. A second radio link quality (e.g., BLER, L1-RSRP) of the first RS may be better (e.g., lower BLER, higher L1-RSRP, or higher SINR) than a second threshold. The second threshold may be a second value provided by the higher layer (e.g., RRC, MAC).

The wireless device 3202 may initiate a beam failure recovery request (BFRQ) transmission via the third BWP of the first secondary cell (e.g., at time T4), for example, based on detecting the beam failure on the fourth BWP and identifying the first RS of the fourth BWP. The BFRQ transmission may comprise sending (e.g., transmitting), in a first slot, the at least one preamble via the at least one PRACH resource for a BFR procedure of the first secondary cell (e.g., at time T4). The wireless device 3202 may stop a second inactivity timer of the fourth BWP, for example, based on the initiating the BFRQ transmission. The base station 3201 may send a response to a BFRQ transmission on one or more downlink resources of the first secondary cell. The wireless device 3202 may refrain from stopping a first inactivity timer of the second BWP of the primary cell.

Based on transmitting the at least one preamble in the first slot, the wireless device 3202 may start, from a second slot, monitoring for a BFR response. The monitoring for the BFR response may comprise monitoring at least one second PDCCH in one or more coresets of the fourth BWP for third DCI (e.g., a downlink assignment or an uplink grant) within a configured response window. The third DCI may be CRC scrambled by a C-RNTI of the wireless device 3202. One or more RSs (e.g., DMRS) of the at least one second PDCCH may be associated (e.g., QCLed) with the first RS of the fourth BWP.

The BFR procedure may be successfully completed at time T5, for example, based on the wireless device 3202 receiving the third DCI on the at least one second PDCCH in the one or more coresets, within the configured response window. The wireless device 3202 may restart the second inactivity timer of the fourth BWP of the first secondary cell, for example, based on receiving the third DCI addressed to the C-RNTI of the wireless device 3202.

The beam failure recovery timer (e.g., if configured) may expire before the BFR procedure is successfully completed. A lower layer (e.g., physical layer) of the wireless device 3202 may indicate a failure of the BFR procedure to a higher layer (e.g., RRC). The wireless device 3202 may declare a failure of the BFR procedure, for example, based on the beam failure recovery timer being expired. The wireless device 3202 may restart the second inactivity timer of the fourth BWP of the first secondary cell, for example, based on declaring the failure of the BFR procedure. The wireless device 3202 may switch the second current active DL BWP of the first secondary cell from the fourth BWP to the second DL BWP, for example, based on declaring the failure of the BFR procedure.

A maximum number of the BFRQ transmissions (e.g., preamble transmissions) for the BFR procedure may be reached before the BFR procedure is successfully completed. The maximum number of the BFRQ transmissions may be configured by the higher layer. The wireless device 3202 may declare a failure of the BFR procedure, for example, based on the maximum number of the BFRQ transmissions being reached. The wireless device 3202 may restart the second inactivity timer of the fourth BWP of the first secondary cell, for example, based on declaring the failure of the BFR procedure. Declaring the failure of the BFR procedure may result in the wireless device 3202 switching the second current active DL BWP of the first secondary cell from the fourth BWP to the second DL BWP.

Figure 33:
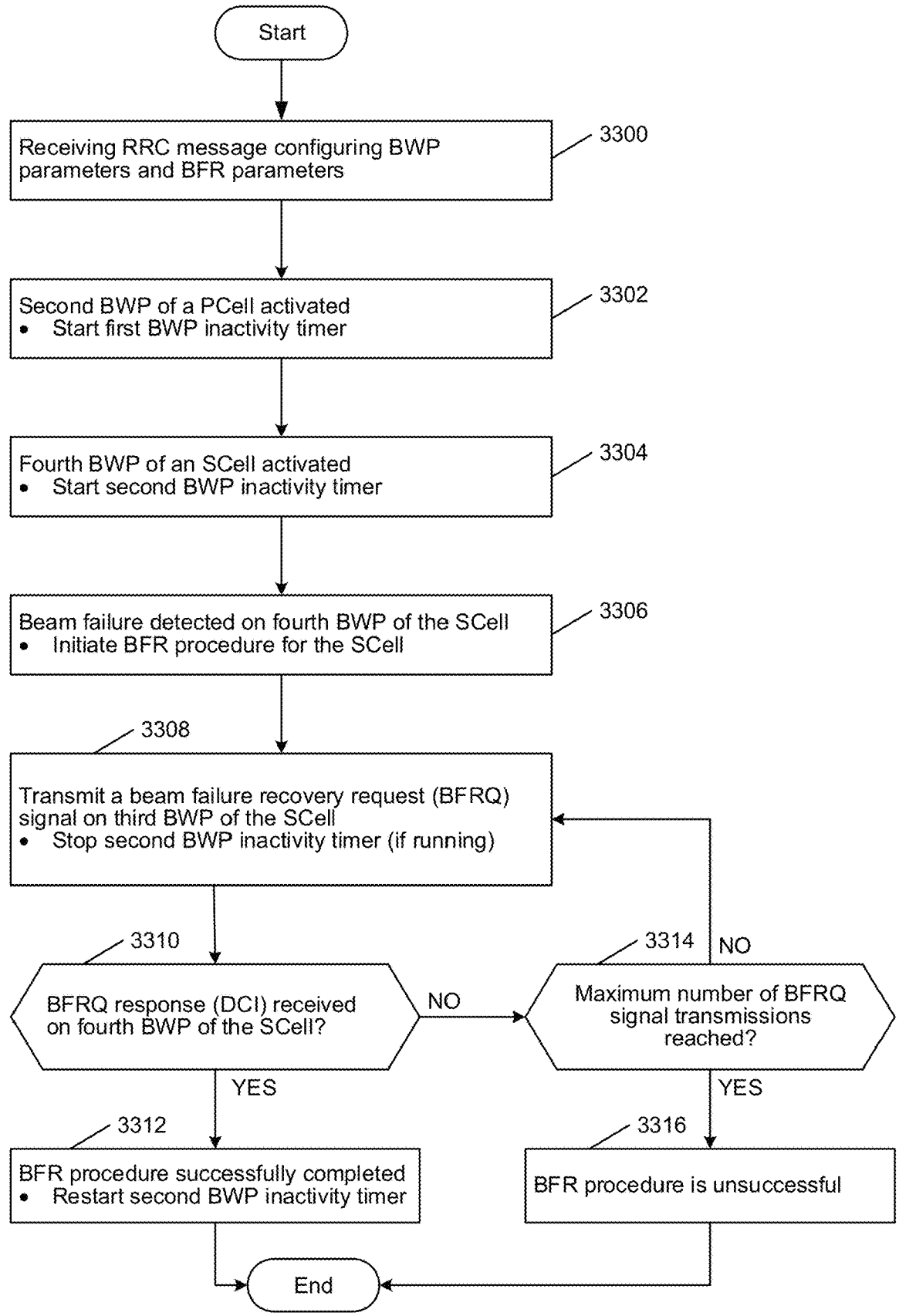
FIG. 33 shows an example flowchart of a downlink beam failure recovery procedure for a bandwidth part in carrier aggregation.

FIG. 33 shows an example flowchart of a downlink beam failure recovery procedure for a bandwidth part in carrier aggregation. At step 3300, a wireless device may receive RRC parameters configuring a BWP and BFR parameters. At step 3302, a second BWP of a PCell may be activated and a wireless device may start a first BWP inactivity timer. At step 3304, a fourth BWP of a SCell may be activated and a wireless device may start a second BWP inactivity timer. At step 3306, a beam failure may be detected on the fourth BWP of the SCell and the wireless device may initiate a BFR procedure for the SCell. At step 3308, the wireless device may send (e.g., transmit) a BFRQ signal on the third BWP of the SCell. The wireless device may stop the second BWP inactivity timer, for example, if running. At step 3310, if the wireless device receives a BFRQ response on a fourth BWP of the SCell, the BFR procedure may be successfully completed at step 3312. The wireless device may restart the second BWP inactivity timer, for example, if stopped. At step 3310, if the wireless device does not receive a BFRQ response on a fourth BWP of the SCell, the wireless device may determine if a maximum number of BFRQ signal transmissions has been reached at step 3314. If the maximum number of BFRQ signal transmissions has not been reached at step 3314, the wireless device may send (e.g., transmit) a BFRQ signal on the third BWP of the SCell at step 3308. If the maximum number of BFRQ signal transmissions has been reached at step 3314, the wireless device may determine that the BFR procedure is unsuccessful at step 3316.

Figure 34:
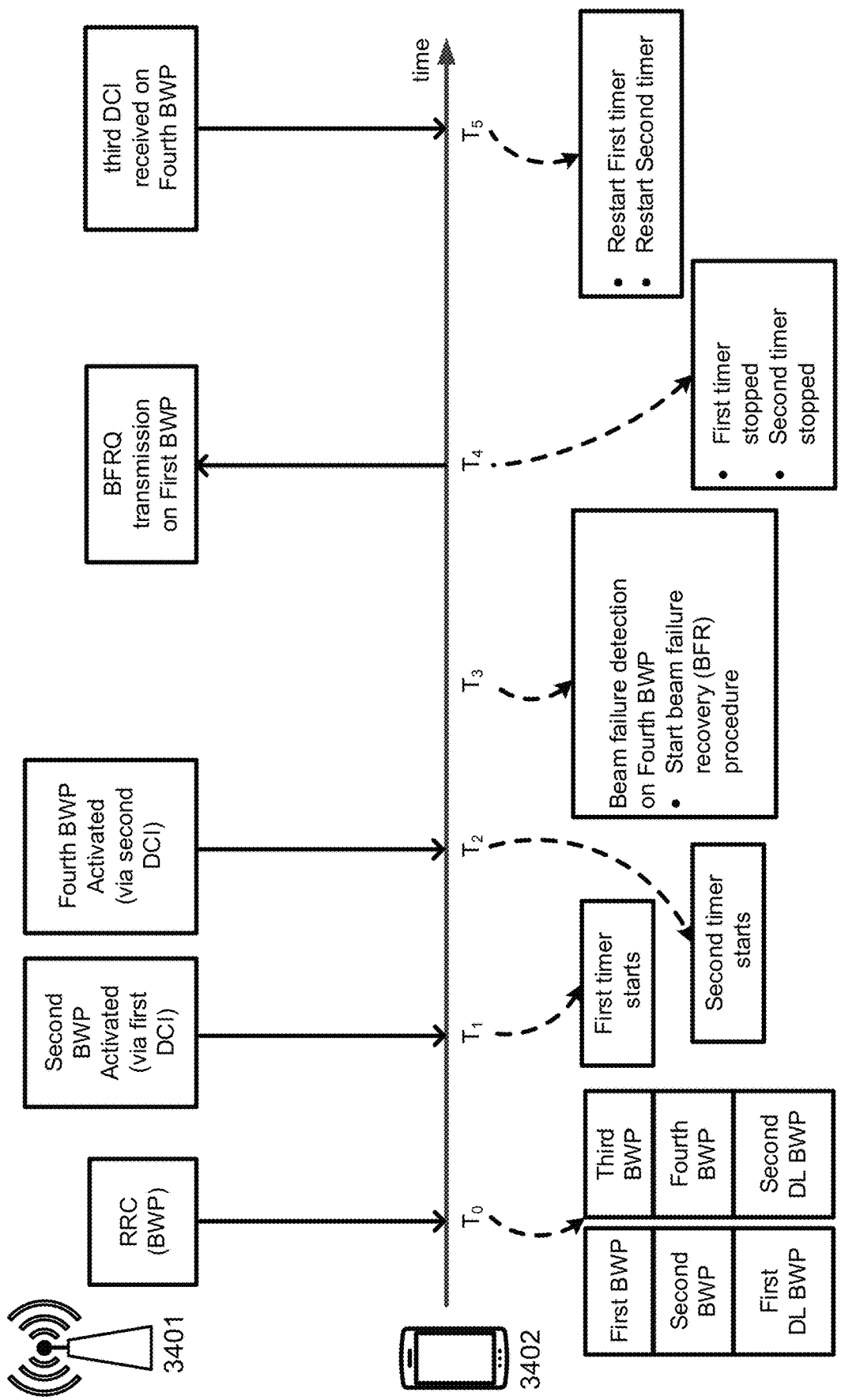
FIG. 34 shows an example of a downlink beam failure recovery procedure for a bandwidth part in carrier aggregation.

FIG. 34 shows an example of a downlink beam failure recovery procedure for a bandwidth part in carrier aggregation. A wireless device 3402 may receive, from a base station 3401, one or more messages comprising configuration parameters (e.g., at time T0). The one or more messages may comprise one or more RRC messages (e.g., RRC connection reconfiguration message, RRC connection reestablishment message, and/or RRC connection setup message). The configuration parameters may comprise configuration parameters for a primary cell and one or more secondary cells. The one or more secondary cells may comprise a first secondary cell. The configuration parameters may comprise BWP configuration parameters for a plurality of BWPs. The plurality of BWPs may comprise a first plurality of BWPs of the primary cell comprising a first DL BWP (e.g., default DL BWP), a first BWP (e.g. UL BWP), and/or a second BWP (e.g., DL BWP). The plurality of BWPs may comprise a second plurality of BWPs of the first secondary cell comprising a second DL BWP (e.g., default DL BWP), a third BWP (e.g. UL BWP), and a fourth BWP (e.g. DL BWP).

The configuration parameters may comprise one or more BFR configuration parameters. The one or more BFR configuration parameters may comprise a first set of RS resource configurations for the fourth BWP. The first set of RS resource configurations may comprise one or more first RSs (e.g., CSI-RS or SS blocks) of the fourth BWP. The one or more BFR configuration parameters may comprise a second set of RS resource configurations comprising one or more second RSs (e.g., CSI-RS or SS blocks) of the fourth BWP. The wireless device 3402 may measure radio link quality of one or more beams associated with the one or more first RSs and/or the one or more second RSs. The one or more BFR configuration parameters may comprise one or more BFRQ resources of the first BWP of the primary cell. The one or more BFR configuration parameters may comprise an association between each of the one or more second RSs and each of the one or more BFRQ resources.

The wireless device 3402 may receive a first DCI indicating switching a first current active DL BWP from the first DL BWP of the primary cell to the second BWP (e.g., at time T1). The first DCI may comprise a first BWP indicator. The wireless device 3402 may determine that the first DCI indicates BWP switching, for example, based on the first BWP indicator indicating a BWP different from the first current active DL BWP. The wireless device 3402 may start a first inactivity timer, for example, based on switching the first current active DL BWP from the first DL BWP to the second BWP (e.g., at time T1).

The wireless device 3402 may receive a second DCI indicating switching a second current active DL BWP from the second DL BWP of the first secondary cell to the fourth BWP (e.g., at time T2). The second DCI may comprise a second BWP indicator. The wireless device 3402 may determine that the second DCI indicates BWP switching, for example, based on the second BWP indicator indicating a BWP different from the second current active DL BWP. The wireless device 3402 may start a second inactivity timer, for example, based on switching the second current active DL BWP from the second DL BWP to the fourth BWP (e.g., at time T2).

The wireless device 3402 may compare a first radio link quality of the one or more first RSs with a first threshold. The first threshold (e.g., hypothetical BLER, L1-RSRP) may be a first value provided by a higher layer (e.g., RRC, MAC). The wireless device 3402 may monitor at least one PDCCH of the fourth BWP. At least one RS (e.g., DM-RS) of the at least one PDCCH may be associated with (e.g., QCLed) the one or more first RSs.

The wireless device 3402 may detect a beam failure on the fourth BWP, for example, if the first radio link quality of the one or more first RSs satisfies certain criteria (e.g., at time T3). The wireless device 3402 may determine that a beam failure may occur, for example, if RSRP and/or SINR of the one or more first RSs is less than the first threshold and/or if BLER is greater than the first threshold. Such an assessment may be for a number (e.g., a consecutive number) of times, wherein a value of the number of times may be provided by a higher layer (e.g., RRC, MAC).

The wireless device 3402 may initiate a BFR procedure for the fourth BWP (e.g., at time T3), for example, based on detecting the beam failure on the fourth BWP. The wireless device 3402 may start a beam failure recovery timer (if configured) and/or initiate a candidate beam identification procedure, for example, based on initiating the BFR procedure. For the candidate beam identification procedure, the wireless device 3402 may identify a first RS in the one or more second RSs. The first RS may be associated with a BFRQ resource of the one or more BFRQ resources of the first BWP of the primary cell. The BFRQ resource may comprise at least one preamble and at least one PRACH (e.g. time and/or frequency) resource. A second radio link quality (e.g., BLER, L1-RSRP) of the first RS may be better (e.g., lower BLER, higher L1-RSRP, or higher SINR) than a second threshold. The second threshold may be a second value provided by the higher layer (e.g., RRC, MAC).

The wireless device 3402 may initiate a BFRQ transmission via the first BWP of the primary cell (e.g., at time T4), for example, based on detecting the beam failure on the fourth BWP and identifying the first RS of the fourth BWP. The BFRQ transmission may comprise sending (e.g., transmitting), in a first slot, the at least one preamble via the at least one PRACH resource for a BFR procedure of the first secondary cell (e.g., at time T4). The wireless device 3402 may stop a second inactivity timer of the fourth BWP, for example, based on the initiating the BFRQ transmission. The wireless device 3402 may stop a first inactivity timer of the second BWP of the primary cell in addition to the stopping the second inactivity timer. The wireless device may refrain from switching BWP during a random access procedure for the BFR procedure.

Based on transmitting the at least one preamble in the first slot, the wireless device 3402 may start, from a second slot, monitoring for a BFR response. The monitoring for the BFR response may comprise monitoring at least one second PDCCH in one or more coresets of the fourth BWP for third DCI (e.g., a downlink assignment or an uplink grant) within a configured response window. The third DCI may be scrambled, by a CRC, with a C-RNTI of the wireless device 3402. One or more RSs (e.g., DMRS) of the at least one second PDCCH may be associated (e.g., QCLed) with the first RS of the fourth BWP.

The BFR procedure may be successfully completed at time T5, for example, based on the wireless device 3402 receiving the third DCI on the at least one second PDCCH in the one or more coresets, within the configured response window. The wireless device 3402 may restart the second inactivity timer of the fourth BWP of the first secondary cell, for example, based on receiving the third DCI addressed to the C-RNTI of the wireless device 3402. Receiving the third DCI addressed to the C-RNTI of the wireless device 3402 may result in the wireless device 3402 restarting the first inactivity timer of the second BWP of the primary cell, for example, in addition to restarting the second inactivity timer, if stopped.

The beam failure recovery timer (e.g., if configured) may expire before the BFR procedure is successfully completed. A lower layer (e.g., physical layer) of the wireless device 3402 may indicate a failure of the BFR procedure to a higher layer (e.g., RRC). The wireless device 3402 may declare a failure of the BFR procedure, for example, based on the beam failure recovery timer being expired. The wireless device 3402 may restart the second inactivity timer of the fourth BWP of the first secondary cell, for example, based on declaring the failure of the BFR procedure. Declaring the failure of the BFR procedure may result in the wireless device 3402 restarting the first inactivity timer of the second BWP of the primary cell, for example, in addition to the restarting the second inactivity timer, if stopped. The wireless device 3402 may switch the second current active DL BWP of the first secondary cell from the fourth BWP to the second DL BWP, for example, based on declaring the failure of the BFR procedure.

A maximum number of the BFRQ transmissions (e.g., preamble transmissions) for the BFR procedure may be reached before the BFR procedure is successfully completed. The maximum number of the BFRQ transmissions may be configured by the higher layer. The wireless device 3402 may declare a failure of the BFR procedure, for example, based on the maximum number of the BFRQ transmissions being reached. The wireless device 3402 may restart the second inactivity timer of the fourth BWP of the first secondary cell, for example, based on declaring the failure of the BFR procedure. In addition to the restarting the second inactivity timer, if stopped, declaring the failure of the BFR procedure may result in the wireless device 3402 restarting the first inactivity timer of the second BWP of the primary cell. Declaring the failure of the BFR procedure may result in the wireless device 3402 switching the second current active DL BWP of the first secondary cell from the fourth BWP to the second DL BWP.

Figure 35:
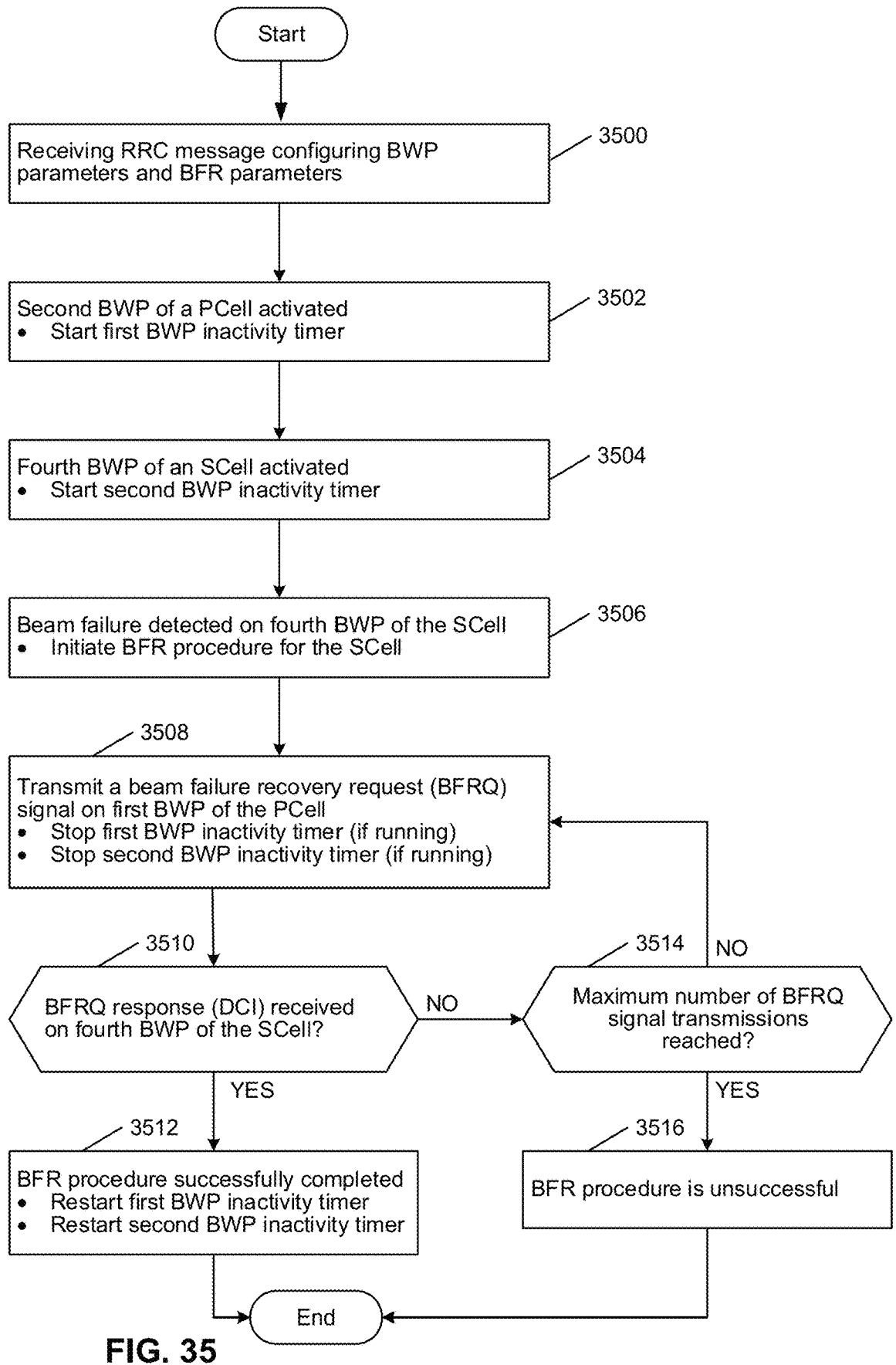
FIG. 35 shows an example flowchart of a downlink beam failure recovery procedure for a bandwidth part in carrier aggregation.

FIG. 35 shows an example flowchart of a downlink beam failure recovery procedure for a bandwidth part in carrier aggregation. At step 3500, a wireless device may receive RRC parameters configuring a BWP and BFR parameters. At step 3502, a second BWP of a PCell may be activated and a wireless device may start a first BWP inactivity timer. At step 3504, a fourth BWP of a SCell may be activated and a wireless device may start a second BWP inactivity timer. At step 3506, a beam failure may be detected on the fourth BWP of the SCell and the wireless device may initiate a BFR procedure for the SCell. At step 3508, the wireless device may send (e.g., transmit) a BFRQ signal via the first BWP of the PCell. The wireless device may stop the first BWP inactivity timer and/or the second BWP inactivity timer, for example, if running. At step 3510, if the wireless device receives a BFRQ response on the fourth BWP of the SCell, the BFR procedure may be successfully completed at step 3512. The wireless device may restart the first BWP inactivity timer and/or the second BWP inactivity timer, for example, if stopped. At step 3510, if the wireless device does not receive a BFRQ response on the fourth BWP of the SCell, the wireless device may determine if a maximum number of BFRQ signal transmissions has been reached at step 3514. If the maximum number of BFRQ signal transmissions has not been reached at step 3514, the wireless device may send (e.g., transmit) a BFRQ signal via the first BWP of the PCell at step 3508. If the maximum number of BFRQ signal transmissions has been reached at step 3514, the wireless device may determine that the BFR procedure is unsuccessful at step 3516.

Figure 36:
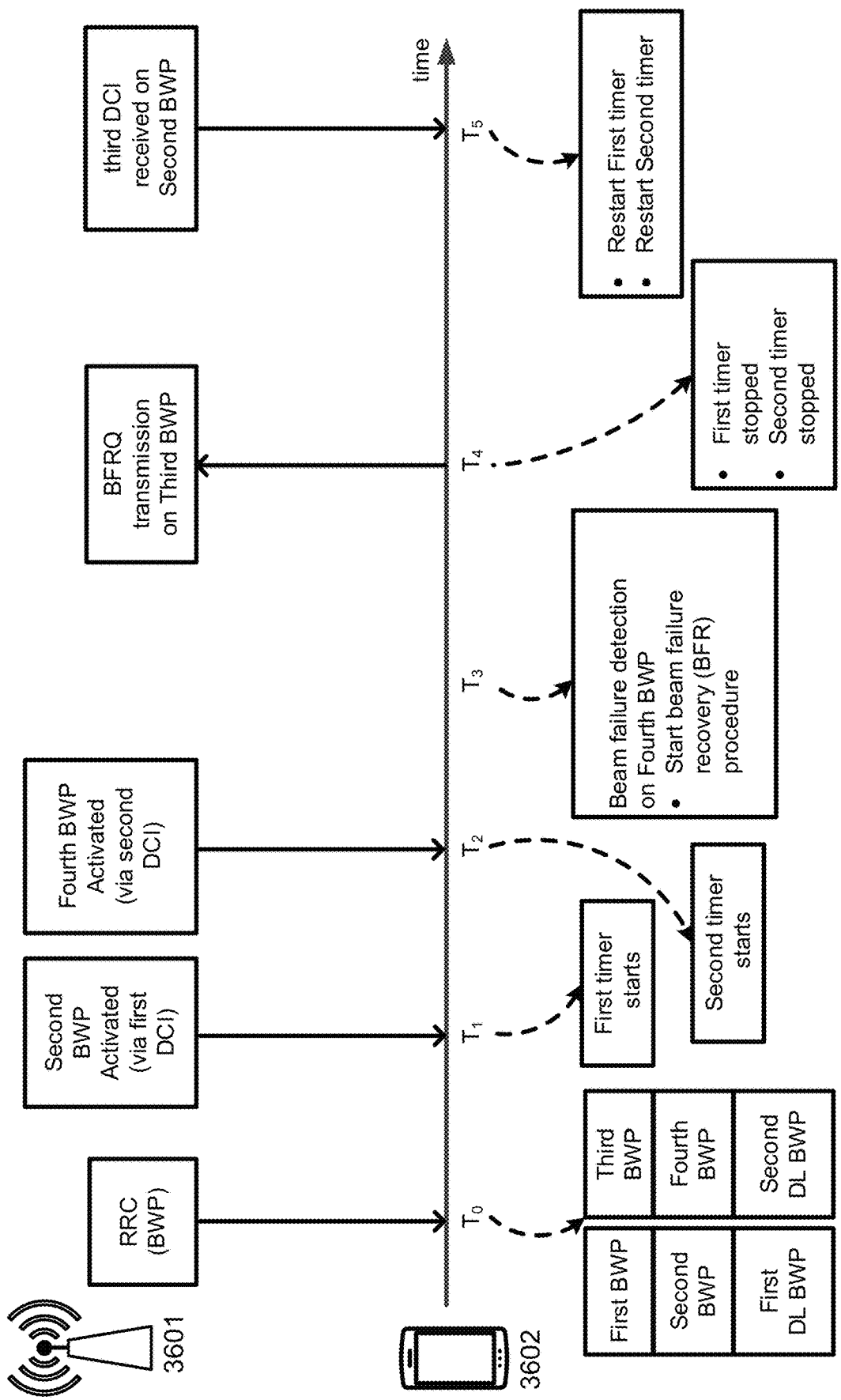
FIG. 36 shows an example of a downlink beam failure recovery procedure for a bandwidth part in carrier aggregation.

FIG. 36 shows an example of a downlink beam failure recovery procedure for a bandwidth part in carrier aggregation. A wireless device 3602 may receive, from a base station 3601, one or more messages comprising configuration parameters (e.g., at time T0). The one or more messages may comprise one or more RRC messages (e.g., RRC connection reconfiguration message, RRC connection reestablishment message, and/or RRC connection setup message). The configuration parameters may comprise configuration parameters for a primary cell and one or more secondary cells. The one or more secondary cells may comprise a first secondary cell. The configuration parameters may comprise BWP configuration parameters for a plurality of BWPs. The plurality of BWPs may comprise a first plurality of BWPs of the primary cell comprising a first DL BWP (e.g., default DL BWP), a first BWP (e.g. UL BWP), and/or a second BWP (e.g., DL BWP). The plurality of BWPs may comprise a second plurality of BWPs of the first secondary cell comprising a second DL BWP (e.g., default DL BWP), a third BWP (e.g., UL BWP), and/or a fourth BWP (e.g., DL BWP).

The configuration parameters may comprise one or more BFR configuration parameters. The one or more BFR configuration parameters may comprise a first set of RS resource configurations for the fourth BWP. The first set of RS resource configurations may comprise one or more first RSs (e.g., CSI-RS and/or SS blocks) of the fourth BWP. The one or more BFR configuration parameters may comprise a second set of RS resource configurations comprising one or more second RSs (e.g., CSI-RS or SS blocks) of the fourth BWP. The wireless device 3602 may measure radio link quality of one or more beams associated with the one or more first RSs and/or the one or more second RSs. The one or more BFR configuration parameters may comprise one or more BFRQ resources of the third BWP of the first secondary cell. The one or more BFR configuration parameters may comprise an association between each of the one or more second RSs and each of the one or more BFRQ resources.

The wireless device 3602 may receive a first DCI indicating switching a first current active DL BWP from a first DL BWP (e.g., first default DL BWP) of the primary cell to the second BWP (e.g., at time T1). The first DCI may comprise a first BWP indicator. The wireless device 3602 may determine that the first DCI indicates BWP switching, for example, based on the first BWP indicator indicating a BWP different from the first current active DL BWP. The wireless device 3602 may start a first inactivity timer, for example, based on switching the first current active DL BWP from the first DL BWP to the second BWP (e.g., at time T1).

The wireless device 3602 may receive a second DCI indicating switching a second current active DL BWP from a second DL BWP (e.g., second default DL BWP) of the first secondary cell to the fourth BWP (e.g., at time T2). The second DCI may comprise a second BWP indicator. The wireless device 3602 may determine that the second DCI indicates BWP switching, for example, based on the second BWP indicator indicating a BWP different from the second current active DL BWP. The wireless device 3602 may start a second inactivity timer, for example, based on switching the second current active DL BWP from the second DL BWP to the fourth BWP (e.g., at time T2).

The wireless device 3602 may compare a first radio link quality of the one or more first RSs with a first threshold. The first threshold (e.g., hypothetical BLER, L1-RSRP, etc.) may comprise a first value provided by a higher layer (e.g., RRC, MAC). The wireless device 3602 may monitor at least one PDCCH of the fourth BWP. At least one RS (e.g., DM-RS) of the at least one PDCCH may be associated with (e.g., QCLed) the one or more first RSs.

The wireless device 3602 may detect a beam failure on the fourth BWP, for example, if the first radio link quality of the one or more first RSs satisfies certain criteria (e.g., at time T3). The wireless device 3602 may determine that a beam failure may occur, for example, if RSRP and/or SINR of the one or more first RSs is less than the first threshold and/or if BLER is greater than the first threshold. Such an assessment may be for a number (e.g., a consecutive number) of times, wherein a value of the number of times may be provided by a higher layer (e.g., RRC, MAC).

The wireless device 3602 may initiate a BFR procedure for the fourth BWP (e.g., at time T3), for example, based on detecting the beam failure on the fourth BWP. The wireless device 3602 may start a beam failure recovery timer (if configured) and/or initiate a candidate beam identification procedure, for example, based on initiating the BFR procedure. For the candidate beam identification procedure, the wireless device 3602 may identify a first RS in the one or more second RSs. The first RS may be associated with a BFRQ resource of the one or more BFRQ resources of the third BWP of the first secondary cell. The BFRQ resource may comprise at least one preamble and at least one PRACH (e.g., time and/or frequency) resource. A second radio link quality (e.g., BLER, L1-RSRP) of the first RS may be better (e.g., lower BLER, higher L1-RSRP, or higher SINR) than a second threshold. The second threshold may be a second value provided by the higher layer (e.g., RRC, MAC).

The wireless device 3602 may initiate a BFRQ transmission via the third BWP of the first secondary cell (e.g., at time T4), for example, based on detecting the beam failure on the fourth BWP and identifying the first RS of the fourth BWP. The BFRQ transmission may comprise sending (e.g., transmitting), in a first slot, the at least one preamble via the at least one PRACH resource for a BFR procedure of the first secondary cell (e.g., at time T4). The wireless device 3602 may stop a second inactivity timer of the fourth BWP, for example, based on the initiating the BFRQ transmission. The wireless device 3602 may stop a first inactivity timer of the second BWP of the primary cell in addition to the stopping the second inactivity timer. The wireless device 3602 may refrain from switching BWP during a random access procedure for the BFR procedure.

Based on transmitting the at least one preamble in the first slot, the wireless device 3602 may start, from a second slot, monitoring for a BFR response. The monitoring for the BFR response may comprise monitoring at least one second PDCCH in one or more coresets of the second BWP for third DCI (e.g., a downlink assignment or an uplink grant) within a configured response window. The third DCI may be scrambled, by a CRC, with a C-RNTI of the wireless device 3602. One or more RSs (e.g., DMRS) of the at least one second PDCCH may be associated (e.g., QCLed) with at least one RS of the second BWP of the primary cell. The at least one RS may be associated with a transmitting beam of the second BWP. The transmitting beam may be used for transmission of one or more downlink control information on the second BWP.

The BFR procedure may be successfully completed at time T5, for example, based on the wireless device 3602 receiving the third DCI on the at least one second PDCCH in the one or more coresets, within the configured response window. The wireless device 3602 may restart the second inactivity timer of the fourth BWP of the first secondary cell, for example, based on receiving the third DCI addressed to the C-RNTI of the wireless device 3602. Receiving the third DCI addressed to the C-RNTI of the wireless device 3602 may result in the wireless device 3602 restarting the first inactivity timer of the second BWP of the primary cell, for example, in addition to the restarting the second inactivity timer, if stopped.

The beam failure recovery timer (e.g., if configured) may expire before the BFR procedure is successfully completed. A lower layer (e.g., physical layer) of the wireless device 3602 may indicate a failure of the BFR procedure to a higher layer (e.g., RRC). The wireless device 3602 may declare a failure of the BFR procedure, for example, based on the beam failure recovery timer being expired. The wireless device 3602 may restart the second inactivity timer of the fourth BWP of the first secondary cell, for example, based on declaring the failure of the BFR procedure. Declaring the failure of the BFR procedure may result in the wireless device 3602 restarting the first inactivity timer of the second BWP of the primary cell, for example, in addition to the restarting the second inactivity timer, if stopped. Declaring the failure of the BFR procedure may result in the wireless device 3602 switching the second current active DL BWP of the first secondary cell from the fourth BWP to the second DL BWP.

A maximum number of the BFRQ transmissions (e.g., preamble transmissions) for the BFR procedure may be reached before the BFR procedure is successfully completed. The maximum number of the BFRQ transmissions may be configured by the higher layer. The wireless device 3602 may declare a failure of the BFR procedure, for example, based on the maximum number of the BFRQ transmissions being reached. The wireless device 3602 may restart the second inactivity timer of the fourth BWP of the first secondary cell, for example, based on declaring the failure of the BFR procedure. Declaring the failure of the BFR procedure may result in the wireless device 3602 restarting the first inactivity timer of the second BWP of the primary cell, for example, in addition to the restarting the second inactivity timer, if stopped. Declaring the failure of the BFR procedure may result in the wireless device 3602 switching the second current active DL BWP of the first secondary cell from the fourth BWP to the second DL BWP.

Figure 37:
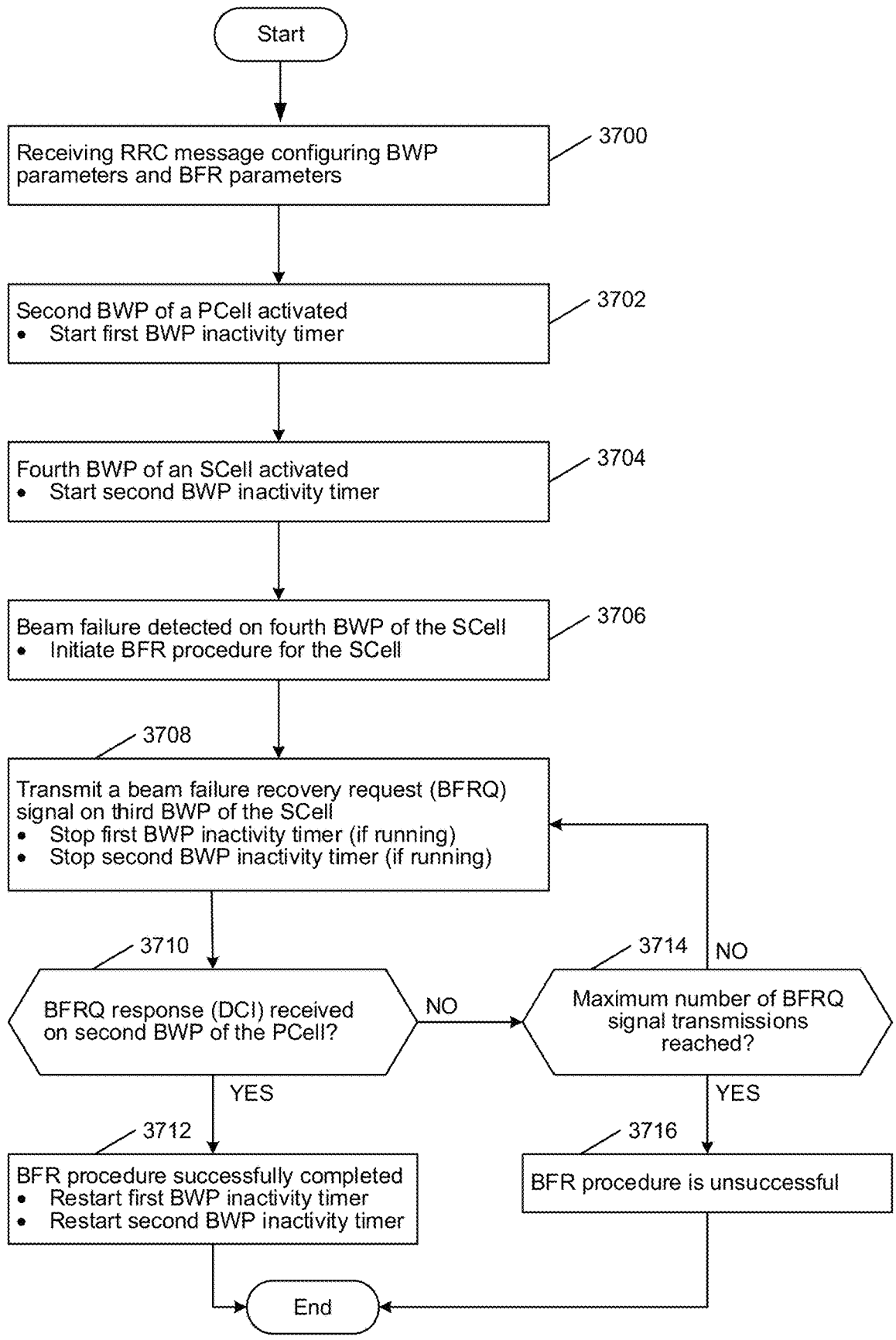
FIG. 37 shows an example flowchart of a downlink beam failure recovery procedure for a bandwidth part in carrier aggregation.

FIG. 37 shows an example flowchart of a downlink beam failure recovery procedure for a bandwidth part in carrier aggregation. At step 3700, a wireless device may receive RRC parameters configuring a BWP and BFR parameters. At step 3702, a second BWP of a PCell may be activated and a wireless device may start a first BWP inactivity timer. At step 3704, a fourth BWP of a SCell may be activated and a wireless device may start a second BWP inactivity timer. At step 3706, a beam failure may be detected on the fourth BWP of the SCell and the wireless device may initiate a BFR procedure for the SCell. At step 3708, the wireless device may send (e.g., transmit) a BFRQ signal on a third BWP of the SCell. The wireless device may stop the first BWP inactivity timer and/or the second BWP inactivity timer, for example, if running. At step 3710, if the wireless device receives a BFRQ response on a second BWP of the PCell, the BFR procedure may be successfully completed at step 3712. The wireless device may restart the first BWP inactivity timer and/or the second BWP inactivity timer, for example, if stopped. At step 3710, if the wireless device does not receive a BFRQ response on a second BWP of the PCell, the wireless device may determine if a maximum number of BFRQ signal transmissions has been reached at step 3714. If the maximum number of BFRQ signal transmissions has not been reached at step 3714, the wireless device may send (e.g., transmit) a BFRQ signal on the third BWP of the SCell at step 3708. If the maximum number of BFRQ signal transmissions has been reached at step 3714, the wireless device may determine that the BFR procedure is unsuccessful at step 3716.

A base station may send (e.g., transmit), to a wireless device that may receive, one or more messages. The one or more messages may comprise one or more configuration parameters for at least a secondary cell. The one or more configuration parameters may be for a primary cell and/or a plurality of secondary cells. The one or more configuration parameters may indicate one or more bandwidth parts (BWPs) comprising at least a first BWP and a second BWP. The first BWP may be a non-default BWP of the secondary cell. The second BWP may be a default BWP of the secondary cell. The one or more configuration parameters may indicate a first duration for a BWP inactivity timer. The one or more configuration parameters may indicate a first timer value for a first BWP inactivity timer (e.g., of the secondary cell) and/or a second timer value for a second BWP inactivity timer (e.g., of a primary cell). The one or more configuration parameters may indicate a beam failure recovery timer. The one or more configuration parameters may indicate a number (e.g., maximum number) of uplink transmissions (e.g., before determining that a random access procedure is unsuccessful). The wireless device may switch an active BWP of the secondary cell to the first BWP. Based on the switching the active BWP of the secondary cell to the first BWP, the wireless device may start the BWP inactivity timer. The wireless device may switch the active BWP of the secondary cell based on receiving DCI indicating the first BWP. The wireless device may initiate a random access procedure via the first BWP. The wireless device may initiate the random access procedure for a beam failure recovery of the secondary cell. The wireless device may initiate the random access procedure based on (or by) determining that a radio quality of one or more reference signals is less than a threshold value. The random access procedure via the first BWP may comprise a random access procedure for a beam failure recovery of the secondary cell. The wireless device may start the beam failure recovery timer, based on the initiating the random access procedure for the beam failure recovery. The wireless device may stop the second BWP inactivity timer, based on the initiating the random access procedure. Based on the initiating the random access procedure via the first BWP, the wireless device may stop (e.g., prior to the first duration) the BWP inactivity timer. The first duration may be associated with an expiration of the BWP inactivity timer. The wireless device may initiate the random access procedure by transmitting a preamble via an uplink resource. The wireless device may initiate the random access procedure for the beam failure recovery of the secondary cell based on determining that one or more reference signals (RSs) have a radio quality less than a threshold. The one or more configuration parameters may indicate the one or more RSs (e.g., for the first BWP). The uplink resource may comprise a physical random access channel (PRACH) resource. The wireless device may determine whether a random access procedure is initiated, based on a PDCCH order or based on a beam failure recovery of the secondary cell. Based on determining whether the random access procedure is initiated, the wireless device may either stop a BWP inactivity timer of the primary cell (e.g., if the random access procedure is initiated based on a PDCCH order) or not stop the BWP inactivity timer of the primary cell (e.g., if the random access procedure is initiated based on a beam failure recovery of the secondary cell). The wireless device may increment a number of transmissions based on transmitting the preamble. The wireless device may determine that the random access procedure is unsuccessful (e.g., unsuccessfully completed). The wireless device may determine that the random access procedure is unsuccessful based on an expiration of the beam failure recovery timer. The wireless device may determine that the random access procedure is unsuccessful based on a number of transmissions (e.g., preamble transmissions) reaching a threshold value (e.g., a maximum number of uplink transmissions). The wireless device may restart the second BWP inactivity timer, based on or in response to determining that the random access procedure is unsuccessful (e.g., unsuccessfully completed). The wireless device may restart the second BWP inactivity timer by using the second timer value. The wireless device may restart a BWP inactivity timer using a timer value. The wireless device may monitor (e.g., based on the first duration) for downlink control information (DCI) on a physical downlink control channel (PDCCH) of the first BWP. Based on the determining that the random access procedure is unsuccessful (e.g., unsuccessfully completed), the wireless device may switch the active BWP of the secondary cell to the second BWP. The wireless device may determine that the random access procedure via the first BWP is unsuccessful based on a number of uplink transmissions (e.g., if the wireless device reaches a maximum number of uplink transmissions). The wireless device may switch the active BWP of the secondary cell to the second BWP further based on a determination that DCI is not received on a PDCCH of the first BWP. The wireless device may switch the active BWP of the secondary cell to the first BWP based on receiving DCI indicating the first BWP. The wireless device may refrain from stopping a BWP inactivity of the primary cell, based on the random access procedure being initiated for a beam failure recovery. The wireless device may initiate a second random access procedure for the secondary cell based on a PDCCH order. The wireless device may stop the BWP inactivity timer of the primary cell, based on the second random access procedure being initiated (e.g., based on the PDCCH order).

A base station may send (e.g., transmit), to a wireless device that may receive, one or more messages comprising configuration parameters for a secondary cell. The configuration parameters may indicate one or more of: a first BWP, a second BWP, and a parameter indicating a first time period. The wireless device may switch to the first BWP as an active BWP of the secondary cell. The wireless device may initiate a random access procedure for the secondary cell. Based on the initiating the random access procedure, the wireless device may monitor, until the random access procedure is unsuccessfully completed (e.g., even if the wireless device does not receive any DCI via the first BWP), a PDCCH of the first BWP for a DCI indicating a random access response. The wireless device may determine that the random access procedure is unsuccessfully completed. Based on the determining that the random access procedure is unsuccessfully completed, the wireless device may continue monitoring the PDCCH of the first BWP dependent on whether the wireless device receives any DCI via the first BWP during the first time period after the determining. The wireless device may switch to the second BWP, based on the wireless device not receiving any DCI via the first BWP during the first time period.

Figure 38:
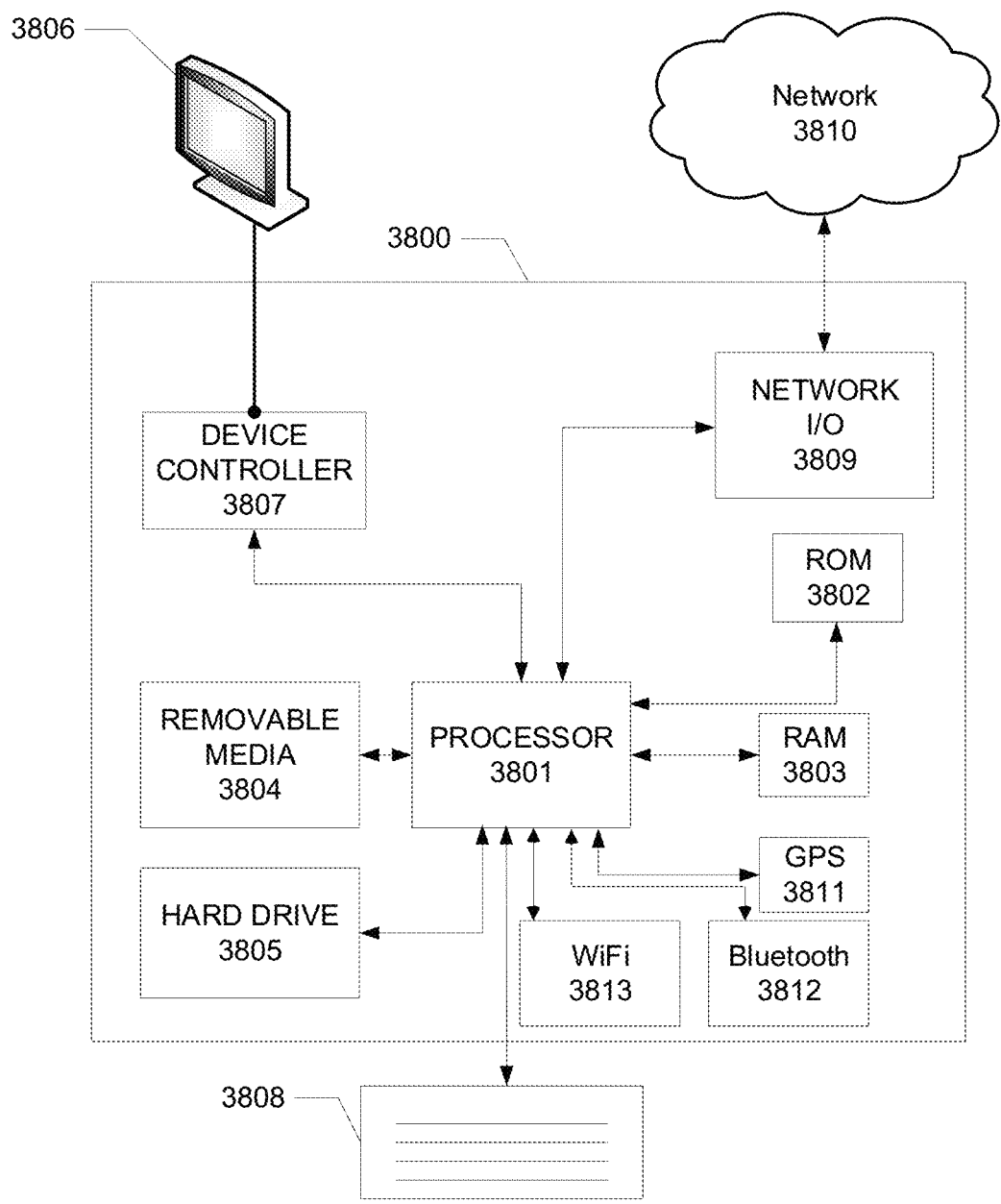
FIG. 38 shows example elements of a computing device that may be used to implement any of the various devices described herein.

FIG. 38 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 3800 may include one or more processors 3801, which may execute instructions stored in the random access memory (RAM) 3803, the removable media 3804 (such as a Universal Serial Bus (USB) drive, compact disk (CD) or digital versatile disk (DVD), or floppy disk drive), or any other desired storage medium. Instructions may also be stored in an attached (or internal) hard drive 3805. The computing device 3800 may also include a security processor (not shown), which may execute instructions of one or more computer programs to monitor the processes executing on the processor 3801 and any process that requests access to any hardware and/or software components of the computing device 3800 (e.g., ROM 3802, RAM 3803, the removable media 3804, the hard drive 3805, the device controller 3807, a network interface 3809, a GPS 3811, a Bluetooth interface 3812, a WiFi interface 3813, etc.). The computing device 3800 may include one or more output devices, such as the display 3806 (e.g., a screen, a display device, a monitor, a television, etc.), and may include one or more output device controllers 3807, such as a video processor. There may also be one or more user input devices 3808, such as a remote control, keyboard, mouse, touch screen, microphone, etc. The computing device 3800 may also include one or more network interfaces, such as a network interface 3809, which may be a wired interface, a wireless interface, or a combination of the two. The network interface 3809 may provide an interface for the computing device 3800 to communicate with a network 3810 (e.g., a RAN, or any other network). The network interface 3809 may include a modem (e.g., a cable modem), and the external network 3810 may include communication links, an external network, an in-home network, a provider's wireless, coaxial, fiber, or hybrid fiber/coaxial distribution system (e.g., a DOCSIS network), or any other desired network. Additionally, the computing device 3800 may include a location-detecting device, such as a global positioning system (GPS) microprocessor 3811, which may be configured to receive and process global positioning signals and determine, with possible assistance from an external server and antenna, a geographic position of the computing device 3800.

The example in FIG. 38 may be a hardware configuration, although the components shown may be implemented as software as well. Modifications may be made to add, remove, combine, divide, etc. components of the computing device 3800 as desired. Additionally, the components may be implemented using basic computing devices and components, and the same components (e.g., processor 3801, ROM storage 3802, display 3806, etc.) may be used to implement any of the other computing devices and components described herein. For example, the various components described herein may be implemented using computing devices having components such as a processor executing computer-executable instructions stored on a computer-readable medium, as shown in FIG. 38. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
receiving, by a wireless device, one or more configuration parameters for a secondary cell, wherein the one or more configuration parameters indicate a plurality of bandwidth parts (BWPs) comprising a first BWP and a second BWP;
switching an active BWP of the secondary cell to the first BWP;
transmitting a preamble associated with a random access procedure for the secondary cell;
determining based on a quantity of uplink transmissions, that the random access procedure is unsuccessful; and
based on the determining that the random access procedure is unsuccessful, switching the active BWP of the secondary cell to the second BWP.

2. The method of claim 1, wherein the one or more configuration parameters further indicate a duration for a BWP inactivity timer.

3. The method of claim 2, further comprising:
based on the switching the active BWP of the secondary cell to the first BWP, starting the BWP inactivity timer; and
based on the transmitting the preamble associated with the random access procedure for the secondary cell, stopping, prior to the duration, the BWP inactivity timer.

4. The method of claim 1, further comprising:
monitoring, based on a duration, for downlink control information (DCI) via a physical downlink control channel (PDCCH) of the first BWP.

5. The method of claim 1, wherein the switching the active BWP of the secondary cell to the second BWP is further based on a determination that downlink control information (DCI) is not received via a physical downlink control channel (PDCCH) of the first BWP.

6. The method of claim 1, wherein the random access procedure comprises a random access procedure for a beam failure recovery of the secondary cell.

7. The method of claim 1, wherein the determining that the random access procedure is unsuccessful further comprises determining that downlink control information (DCI) is not received during a monitoring period.

8. A method comprising:
receiving, by a wireless device, one or more configuration parameters for a secondary cell, wherein the one or more configuration parameters indicate:
a plurality of bandwidth parts (BWPs) comprising a first BWP and a second BWP; and
a duration for a BWP inactivity timer;
based on switching an active BWP of the secondary cell to the first BWP, starting the BWP inactivity timer;
transmitting a preamble associated with a random access procedure for the secondary cell;
based on the transmitting the preamble associated with the random access procedure for the secondary cell, stopping, prior to the duration, the BWP inactivity timer;
determining, based on a quantity of uplink transmissions, that the random access procedure is unsuccessful; and
based on the determining that the random access procedure is unsuccessful, performing one or more of:
restarting the BWP inactivity timer; or
switching the active BWP of the secondary cell to the second BWP.

9. The method of claim 8, further comprising:
monitoring, based on the duration, for downlink control information (DCI) via a physical downlink control channel (PDCCH) of the first BWP, wherein the switching the active BWP of the secondary cell to the second BWP is based on a determination that the DCI is not received during the monitoring.

10. The method of claim 8, wherein the random access procedure for the secondary cell comprises a random access procedure for a beam failure recovery of the secondary cell.

11. The method of claim 8, wherein the determining that the random access procedure is unsuccessful further comprises determining that downlink control information (DCI) is not received during a monitoring period.

12. The method of claim 8, wherein the first BWP is a non-default BWP of the secondary cell, and wherein the second BWP is a default BWP of the secondary cell.

13. The method of claim 8, wherein the determining that the random access procedure is unsuccessful is based on an expiration of a beam failure recovery timer.

14. The method of claim 8, wherein the transmitting the preamble associated with the random access procedure for the secondary cell comprises transmitting the preamble via an uplink resource.

15. A method comprising:
receiving, by a wireless device, one or more configuration parameters for a secondary cell, wherein the one or more configuration parameters indicate:
a plurality of bandwidth parts (BWPs) comprising a first BWP and a second BWP; and
a duration;
switching an active BWP of the secondary cell to the first BWP;
transmitting a preamble associated with a random access procedure for the secondary cell;
monitoring, based on the duration, for downlink control information (DCI) via a physical downlink control channel (PDCCH) of the first BWP;
determining, based on a quantity of uplink transmissions, that the random access procedure for the secondary cell is unsuccessful; and
switching, based on a determination that the DCI is not received during the monitoring and based on the determining that the random access procedure for the secondary cell is unsuccessful, the active BWP of the secondary cell to the second BWP.

16. The method of claim 15, wherein the switching the active BWP of the secondary cell to the second BWP is further based on a determination that the random access procedure is unsuccessful.

17. The method of claim 15, wherein the duration is associated with an expiration of a BWP inactivity timer.

18. The method of claim 15, further comprising:
based on the switching the active BWP of the secondary cell to the first BWP, starting a BWP inactivity timer associated with the duration; and
based on the transmitting the preamble associated with the random access procedure for the secondary cell, stopping, prior to the duration, the BWP inactivity timer.

19. The method of claim 15, wherein the transmitting the preamble associated with the random access procedure for the secondary cell comprises transmitting the preamble for a beam failure recovery of the secondary cell.

20. The method of claim 15, further comprises:
transmitting, via an uplink resource associated with the second BWP, the preamble associated with the random access procedure.

* * * * *

UNITED STATES PATENT AND TRADEMARK OFFICE
CERTIFICATE OF CORRECTION

PATENT NO. : 11,115,966 B2
APPLICATION NO. : 16/370477
DATED : September 7, 2021
INVENTOR(S) : Cirik et al.

It is certified that error appears in the above-identified patent and that said Letters Patent is hereby corrected as shown below:

On the Title Page

Page 3, Column 2, Other Publications, Line 42:
Delete "Remaing" and insert --Remaining-- therefor Page 4, Column 1, Other Publications, Line 15:
Delete "Remaing" and insert --Remaining-- therefor In the Specification Column 4, Detailed Description, Line 7:
Delete "Fl-C Fl-Control" and insert --F1-C F1-Control-- therefor Column 4, Detailed Description, Line 8:
Delete "Fl-U Fl-User" and insert --F1-U F1-User-- therefor Column 14, Detailed Description, Line 44:
After "channel", insert --.--

Column 27, Detailed Description, Line 40:
Delete "1119)." and insert --1118).-- therefor Column 32, Detailed Description, Line 17:
Delete "1250," and insert --1240,-- therefor Column 36, Detailed Description, Line 24:
After "layer", insert --.--

Column 56, Detailed Description, Line 19:
Delete "SCell," and insert --SCell.-- therefor Signed and Sealed this
Second Day of May, 2023

Katherine Kelly Vidal
*Director of the United States Patent and Trademark Office*

CERTIFICATE OF CORRECTION (continued)
U.S. Pat. No. 11,115,966 B2

Column 81, Detailed Description, Line 8:
Delete "Lab VIEWMathScript." and insert --LabVIEWMathScript.-- therefor Column 81, Detailed Description, Lines 56-57:
After "manner", insert --.--

In the Claims

Column 82, Claim 1, Line 8:
After "determining", insert --,--